United States Patent
Raghavan et al.

(10) Patent No.: US 11,838,767 B2
(45) Date of Patent: Dec. 5, 2023

(54) BEAM TRAINING TO ENABLE INTER-BAND CARRIER AGGREGATION

(71) Applicant: QUALCOMM Incorporated, San Diego, CA (US)

(72) Inventors: Vasanthan Raghavan, West Windsor Township, NJ (US); Tao Luo, San Diego, CA (US); Sony Akkarakaran, Poway, CA (US); Yan Zhou, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 17/225,920

(22) Filed: Apr. 8, 2021

(65) Prior Publication Data
US 2021/0321266 A1    Oct. 14, 2021

Related U.S. Application Data

(60) Provisional application No. 63/008,568, filed on Apr. 10, 2020.

(51) Int. Cl.
| | |
|---|---|
| *H04W 16/28* | (2009.01) |
| *H04W 24/10* | (2009.01) |
| *H04B 7/06* | (2006.01) |
| *H04B 7/08* | (2006.01) |
| *H04L 5/00* | (2006.01) |

(52) U.S. Cl.
CPC .......... *H04W 16/28* (2013.01); *H04B 7/0617* (2013.01); *H04B 7/0695* (2013.01); *H04B 7/088* (2013.01); *H04L 5/0048* (2013.01); *H04W 24/10* (2013.01)

(58) Field of Classification Search
CPC .... H04W 16/28; H04W 24/10; H04B 7/0617; H04B 7/0695; H04B 7/088; H04L 5/0048; H04L 5/0091
See application file for complete search history.

(56) References Cited

U.S. PATENT DOCUMENTS

| | | | |
|---|---|---|---|
| 2017/0033831 A1* | 2/2017 | Liu | H04W 72/0446 |
| 2017/0048768 A1* | 2/2017 | Komati | H04W 8/183 |
| 2018/0212651 A1* | 7/2018 | Li | H04B 7/0686 |
| 2018/0234153 A1* | 8/2018 | Lincoln | H04W 52/0274 |
| 2019/0364438 A1* | 11/2019 | Yang | H04L 27/2602 |
| 2020/0077285 A1* | 3/2020 | Yu | H04W 72/12 |

(Continued)

FOREIGN PATENT DOCUMENTS

WO    2019194490 A1    10/2019

OTHER PUBLICATIONS

"Discussion on RRM impacts of FR2 inter-band CA", 3GPP TSG-RAN WG4 Meeting #94-e Online, Feb. 24-Mar. 6, 2020 (R4-2001582) (Year: 2020).*

(Continued)

*Primary Examiner* — Ian N Moore
*Assistant Examiner* — Sun Jong Kim
(74) *Attorney, Agent, or Firm* — QUALCOMM Incorporated

(57) ABSTRACT

Inter-band CA beam training may include performing inter-band CA beam training for a first frequency band and inter-band CA beam training for a second frequency band between one or more base stations and a user equipment simultaneously.

14 Claims, 24 Drawing Sheets

(56) References Cited

U.S. PATENT DOCUMENTS

| | | | |
|---|---|---|---|
| 2020/0107337 A1* | 4/2020 | Lin | H04L 5/0094 |
| 2020/0288417 A1* | 9/2020 | Harada | H04W 72/044 |
| 2021/0028852 A1 | 1/2021 | Hwang et al. | |
| 2021/0067226 A1* | 3/2021 | Nilsson | H04B 7/0695 |
| 2021/0167837 A1* | 6/2021 | Großmann | H04B 7/0628 |
| 2021/0168007 A1* | 6/2021 | Shao | H04L 5/0094 |
| 2021/0314045 A1* | 10/2021 | Cha | H04B 7/063 |
| 2021/0314934 A1* | 10/2021 | Kwon | H04W 72/0413 |
| 2022/0239442 A1* | 7/2022 | Yoshioka | H04W 28/18 |

OTHER PUBLICATIONS

U.S. Appl. No. 63/006,134, filed Apr. 7, 2020 (Year: 2020).*

Huawei, et al., "Discussion on RRM Impacts of FR2 Inter-Band CA", 3GPP Draft, 3GPP TSG-RAN WG4 Meeting #94-e, R4-2001582, 3rd Generation Partnership Project (3GPP), Mobile Competence Centre, 650, Route Des Lucioles, F-06921, Sophia-Antipolis Cedex, France, vol. RAN WG4, No. Online, Feb. 24, 2020-Mar. 6, 2020, Feb. 14, 2020 (Feb. 14, 2020), XP051851491, 5 pages, Retrieved from the Internet: URL: https://ftp.3gpp.org/tsg_ran/WG4_Radio/TSGR4_94_e/Docs/R4-2001582.zip R4-2001582.docx [retrieved on Feb. 14, 2020] Section 2.2, p. 2.

International Search Report and Written Opinion—PCT/US2021/026613—ISA/EPO—dated Jul. 5, 2021.

Lenovo, et al., "Discussion of UE Behaviour Related to QCL Assumption in CA", 3GPP Draft, 3GPP TSG RAN WG1 Meeting #93, R1-1806355_TRX, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 20, 2018 (May 20, 2018), XP051441560, 2 pages, Retrieved from the Internet: URL:http://www.3gpp.org/ftp/Meetings%5F3GPP%5FSYNC/RAN1/Docs/ [retrieved on May 20, 2018] p. 2, paragraph.

* cited by examiner

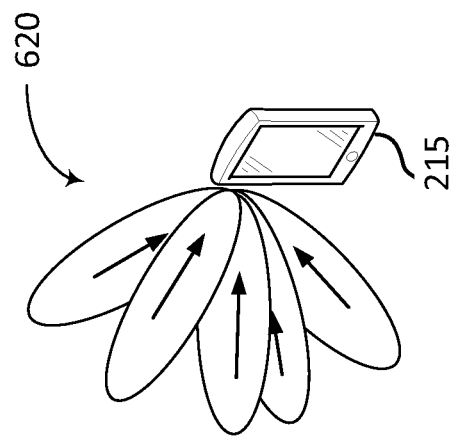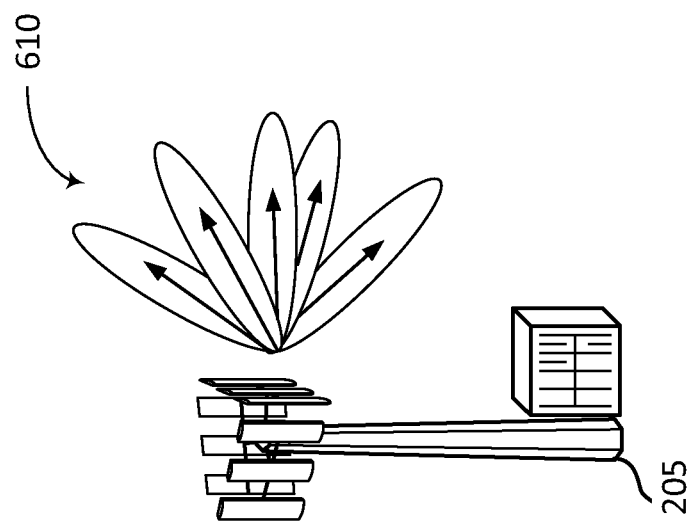
FIG. 6

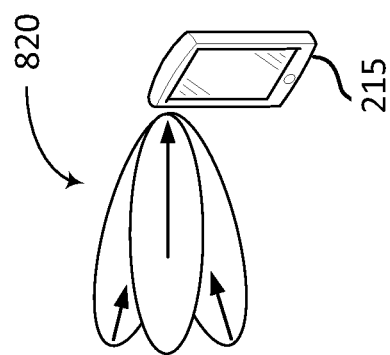
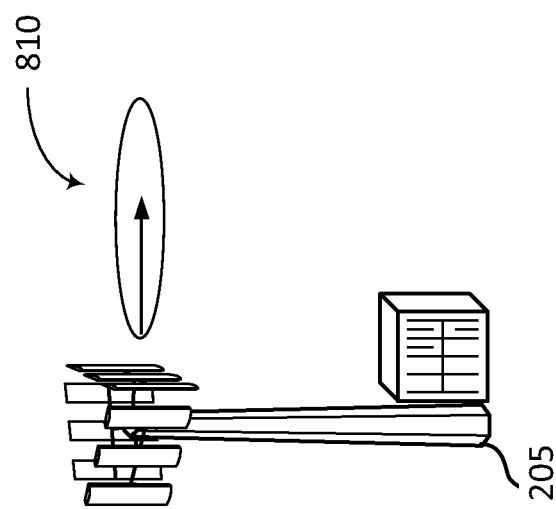
FIG. 8

BEAM TRAINING TO ENABLE INTER-BAND CARRIER AGGREGATION

RELATED APPLICATION

This application claims priority under 35 U.S.C. § 119(e) to U.S. Provisional Application No. 63/008,568 filed on Apr. 10, 2020, the entire specification of which is incorporated herein by reference.

BACKGROUND

Field

Aspects of the present disclosure relate generally to wireless communications, and more particularly, to beam training in a wireless communications system.

Background

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include multiple base stations or network access nodes, each simultaneously supporting communication for multiple communication devices, which may be otherwise known as user equipment (UE).

A wireless communications system (e.g., a 5G system) may operate in a millimeter wave (mmWave) band (e.g., above 24.25 GHz), which significantly increases bandwidth and data rates. However, a challenge with operating in a mmWave band is that transmissions in the mmWave band may suffer from significant path loss, penetration loss, and blockage loss. To compensate for high signal attenuation in the mmWave band, the wireless communications system may employ beamforming which enables signals to be transmitted and received with high directivity.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a method for wireless communications by a base station. The method includes allocating a first set of reference signal (RS) symbols for beam training in a first frequency band, and allocating a second set of RS symbols for beam training in a second frequency band, wherein the first set of RS symbols and the second set of RS symbols overlap in time. The method also includes generating a message, the message indicating the first set of RS symbols and the second set of RS symbols, and transmitting the message to a user equipment (UE).

A second aspect relates to a method for wireless communications by a user equipment (UE). The method includes receiving from a base station a message, the message indicating a first set of reference signal (RS) symbols and a second set of RS symbols, wherein the first set of RS symbols and the second set of RS symbols overlap in time. The method also includes beam sweeping through a first set of receive beams, and, for each receive beam of the first set of receive beams, receiving a respective one of the RS symbols of the first set of RS symbols in a first frequency band, and performing a signal measurement on the respective one of the RS symbols received in the first frequency band. The method further includes beam sweeping through a second set of receive beams, and, for each receive beam of the second set of receive beams, receiving a respective one of the RS symbols of the second set of RS symbols in a second frequency band, and performing a signal measurement on the respective one of the RS symbols received in the second frequency band.

A third aspect relates to a method for wireless communications by a user equipment (UE). The method includes receiving from a base station a message, the message indicating a first set of reference signal (RS) symbols and a second set of RS symbols, wherein the first set of RS symbols and the second set of RS symbols overlap in time. The method also includes beam sweeping through a first set of transmit beams, and, for each transmit beam of the first set of transmit beams, transmitting a respective one of the RS symbols of the first set of RS symbols in a first frequency band. The method further includes beam sweeping through a second set of transmit beams, and, for each transmit beam of the second set of transmit beams, transmitting a respective one of the RS symbols of the second set of RS symbols in a second frequency band.

A fourth aspect relates to a method for wireless communications by a base station. The method includes beam sweeping through a first set of transmit beams over a first time interval, and, for each transmit beam of the first set of transmit beams, transmitting a respective reference signal (RS) symbol in a first frequency band. The method also includes beam sweeping through a second set of transmit beams over a second time interval, wherein the second time interval overlaps the first time interval, and, for each transmit beam of the second set of transmit beams, transmitting a respective RS symbol in a second frequency band.

A fifth aspect relates to a method for wireless communications by a user equipment (UE). The method includes beam sweeping through a first set of receive beams over a first time interval, and, for each receive beam of the first set of receive beams, receiving a respective reference signal (RS) symbol in a first frequency band, and performing a signal measurement on the respective RS symbol received in the first frequency band. The method also includes beam sweeping through a second set of receive beams over a second time interval, wherein the second time interval overlaps the first time interval, and, for each receive beam of the second set of receive beams, receiving a respective RS symbol in a second frequency band, and performing a signal measurement on the respective RS symbol received in the second frequency band.

A sixth aspect relates to an apparatus for wireless communication. The apparatus includes a processor, a memory coupled with the processor, and instructions stored in the memory. The instructions are executable by the processor to cause the apparatus to allocate a first set of reference signal (RS) symbols for beam training in a first frequency band, allocate a second set of RS symbols for beam training in a second frequency band, wherein the first set of RS symbols and the second set of RS symbols overlap in time, generate a message, the message indicating the first set of RS symbols and the second set of RS symbols, and transmit the message to a user equipment (UE).

A seventh aspect relates to an apparatus for wireless communication. The apparatus includes a processor, a memory coupled with the processor, and instructions stored in the memory. The instructions are executable by the processor to cause the apparatus to receive from a base station a message, the message indicating a first set of reference signal (RS) symbols and a second set of RS symbols, wherein the first set of RS symbols and the second set of RS symbols overlap in time. The instructions are also executable by the processor to cause the apparatus to beam sweep through a first set of receive beams, and, for each receive beam of the first set of receive beams, receive a respective one of the RS symbols of the first set of RS symbols in a first frequency band, and perform a signal measurement on the respective one of the RS symbols received in the first frequency band. The instructions are also executable by the processor to cause the apparatus to beam sweep through a second set of receive beams, and, for each receive beam of the second set of receive beams, receive a respective one of the RS symbols of the second set of RS symbols in a second frequency band, and perform a signal measurement on the respective one of the RS symbols received in the second frequency band.

An eighth aspect relates to an apparatus for wireless communication. The apparatus includes a processor, a memory coupled with the processor, and instructions stored in the memory. The instructions are executable by the processor to cause the apparatus to receive from a base station a message, the message indicating a first set of reference signal (RS) symbols and a second set of RS symbols, wherein the first set of RS symbols and the second set of RS symbols overlap in time. The instructions are also executable by the processor to cause the apparatus to beam sweep through a first set of transmit beams, and, for each transmit beam of the first set of transmit beams, transmit a respective one of the RS symbols of the first set of RS symbols in a first frequency band. The instructions are also executable by the processor to cause the apparatus to beam sweep through a second set of transmit beams, and, for each transmit beam of the second set of transmit beams, transmit a respective one of the RS symbols of the second set of RS symbols in a second frequency band.

A ninth aspect relates to an apparatus for wireless communication. The apparatus includes a processor, a memory coupled with the processor, and instructions stored in the memory. The instructions are executable by the processor to cause the apparatus to beam sweep through a first set of transmit beams over a first time interval, and, for each transmit beam of the first set of transmit beams, transmit a respective reference signal (RS) symbol in a first frequency band. The instructions are also executable by the processor to cause the apparatus to beam sweep through a second set of transmit beams over a second time interval, wherein the second time interval overlaps the first time interval, and, for each transmit beam of the second set of transmit beams, transmit a respective RS symbol in a second frequency band.

A tenth aspect relates to an apparatus for wireless communication. The apparatus includes a processor, a memory coupled with the processor, and instructions stored in the memory. The instructions are executable by the processor to cause the apparatus to beam sweep through a first set of receive beams over a first time interval, and, for each receive beam of the first set of receive beams, receive a respective reference signal (RS) symbol in a first frequency band, and perform a signal measurement on the respective RS symbol received in the first frequency band. The instructions are also executable by the processor to cause the apparatus to beam sweep through a second set of receive beams over a second time interval, wherein the second time interval overlaps the first time interval, and, for each receive beam of the second set of receive beams, receive a respective RS symbol in a second frequency band, and perform a signal measurement on the respective RS symbol received in the second frequency band.

An eleventh aspect relates to an apparatus. The apparatus includes means for allocating a first set of reference signal (RS) symbols for beam training in a first frequency band, means for allocating a second set of RS symbols for beam training in a second frequency band, wherein the first set of RS symbols and the second set of RS symbols overlap in time, means for generating a message, the message indicating the first set of RS symbols and the second set of RS symbols, and means for transmitting the message to a user equipment (UE).

A twelfth aspect relates to an apparatus. The apparatus includes means for receiving from a base station a message, the message indicating a first set of reference signal (RS) symbols and a second set of RS symbols, wherein the first set of RS symbols and the second set of RS symbols overlap in time. The apparatus also includes means for beam sweeping through a first set of receive beams, and means for, for each receive beam of the first set of receive beams, receiving a respective one of the RS symbols of the first set of RS symbols in a first frequency band, and performing a signal measurement on the respective one of the RS symbols received in the first frequency band. The apparatus also includes means for beam sweeping through a second set of receive beams, and means for, for each receive beam of the second set of receive beams, receiving a respective one of the RS symbols of the second set of RS symbols in a second frequency band, and performing a signal measurement on the respective one of the RS symbols received in the second frequency band.

A thirteenth aspect relates to an apparatus. The apparatus includes means for receiving from a base station a message, the message indicating a first set of reference signal (RS) symbols and a second set of RS symbols, wherein the first set of RS symbols and the second set of RS symbols overlap in time. The apparatus also includes means for beam sweeping through a first set of transmit beams, and means for, for each transmit beam of the first set of transmit beams, transmitting a respective one of the RS symbols of the first set of RS symbols in a first frequency band. The apparatus also includes means for beam sweeping through a second set of transmit beams, and, means for, for each transmit beam of the second set of transmit beams, transmitting a respective one of the RS symbols of the second set of RS symbols in a second frequency band.

A fourteenth aspect relates to an apparatus. The apparatus includes means for beam sweeping through a first set of transmit beams over a first time interval, and means for, for each transmit beam of the first set of transmit beams, transmitting a respective reference signal (RS) symbol in a first frequency band. The apparatus also includes means for beam sweeping through a second set of transmit beams over a second time interval, wherein the second time interval overlaps the first time interval, and means for, for each transmit beam of the second set of transmit beams, transmitting a respective RS symbol in a second frequency band.

A fifteenth aspect relates to an apparatus. The apparatus includes means for beam sweeping through a first set of receive beams over a first time interval, and means for, for each receive beam of the first set of receive beams, receiving a respective reference signal (RS) symbol in a first frequency band, and performing a signal measurement on the respective RS symbol received in the first frequency band. The apparatus also includes means for beam sweeping through a second set of receive beams over a second time interval, wherein the second time interval overlaps the first time interval, and means for, for each receive beam of the second set of receive beams, receiving a respective RS symbol in a second frequency band, and performing a signal measurement on the respective RS symbol received in the second frequency band.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

BRIEF DESCRIPTION OF THE DRAWINGS

FIG. 6 illustrates an example of a first procedure for beam selection according to certain aspects of the present disclosure.

FIG. 8 illustrates an example of a third procedure for refining a receive beam according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
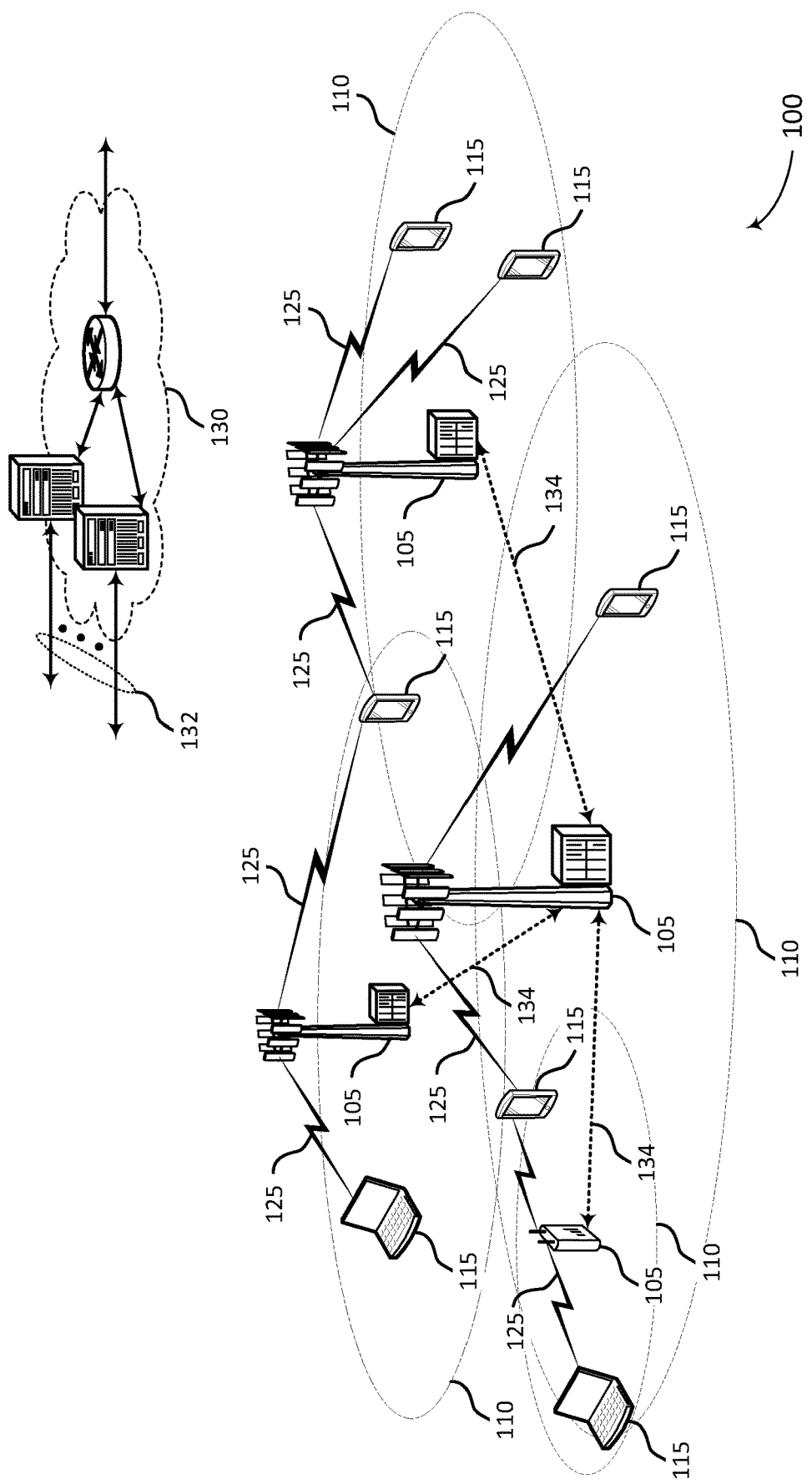
FIG. 1 shows an example of a wireless communications system according to certain aspects of the present disclosure.

FIG. 1 shows an example of a wireless communications system 100 in which aspects of the present disclosure may be performed. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, a New Radio (NR) network, or a combination thereof.

Base stations 105 may wirelessly communicate with UEs 115 via one or more base station antennas. A base station 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a respective geographic coverage area 110 in which communications with various UEs 115 is supported. Each base station 105 may provide communication coverage for the respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 and downlink transmissions from a base station 105 to a UE 115. Downlink transmissions may also be called forward link transmissions while uplink transmissions may also be called reverse link transmissions.

Each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 interface or another interface). Base stations 105 may communicate with one another over backhaul links 134 (e.g., via an X2 interface or another interface) either directly (e.g., directly between base stations 105) or indirectly (e.g., via the core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

The wireless communications system 100 (e.g., NR system) may operate in a millimeter wave (mmWave) band (e.g., above 24.25 GHz), which significantly increases bandwidth and data rates. However, a challenge with operating in a mmWave band is that transmissions in the mmWave band may suffer from significant path loss, penetration loss, and blockage loss. To compensate for high signal attenuation in the mmWave band, the wireless communications system 100 may employ beamforming which enables signals to be transmitted and received with high directivity.

Figure 2:
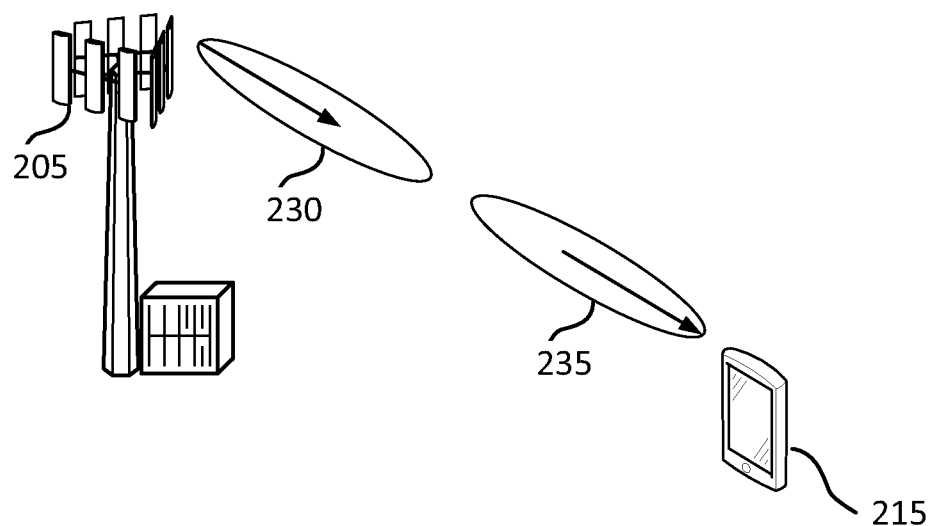
FIG. 2 illustrates an example of beamforming for downlink communication between a base station and a UE according to certain aspects of the present disclosure.

FIG. 2 illustrates an example in which beamforming is employed for downlink communication from a base station 205 (e.g., gNB) to a UE 215. The UE 215 may correspond to one of the UEs 115 in FIG. 1, and the base station 205 may correspond to one of the base stations 105 in FIG. 1. In this example, the base station 205 includes an antenna array that enables the base station 205 to transmit signals to the UE 215 with high directivity using any one of multiple transmit beams. Each transmit beam may correspond to a different transmit direction and/or radiation pattern (i.e., beam pattern). The base station 205 may electronically switch between the different transmit beams, e.g., by adjusting the phases between signals transmitted from antenna elements in the antenna array. FIG. 2 shows an example of one of the transmit beams 230 pointing in the direction of the UE 215.

The UE 215 includes an antenna array that enables the UE 215 to receive signals from the base station 205 with high directivity using any one of multiple receive beams. Each receive beam may correspond to a different receive direction and/or radiation pattern (i.e., beam pattern). The UE 215 may electronically switch between the different receive beams, e.g., by adjusting the phases between signals received via antenna elements in the antenna array. This enables the UE 215 to electronically tune the receive direction of the UE 215. FIG. 2 shows an example of one of the receive beams 235.

An advantage of operating in a mmWave band is that the mmWave band allows for the use of small antenna elements, which significantly reduces the area of an antenna array. This allows an antenna array to be incorporated in the UE 215 (e.g., a handset), a small base station (e.g., customer premises equipment (CPE)), or another wireless device.

The exemplary transmit beam 230 and receive beam 235 shown in FIG. 2 constitute a beam pair (also referred to as a beam pair link), in which the base station 205 uses the transmit beam 230 to transmit signals to the UE 215, and the UE 215 uses the receive beam 235 to receive the signals. Since the base station 205 is capable of transmitting signals using any one of multiple transmit beams and the UE 215 is capable of receiving signals using any one of multiple receive beams, the base station 205 and the UE 215 support multiple beam pairs for downlink communication between the base station 205 and the UE 215. The base station 205 and the UE 215 may select one of the beam pairs for downlink communication between the base station 205 and the UE 215 using a beam training procedure, as discussed further below. In practice, the relative positions of the base station 205 and the UE 215 may change over time (e.g., due to movement of the UE 215) and/or channel conditions may change over time. In this regard, the base station 205 and the UE 215 may update the beam pair to adapt to the changes.

Figure 3:
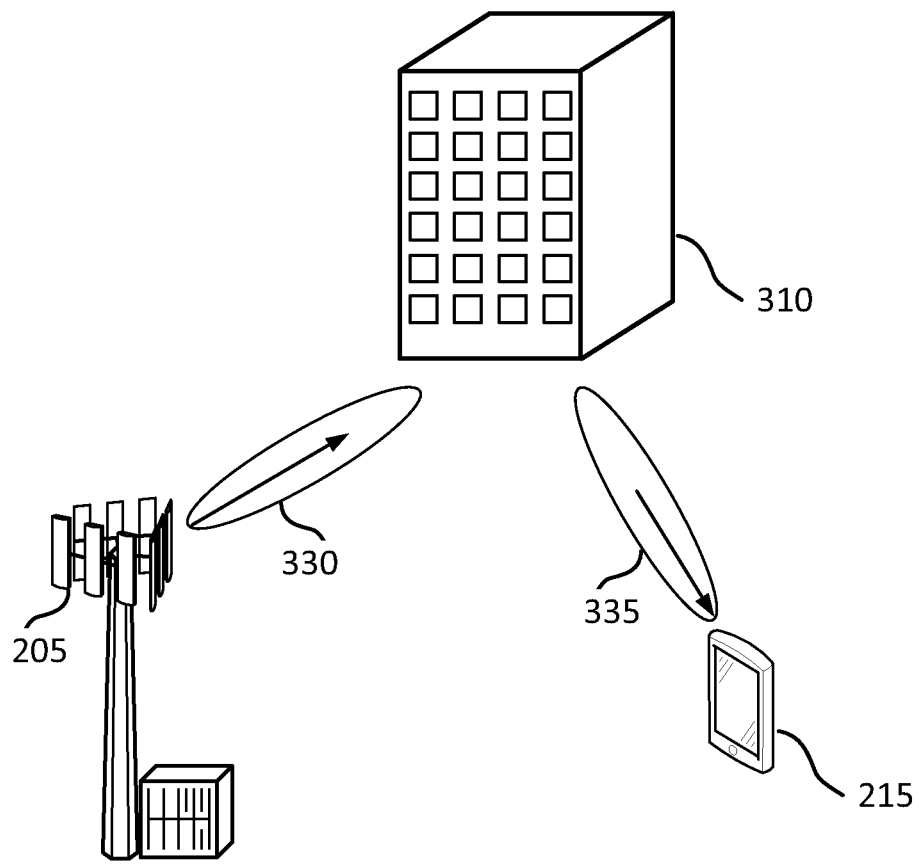
FIG. 3 illustrates an example in which the UE receives a signal from the base station via a non-direct path according to certain aspects of the present disclosure.

In the example in FIG. 2, the transmit beam 230 points toward the UE 215 and the receive beam 235 points toward the base station 205. However, it is to be appreciated that this need not be the case. In this regard, FIG. 3 shows an example in which a transmission from the base station 205 is reflected off an object 310 (e.g., a building) to the UE 215. In this example, the transmit beam 330 is directed toward the object 310 and the receive beam 335 is directed toward the object 310.

Figure 4:
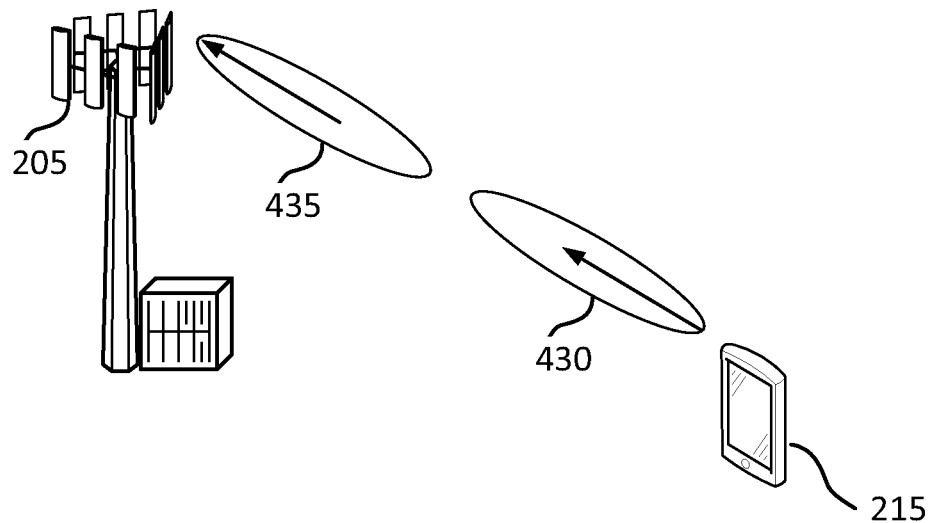
FIG. 4 illustrates an example of beamforming for uplink communication between a base station and a UE according to certain aspects of the present disclosure.

Beamforming may also be employed for uplink communication from the UE 215 to the base station 205 (e.g., gNB). An example of this is illustrated in FIG. 4. In this example, the UE 215 includes an antenna array that enables the UE 215 to transmit signals to the base station 205 with high directivity using any one of multiple transmit beams. The antenna array may be the same antenna array used by the UE 215 to receive signals from the base station 205 or a different antenna array. Each transmit beam may correspond to a different transmit direction and/or radiation pattern. The UE 215 may electronically switch between the different transmit beams, e.g., by adjusting the phases between signals transmitted from antenna elements in the antenna array. FIG. 4 shows an example of one of the transmit beams 430 pointing in the direction of the base station 205.

The base station 205 includes an antenna array that enables the base station 205 to receive signals from the UE 215 with high directivity using any one of multiple receive beams. The antenna array may be the same antenna array used by the base station 205 to transmit signals to the UE 215 or a different antenna array. Each receive beam may correspond to a different receive direction and/or radiation pattern. The base station 205 may electronically switch between the different receive beams, e.g., by adjusting the phases between signals received via antenna elements in the antenna array. This enables the base station 205 to electronically tune the receive direction of the base station. FIG. 4 shows an example of one of the receive beams 435.

The exemplary transmit beam 430 and receive beam 435 shown in FIG. 4 constitute a beam pair, in which the UE 215 uses the transmit beam 430 to transmit signals to the base station 205, and the base station 205 uses the receive beam 435 to receive the signals. Since the base station 205 is capable of receiving signals using any one of multiple receive beams and the UE 215 is capable of transmitting signals using any one of multiple transmit beams, the base station 205 and the UE 215 support multiple beam pairs for uplink communication between the UE 215 and the base station 205. The base station 205 and the UE 215 may select one of the beam pairs for uplink communication between the base station 205 and the UE 215 using a beam training procedure, as discussed further below.

Figure 5:
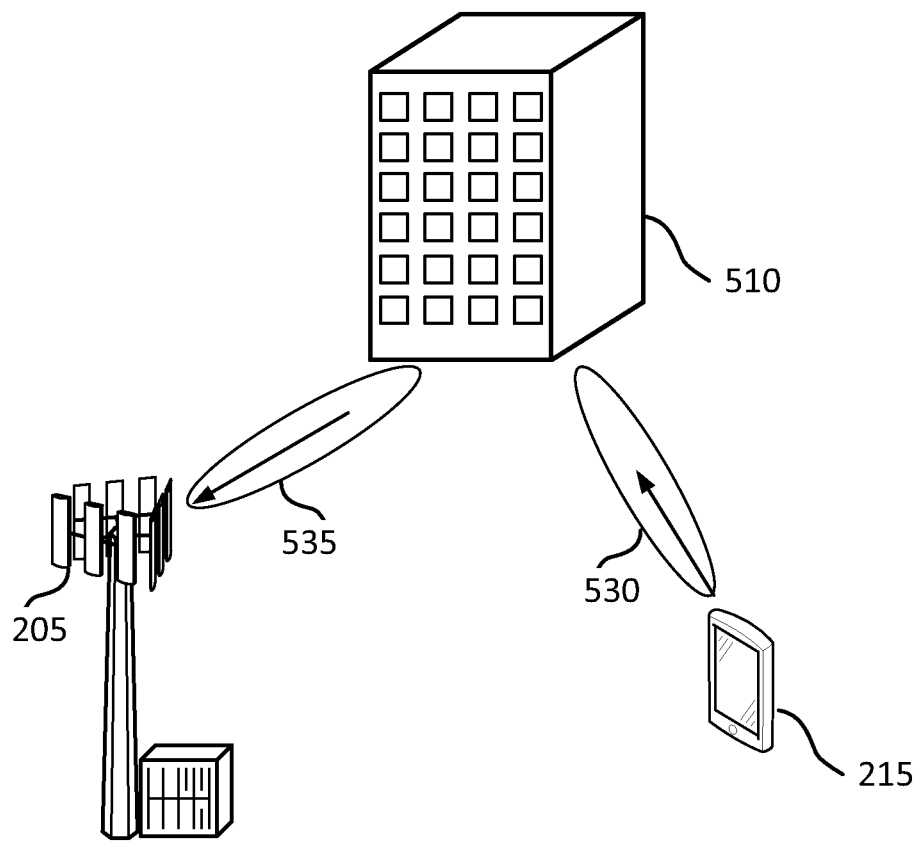
FIG. 5 illustrates an example in which the base station receives a signal from the UE via a non-direct path according to certain aspects of the present disclosure.

In the example in FIG. 4, the transmit beam 430 points toward the base station 205 and the receive beam 435 points toward the UE 215. However, it is to be appreciated that this need not be the case. In this regard, FIG. 5 shows an example in which a transmission from the UE 215 is reflected off an object 510 (e.g., a building) to the base station 205. In this example, the transmit beam 530 is directed toward the object 510 and the receive beam 535 is directed toward the object 510.

Thus, beamforming may be used for both the downlink and the uplink between the base station 205 and UE 215. When there is good reciprocity between the downlink and the uplink, the beam directions for the uplink may be determined based on the beam directions for the downlink.

As discussed above, beamforming may be used to overcome high path losses in the wireless communications system 100 (e.g., NR system). On the downlink, the base station 205 and the UE 215 communicate using a beam pair including a transmit beam (e.g., transmit beam 230) at the base station 205 and a receive beam receive beam 235) at the UE 215. The beam pair may be selected from multiple available beam pairs using a beam training procedure. In an NR system, the beam training, may include a first procedure P1, a second procedure P2, and a third procedure P3 (also referred to as procedure one, procedure two, and procedure three). As discussed further below, the first procedure P1 may be used for initial beam selection at both ends, the second procedure P2 may be used to refine the transmit beam, and the third procedure P3 may be used to refine the receive beam.

FIG. 6 illustrates an example of the first procedure P1 for the downlink between the base station 205 and the UE 215. In this example, the base station 205 sweeps through a set of transmit beams 610. For each transmit beam, the base station 205 transmits one or more reference signal (RS) symbols. The base station 205 may sweep through the transmit beams 610 more than once. It is to be appreciated that the transmit beams 610 may be a subset of the transmit beams supported by the base station 205.

The UE 215 sweeps through a set of receive beams 620. For each of the receive beams 620, the UE 215 may receive one or more RS symbols from the base station 205. The UE 215 may sweep through the receive beams 620 more than once. It is to be appreciated that the receive beams 620 may be a subset of the receive beams supported by the UE 215.

In this example, the beam sweeping at the base station 205 and the beam sweeping at the UE 215 are coordinated such that, for each one of multiple beam pairs, the base station 205 transmits an RS symbol and the UE 215 receives the RS symbol. Each one of the beam pairs may correspond to a different combination of one of the transmit beams 610 and one of the receive beams 620.

For each one of the multiple beam pairs, the UE 215 may perform a signal measurement on the received RS symbol for the beam pair. The signal measurement may measure reference signal received power (RSRP), reference signal received quality (RSRQ), signal to interference noise ratio (SINR) measurement, signal to noise ratio (SNR) measurement, received signal strength indicator (RSSI) measurement, or another parameter indicative of signal strength or quality. In one example, the UE 215 may transmit a report to the base station 205 indicating the beam pair with the highest signal measurement (e.g., highest RSRP, highest RSRQ, highest SINR, highest SNR, highest RSSI, etc.).

Thus, the first procedure P1 selects a beam pair, and hence selects the transmit beam and the receive beam corresponding to the selected beam pair. The first procedure P1 includes beam sweeping at the base station 205, beam sweeping at the UE 215, beam measurement, and beam reporting. In one example, the selected beam pair may be used for downlink communication between the base station 205 and the UE 215. In another example, the second procedure P2 may be performed to refine the transmit beam and/or the third procedure P3 may be performed to refine the receive beam, as discussed further below.

Figure 7:
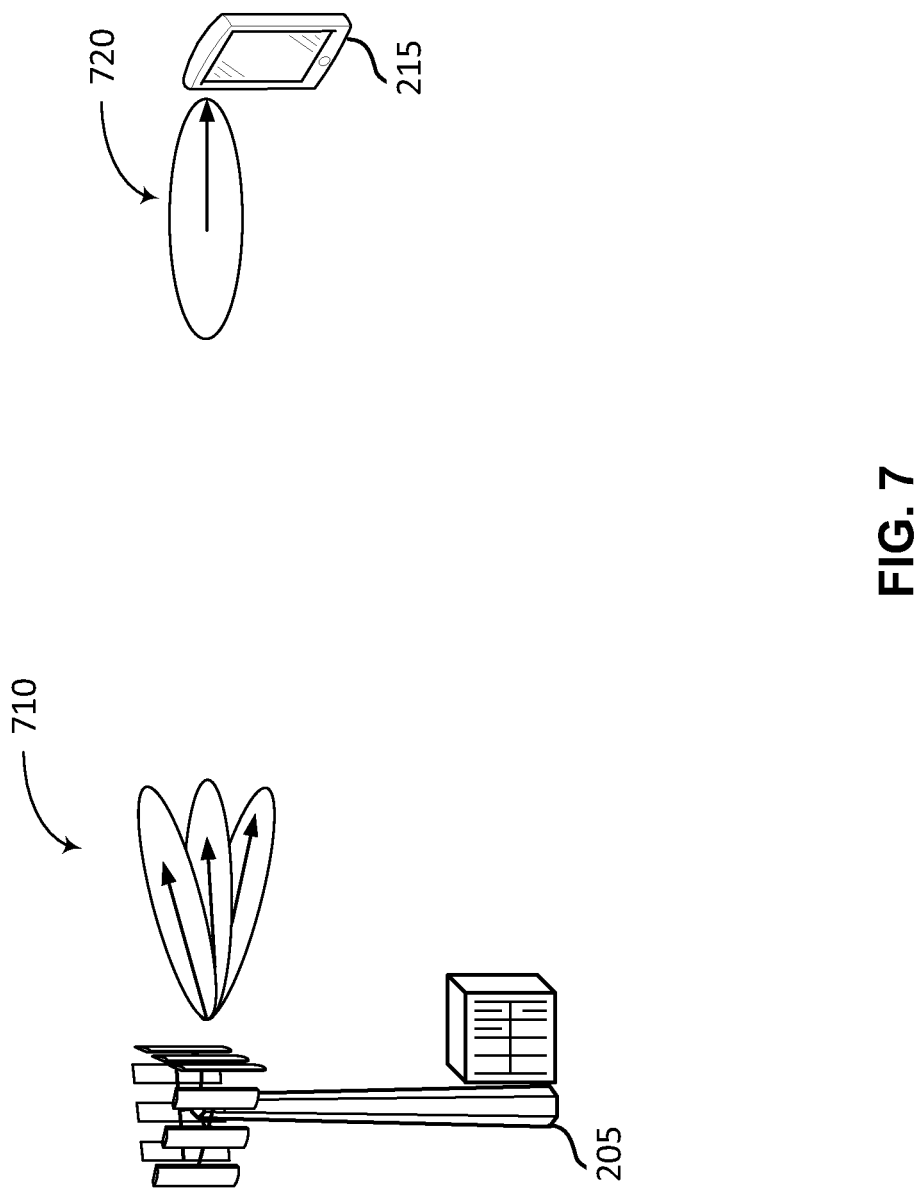
FIG. 7 illustrates an example of a second procedure for refining a transmit beam according to certain aspects of the present disclosure.

FIG. 7 illustrates an example of the second procedure P2. In this example, the base station 205 sweeps through a set of transmit beams 710 while the receive beam 720 at the UE 215 may be fixed. The transmit beams 710 in the second procedure P2 may be narrower in beamwidth than the transmit beams 610 in the first procedure P1 and may cover a narrower range (i.e., smaller spatial area) than the transmit beams 610 in the first procedure P1. The transmit beams 710 may be spatially close to the transmit beam selected in the first procedure P1. The receive beam 720 used in the second procedure P2 may be based on the receive beam selected in the first procedure P1.

As discussed above, the base station 205 sweeps through the transmit beams 710 during the second procedure P2. For each of the transmit beams 710, the base station 205 transmits an RS symbol and the UE 215 receives the RS symbol using the receive beam 720.

For each of the transmit beams 710, the DE 215 performs a signal measurement on the received RS symbol for the transmit beam. The signal measurement may measure RSRP, RSRQ, SINR, SNR, RSSI, or another parameter indicative of signal strength or quality. In one example, the DL 215 may transmit a report to the base station 205 indicating the transmit beam corresponding to the highest signal measurement (e.g., highest RSRP, highest RSRQ, highest SINR, highest SNR, highest RSSI, etc.) at the UE 215. Upon receiving the report, the base station 205 selects the indicated transmit beam for downlink communication with the UE 215.

Since the transmit beams 710 in the second procedure P2 may be narrower than the transmit beams 610 in the first procedure P1, the transmit beam selected in the second procedure P2 may be narrower than the transmit beam selected in the first procedure P1, and hence more refined.

FIG. 8 illustrates an example of the third procedure P3. In this example, the UE 215 sweeps through a set of receive beams 820 while the transmit beam 810 at the base station 205 may be fixed. The receive beams 820 in the third procedure P3 may be narrower in beamwidth than the receive beams 620 in the first procedure P1 and may cover a narrower range (i.e., smaller spatial area) than the receive beams 620 in the first procedure P1. The receive beams 820 may be spatially close to the receive beam selected in the first procedure P1. The transmit beam 810 used in the third procedure P3 may be based on the transmit beam selected in the second procedure P2.

During the third procedure, the base station 205 transmits an RS symbol multiple times using the transmit beam 810 while the UE 215 sweeps through the set of receive beams 820. For each transmission of the RS symbol, the UE 215 may receive the RS symbol using a different one of the receive beams 820.

For each of the receive beams 820, the UE 215 performs a signal measurement on the received RS symbol for the receive beam. The signal measurement may measure RSRP, RSRQ, SINR, SNR, RSSI, or another parameter indicative of signal strength or quality. The UE 215 may then select the receive beam with the highest signal measurement (e.g., highest RSRP, highest RSRQ, highest SINR, etc.) for downlink communication with the base station 205. In one example, the UE 215 may transmit a report to the base station 205 indicating the receive beam with the highest signal measurement. In another example, the DL 215 may omit transmitting the report to the base station 205.

Since the receive beams 820 in the third procedure P3 may be narrower than the receive beams 520 in the first procedure P1, the receive beam selected in the third procedure P3 may be narrower than the receive beam selected in the first procedure P1, and hence more refined.

Thus, procedures P1, P2 and P3 may be employed for downlink beam training to determine a beam pair for downlink communication between the base station 205 and the UE 215. A similar set of procedures referred to as procedures U1, U2 and U3 may be employed for uplink beam training to determine a beam pair for uplink communication between the UE 215 and the base station 205. Procedures U1, U2 and U3 may be similar to procedures P1, P2 and P3, respectively, with the roles of the UE 215 and the base station 205 reversed. More particularly, procedure U1 may be performed to select a transmit beam for the UE 215 and a receive beam for the base station 205 (e.g., following the procedure illustrated in FIG. 6 with the roles of the UE 215 and the base station 205 reversed). Procedure U2 may then be performed to refine the transmit beam at the UE 215 (e.g., following the procedure illustrated in FIG. 7 with the roles of the base station 205 and the UE 215 reversed). Procedure U3 may then be performed to refine the receive beam at the base station 205 (e.g., following the procedure illustrated in FIG. 8 with the roles of the base station 205 and the UE 215 reversed).

The UE 215 may be a multi-band UE capable of communicating with one or more base stations in multiple frequency bands (e.g., for increased bandwidth, increased quality of experience, increased reliability, etc.). In one example, the UE 215 may support communication in a first frequency band (hereinafter, "first band") and a second frequency band (hereinafter, "second band"). The first band and the second band may both be mmWave bands. In one example, the first band may be within frequency range 2 (FR2) and the second band may be within frequency range 4 (FR4). FR2 may have a frequency range of approximately 24.25-52.6 GHz and FR4 may have a frequency range of approximately 52.6-114.25 GHz. However, it is to be appreciated that the first band and the second band are not limited to the above exemplary frequency ranges. In certain aspects, the first band and the second band are above a frequency of 24.25 GHz (i.e., the lowest frequency in each of the first band and the second band is above 24.25 GHz). In certain aspects, the first band and the second band are nonoverlapping in frequency. In certain aspects, the first band and the second band are separated in frequency. For example, the first band and the second band may be separated by a frequency gap of at least 2 GHz, as a non-limiting example.

The UE 215 may employ carrier aggregation (CA) in which the UE 215 combines two or more carriers (e.g., for increased bandwidth). The carriers may also be referred to as component carriers or subcarriers. For example, the UE 215 may combine multiple carriers within the same frequency band (e.g., the first band or the second band) for intra-band carrier aggregation (CA). In this case, the carriers within the frequency band may be contiguous or non-contiguous. The UE 215 may also combine multiple carriers in multiple frequency bands (e.g., the first band and the second band) for inter-band carrier aggregation (CA). In this case, the inter-band CA may include one or more carriers in the first band and one or more carriers in the second band.

Figure 9:
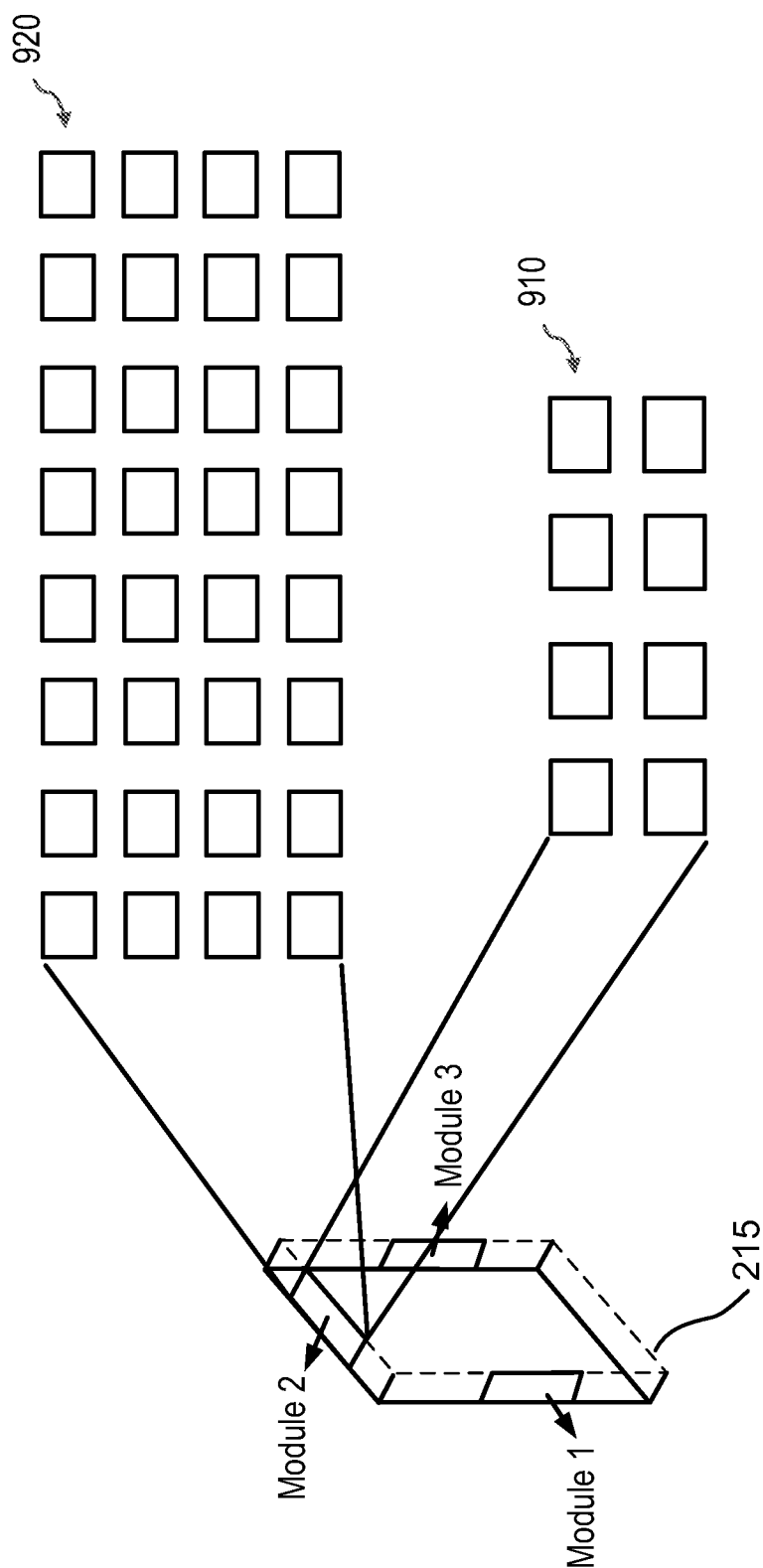
FIG. 9 shows an example of a multi-band UE according to certain aspects of the present disclosure.

FIG. 9 shows an example in which the UE 215 is a multi-band UE. In this example, the UE 215 includes a first antenna array 910 for the first band (e.g., FR2) and a second antenna array 920 for the second band (e.g., FR4). In FIG. 9, individual antenna elements (e.g., dual-polarized patch antenna elements) of an antenna array are represented by squares. The UE 215 may employ beamforming for the first band using the first antenna array 910 and employ beamforming for the second band using the second antenna array 920. The first antenna array 910 and the second antenna array 920 may have different sizes, different geometries, different numbers of antenna elements, different spacings between antenna elements, etc.

In certain aspects, the first antenna array 910 and the second antenna array 920 may share the same aperture of the UE 215 for transmitting and receiving signals. In one example, the first antenna array 910 and the second antenna array 920 may be located on a same antenna module. In this example, the module may include multiple substrate layers (e.g., on a printed circuit board), and the first antenna array 910 and the second antenna array 920 may be integrated on different substrate layers of the module. In another example, the first antenna array 910 and the second antenna array 920 may be located on different modules.

Figure 10:
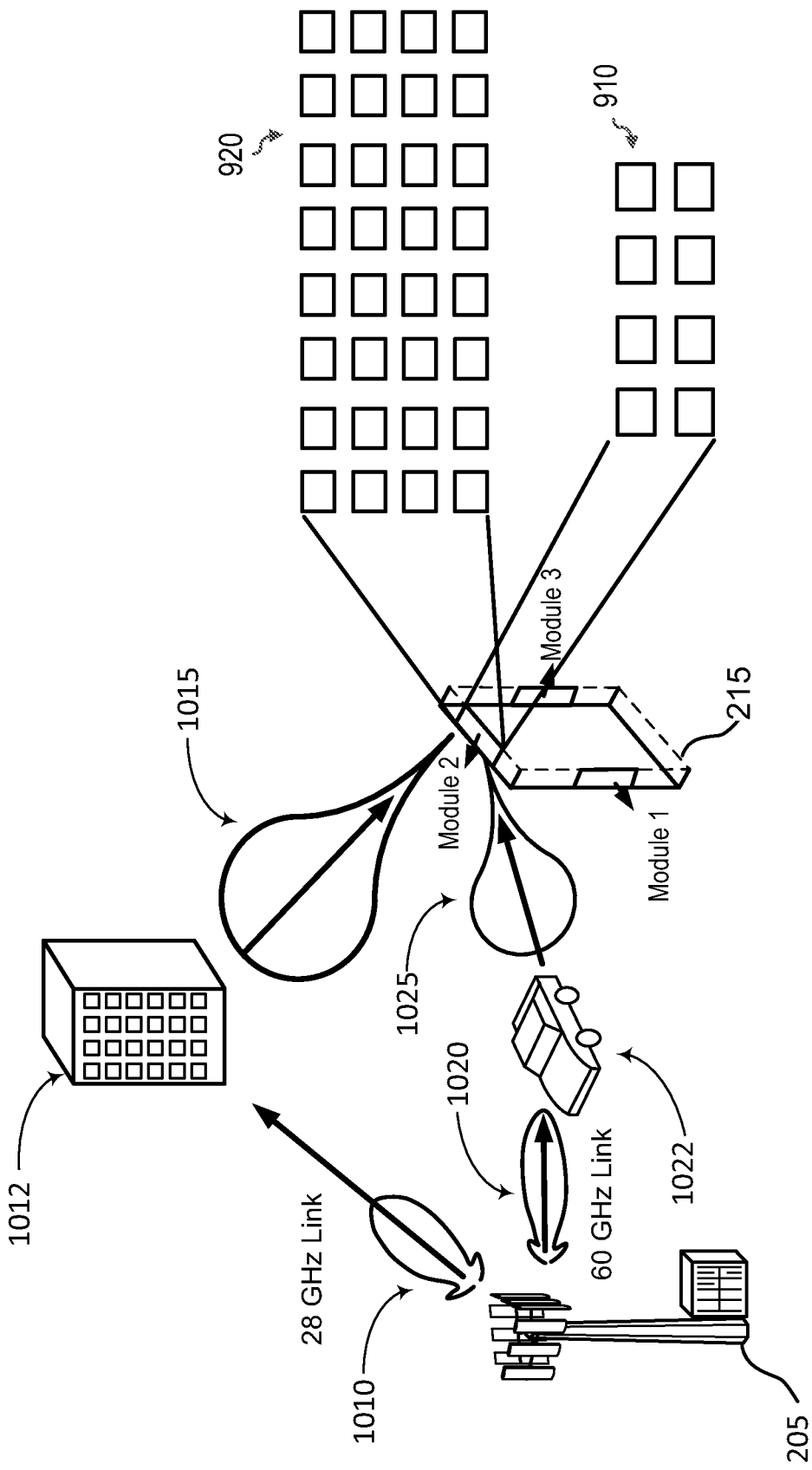
FIG. 10 shows an example of inter-band carrier aggregation for a single base station case according to certain aspects of the present disclosure.

The UE 215 may use inter-band CA to receive data from the base station 205 (e.g., gNB), an example of which is illustrated in FIG. 10. In the example in FIG. 10, the UE 215 receives signals in the first band (e.g., FR2) using the first antenna array 910 and receives signals in the second band (e.g., FR4) using the second antenna array 920.

In this example, the base station 205 transmits signals in the first band using a first transmit beam 1010 and the UE 215 receives signals in the first band using a first receive beam 1015. In the example in FIG. 10, the signals in the first band are reflected off a first object 1012 (e.g., glass window or metallic object in a building). However, it is to be appreciated that this need not be the case. In another example, the UE 215 may receive signals from the base station 205 in the first band via a direct/line-of-sight (LOS) path.

The base station 205 transmits signals in the second band using a second transmit beam 1020 and the UE 215 receives signals in the second band using a second receive beam 1025. In the example in FIG. 10, the signals in the second band are reflected off a second object 1022 (e.g., vehicle). However, it is to be appreciated that this need not be the case. In another example, the UE 215 may receive signals from the base station 205 in the second band via a direct/LOS path.

As shown in FIG. 10, the first receive beam 1015 for the first band and the second receive beam 1025 for the second band may point in different directions (e.g., by performing beamforming independently for the first band and the second band using the first antenna array 910 and the second antenna array 920, respectively). The first receive beam 1015 and the second receive beam 1025 may also have different beamwidths. The first transmit beam 1010 and the second transmit beam 1020 may also have different directions and/or beamwidths. In this regard, the base station 205 may use different antenna arrays at the base station 205 for the first transmit beam 1010 and the second transmit beam 1020.

Thus, different beam pairs may be used for the first band and the second band, where the beam pair for the first band includes the first transmit beam 1010 and the first receive beam 1015 and the beam pair for the second band includes the second transmit beam 1020 and the second receive beam 1025. The different beam pairs for the first band and the second band may be due to, for example, differences in channel conditions or requirements or capabilities for the first band and the second band, differences in the first antenna array 910 and the second antenna array 920, etc.

Figure 11:
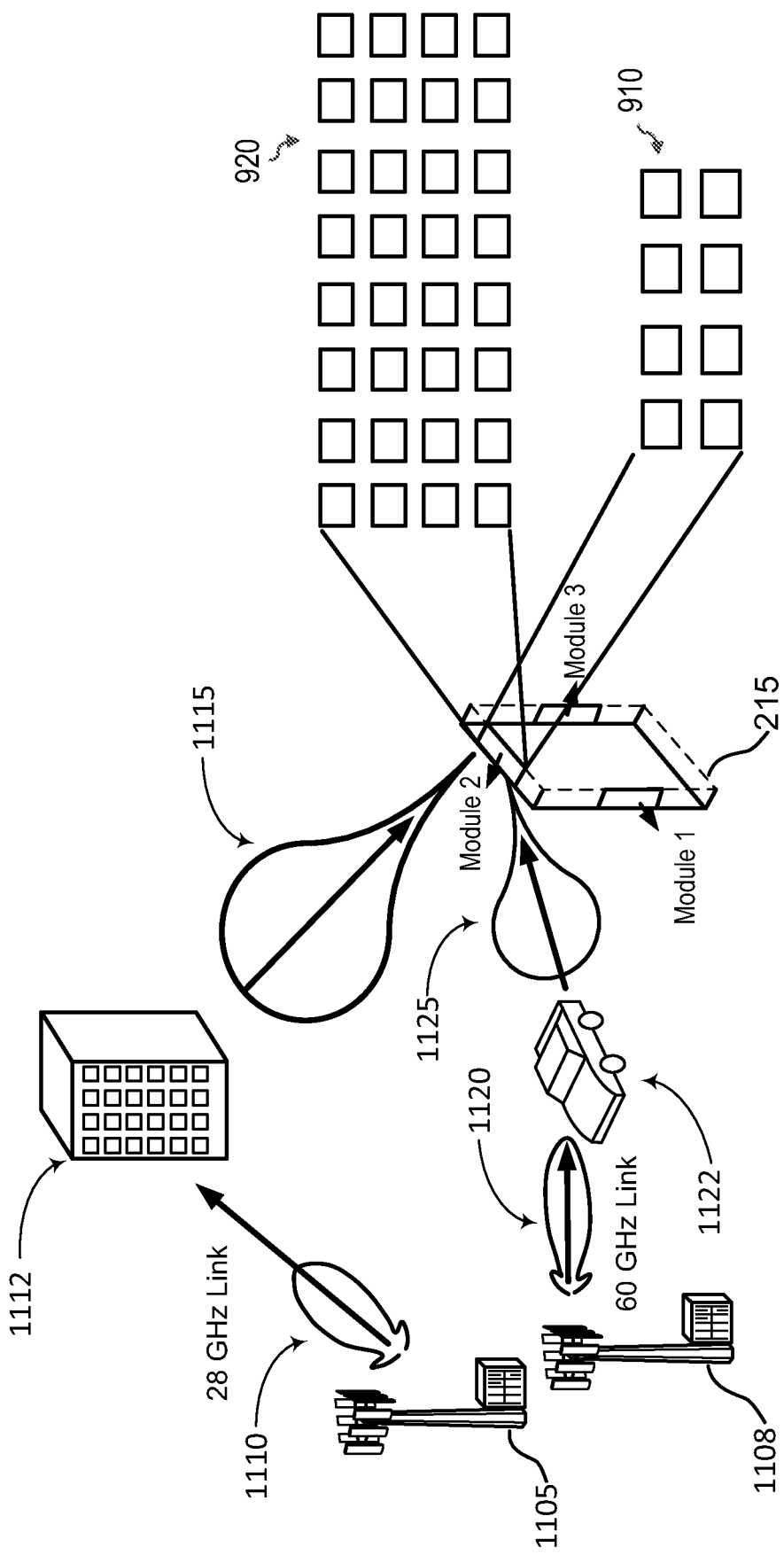
FIG. 11 shows an example of inter-band carrier aggregation for a multiple base station case according to certain aspects of the present disclosure.

The UE 215 may also use inter-band CA to receive data from multiple base stations (e.g., transmission reception points (TRPs)), an example of which is illustrated in FIG. 11. In this example, the UE 215 receives signals in the first band (e.g., FR2) from a first base station 1105 using the first antenna array 910 and receives signals in the second band (e.g., FR4) from a second base station 1108 using the second antenna array 920. The first base station 1105 may correspond to one of the base stations 105 in FIG. 1 and the second base station 1108 may correspond to another one of the base stations 105 in FIG. 1.

In this example, the first base station 1105 transmits signals in the first band using a first transmit beam 1110 and the UE 215 receives signals in the first band using a first receive beam 1115. In the example in FIG. 11, the signals in the first band are reflected off a first object 1112 (e.g., glass window or metallic object in a building). However, it is to be appreciated that this need not be the case. In another example, the UE 215 may receive signals from the first base station 1105 in the first band via a direct/LOS path.

The second base station 1108 transmits signals in the second band using a second transmit beam 1120 and the UE 215 receives signals in the second band using a second receive beam 1125. In the example in FIG. 11, the signals in the second band are reflected off a second object 1122 (e.g., vehicle). However, it is to be appreciated that this need not be the case. In another example, the UE 215 may receive signals from the second base station 1108 in the second band via a direct/LOS path.

As shown in FIG. 11, the first receive beam 1115 for the first band and the second receive beam 1125 for the second band may point in different directions (e.g., by performing beamforming independently for the first band and the second band using the first antenna array 910 and the second antenna array 920, respectively). The first receive beam 1115 and the second receive beam 1125 may also have different beamwidths. The first transmit beam 1110 and the second transmit beam 1120 may also have different directions and/or beamwidths.

Thus, different beam pairs may be used for the first band and the second band, where the beam pair for the first band includes the first transmit beam 1110 and the first receive beam 1115 and the beam pair for the second band includes the second transmit beam 1120 and the second receive beam 1125. The different beam pairs for the first band and the second band may be due to, for example, differences in channel conditions or requirements or capabilities for the first band and the second band, differences in the first antenna array 910 and the second antenna array 920, differences in the positions of the first base station 1105 and the second base station 1108 relative to the UE 215, etc.

Thus, inter-band CA may be used to transmit data to the UE 215 using carriers across multiple bands (e.g., the first band and the second band), in which a different beam pair may be used for each of the bands. Accordingly, methods for inter-band CA beam training are desirable to support inter-band CA.

Inter-band CA beam training will now be described according to aspects of the present disclosure. The inter-band CA beam training determines a first beam pair for the first band and a second beam pair for the second band.

In certain aspects, the UE 215 determines a number of RS symbols for inter-band CA beam training and sends a message to one or more base stations indicating the number of RS symbols. The number of RS symbols may include a first number of RS symbols for beam training in the first band and a second number of RS symbols for beam training in the second band, as discussed further below.

In one example, the UE 215 may determine the number of RS symbols for each band based on the antenna array size or geometry for each band. For example, the UE 215 may determine a larger number of RS symbols for a larger antenna array (e.g., larger number of antenna elements) than a smaller antenna array (e.g., smaller number of antenna elements). Because the first antenna array 910 (which is used for the first band) and the second antenna array 920 (which is used for the second band) may have different sizes and/or geometries, the UE 215 may determine a different number of RS symbols for the first band and the second band.

In another example, the UE 215 may determine the number of RS symbols for each band based on a power level of the UE 215. For example, if the UE 215 is operating in at a low power level to conserve power (e.g., due to a low battery), then the UE 215 may determine a smaller number of RS symbols for each band compared with a normal power level.

In another example, the UE 215 may determine the number of RS symbols for each band based on a temperature of the UE 215, which may be sensed by one or more temperature sensors (also referred to as thermal sensors) in the UE 215. In this example, the UE 215 may determine a smaller number of RS symbols for each band if the sensed temperature is above a thermal threshold to prevent the UE 215 from overheating, and determine a larger number of RS symbols for each band if the sensed temperature is below the thermal threshold.

In yet another example, the UE 215 may determine the number of RS symbols for each band based on the mobility (e.g., velocity) of the UE 215. The mobility of the UE 215 may be determined using a sensor (e.g., accelerometer) in the UE 215. In this example, the UE 215 may determine a smaller number of RS symbols for each band if the sensed mobility (e.g., velocity) is above a threshold. A smaller number of symbols may be used when the mobility is above the threshold compared with the case when the mobility is below the threshold in order to complete the beam training faster since channel conditions may change faster for higher mobility scenarios.

In yet another example, the UE 215 may determine the number of RS symbols for each band based on the subcarrier spacing in the band. In this example, the UE 215 may determine a larger number of RS symbols for a larger subcarrier spacing than a smaller subcarrier spacing. In one example, the first band and the second band may have different subcarriers spacings. As a result, the UE 215 may determine a different number of RS symbols for the first band and the second band in this example. For example, the first band (e.g., FR2) may have a subcarrier spacing of 120 kHz and the second band (e.g., FR4) may have a subcarrier spacing of 240 kHz or greater. In this example, the UE 215 may determine a larger number of RS symbols for the second band than the first band. Also, in this example, the subcarrier spacing in the second band may be at least twice the subcarrier spacing in the first band.

The UE 215 may determine the number of RS symbols for each band based on any combination of the exemplary parameters discussed above. After determining the number of RS symbols for each band, the UE 215 may transmit a request message to one or more base stations (e.g., base station 205) indicating the number of RS symbols for the first band and the number of RS symbols for the second band.

The base station (e.g., base station 205) receives the request message from the UE 215. The base station then allocates RS symbols for beam training in the first band and RS symbols for beam training in the second band based on the request message. For example, the base station may allocate a number of RS symbols for the first band that is equal to the number of RS symbols for the first band indicated in the request message. Similarly, the base station may allocate a number of RS symbols for the second band that is equal to the number of RS symbols for the second band indicated in the request message.

In certain aspects, the base station may allocate a first set of RS symbols within one or more slots for beam training in the first band, in which each of the RS symbols allocated for the first band corresponds to one of the RS symbols of the first set of RS symbols. The first set of RS symbols may be contiguous in which case the RS symbols in the first band are contiguous. The number of RS symbols of the first set of RS symbols may be equal to the number of RS symbols for the first band indicated in the request message.

The base station may also allocate a second set of RS symbols within one or more slots for beam training in the second band, in which each of the RS symbols allocated for the second band corresponds to one of the RS symbols of the second set of RS symbols. The second set of RS symbols may be contiguous so that the RS symbols in the second band are contiguous. The number of RS symbols of the second set of RS symbols may be equal to the number of RS symbols for the second band indicated in the request message.

In certain aspects, the symbol duration for the second band may be different from the symbol duration for the first band. In this case, the duration of one symbol for the second band is different from the duration of one symbol for the first band.

In certain aspects, the base station times the first set of RS symbols and the second set of RS symbols so that the first set of RS symbols overlaps the second set of RS symbols in time. This way, the RS symbols in the first band and the RS symbols in the second band overlap in time, allowing beam training for the first band and beam training for the second band to be performed simultaneously, as discussed further below.

Figure 12:
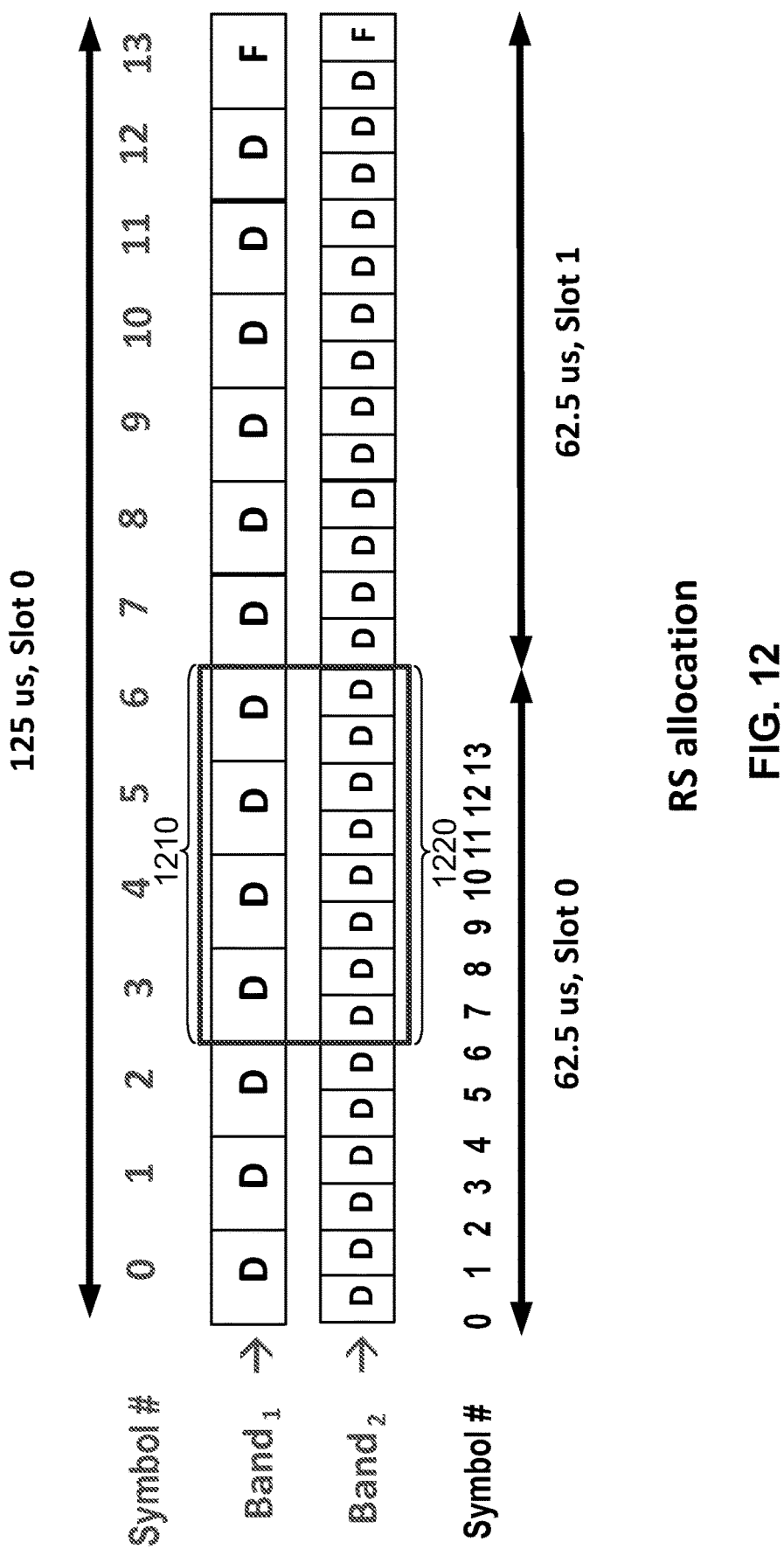
FIG. 12 illustrates symbol allocation for inter-band beam training according to certain aspects of the present disclosure.

FIG. 12 shows an example of the first set of RS symbols 1210 allocated for beam training in the first band and the second set of RS symbols 1220 allocated for beam training in the second band. The first set of RS symbols 1210 overlaps the second set of RS symbols 1220 for simultaneous RS transmissions across the first band and the second band. In this example, the base station allocates four RS symbols for beam training in the first band ($Band_1$) and eight RS symbols for beam training in the second band ($Band_2$). Also, in this example, the symbol duration for the second band (e.g., FR4) is half the symbol duration for the first band (e.g., FR2). As a result, in this example, the duration of one symbol in the second band is half the duration of one symbol in the first band. However, it is to be appreciated that the present disclosure is not limited to this example. In one example, the duration of one symbol in the first set of RS symbols is at least twice the duration of one symbol in the second set of RS symbols.

In the example in FIG. 12, the first set of RS symbols 1210 may be located within a time slot (e.g., slot 0) for the first band, which may have a duration of 125 µs. In this example, the time slot includes 14 symbols of which four are allocated for RS symbols in the first band. Similarly, the second set of RS symbols 1220 may be located within a time slot (e.g., slot 0) for the second band, which may have a duration of 62.5 µs. In this example, the time slot includes 14 symbols of which eight are allocated for RS symbols in the second band. Each symbol in a time slot may be identified by a respective symbol number (e.g., a respective one of symbol numbers 0 to 13 for the example where a time slot includes 14 symbols). In the example in FIG. 12, the four RS symbols allocated for the first band correspond to symbols 3-6 of the time slot for the first band, and the eight RS symbols allocated for the second band correspond to symbols 6-13 of the time slot for the second band.

After allocating the first set of RS symbols for beam training in the first band and the second set of RS symbols for beam training in the second band, the base station may transmit a message to the UE 215 indicating the first set of RS symbols and the second set of RS symbols. For the example in which the symbols in the first set of RS symbols are indicated by symbol numbers in a time slot for the first band, the message may indicate the first set of RS symbols by indicating the corresponding symbol numbers (e.g., symbols 3-6). Similarly, for the example in which the symbols in the second set of RS symbols are indicated by symbol numbers in a time slot for the second band, the message may indicate the second set of RS symbols by indicating the corresponding symbol numbers (e.g., symbols 6-13).

The UE 215 receives the message from the base station 205. The UE 215 determines the timing of the RS symbols for beam training in the first band and the timing of the RS symbols for beam training in the second band based on the message. For example, the UE 215 may determine the first set of RS symbols based on the indication of the first set of RS symbols in the message, and determine the second set of RS symbols based on the indication of the second set of RS symbols in the message.

Beam training for the first band and the second band may then be performed simultaneously. Performing the beam training simultaneously for the first band and the second band takes into account effects transmissions in the first band has on reception in the second band, and vice versa.

The beam training for the first band may be performed using the RS symbols allocated for the first band. The beam training for the first band may be similar to the first procedure P1 discussed above. In this example, the base station (e.g., base station 205) sweeps through a first set of transmit beams. Each transmit beam of the first set of transmit beams may point in a different direction. For each of the transmit beams, the base station may transmit a respective one of the RS symbols of the first set of RS symbols allocated for the first band. In other words, the base station transmits a first one of the RS symbols of the first set of RS symbols using a first one of the transmit beams in the first set of transmit beams, transmits a second one of the RS symbols of the first set of RS symbols using a second one of the transmit beams in the first set of transmit beams, and so on.

The UE 215 sweeps through a first set of receive beams. Each receive beam of the first set of receive beams may point in a different direction. For each of the receive beams, the UE 215 may receive a respective one of the RS symbols of the first set of RS symbols and perform a receive signal measurement (e.g., RSRP, RSRQ, SINR, SNR, RSSI, etc.) on the received RS symbol. In other words, the UE 215 receives a first one of the RS symbols of the first set of RS symbols using a first one of the receive beams in the first set of receives beams, receives a second one of the RS symbols of the first set of RS symbols using a second one of the receive beams in the first set of receive beams, and so on.

The beam sweeping at the base station and the beam sweeping at the UE 215 are coordinated such that, for each one of multiple beam pairs for the first band, the base station transmits one of the RS symbols allocated for the first band and the UE 215 receives the RS symbol.

For each one of the multiple beam pairs, the UE 215 may perform a signal measurement on the received RS symbol for the beam pair. The signal measurement may measure RSRP, RSRQ, SINR, SNR, RSSI, or another parameter indicative of signal strength or quality. In one example, the UE 215 may transmit a report to the base station indicating the receive signal measurement for at least one of the RS symbols of the first set of RS symbols. Since the base station 205 knows which transmit beam the base station 205 transmitted for each RS symbol, the base station 205 may identify the transmit beams corresponding to the receive signal measurements in the report based on the RS symbols for the signal measurements in the report. In one example, the base station 205 may select the transmit beam of the first set of transmit beams corresponding to the RS symbol with the highest signal measurements (e.g., RSRP, RSRQ, SINR, SNE, RSSI, etc.) based on the report. Also, the UE 215 may select the receive beam corresponding to the RS symbol with the highest receive signal measurement. In this example, the selected transmit beam and selected receive beam constitute a selected beam pair for the first band. Thus, the beam training in the first band determines a beam pair for the first band.

The beam training for the second band may be performed using the RS symbols allocated for the second band. The beam training for the second band may be similar to first procedure P1 discussed above. Since the RS symbols for the second band overlap with the RS symbols for the first band in time, the beam training for the second band is performed simultaneously with the beam training for the first band discussed above. In this example, the base station (e.g., base station 205) sweeps through a second set of transmit beams. Each transmit beam of the second set of transmit beams may point in a different direction. For each of the transmit beams, the base station may transmit a respective one of the RS symbols of the second set of RS symbols. In other words, the base station transmits a first one of the RS symbols of the second set of RS symbols using a first one of the transmit beams in the second set of transmit beams, transmits a second one of the RS symbols of the second set of RS symbols using a second one of the transmit beams in the second set of transmit beams, and so on.

The UE 215 sweeps through a second set of receive beams. Each of the receive beams may point in a different direction. For each of the receive beams, the UE 215 may receive a respective one of the RS symbols of the second set of RS symbols and perform a signal measurement on the received RS symbol. In other words, the UE 215 receives a first one of the RS symbols of the second set of RS symbols using a first one of the receive beams in the second set of receives beams, receives a second one of the RS symbols of the second set of RS symbols using a second one of the receive beams in the second set of receive beams, and so on.

The second set of transmit beams may differ from the first set of transmit beams and the second set of receive beams may differ from the first set of receive beams (e.g., due to differences in the antennas arrays used for the first band and the second band). For example, the transmit beams in the second set of transmit beams may have narrower beamwidths than the transmit beams in the first set of transmit beams (e.g., for the case where a larger antenna array is used for the second band than the first band). Also, the receive beams in the second set of receive beams may have narrower beamwidths than the receive beams in the first set of receive beams (e.g., for the case where the second antenna array 920 has a larger number of antenna elements than the first antenna array 910).

The beam sweeping at the base station and the beam sweeping at the UE 215 are coordinated such that, for each one of multiple beam pairs for the second band, the base station transmits one of the RS symbols allocated for the second band and the UE 215 receives the RS symbol.

For each one of the multiple beam pairs, the UE 215 may perform a signal measurement on the received RS symbol for the beam pair. The signal measurement may measure RSRP, RSRQ, SINR, SNR, RSSI, or another parameter indicative of signal strength or quality. In one example, the UE 215 may transmit a report to the base station indicating the receive signal measurement for at least one of the RS symbols of the second set of RS symbols. Since the base station 205 knows which transmit beam the base station 205 transmitted for each symbol, the base station 205 may identify the transmit beams corresponding to the receive signal measurements in the report based on the RS symbols for the signal measurements in the report. In one example, the base station 205 may select the transmit beam of the second set of transmit beams corresponding to the RS symbol with the highest signal measurement (e.g., RSRP, RSRQ, SINR, SNR, RSSI, etc.) based on the report. Also, the UE 215 may select the receive beam corresponding to the RS symbol in the second set of RS symbols with the highest receive signal measurement. In this example, the selected transmit beam and selected receive beam constitute a selected beam pair for the second band. Thus, the beam training in the second band determines a beam pair for the second band.

Thus, in this example, inter-band CA beam training includes beam training for the first band to determine a beam pair for the first band and beam training for the second band to determine a beam pair for the second band, in which the beam training for the first band and the beam training for the second band may be performed simultaneously. The beam pair for the first band may be referred to as the first beam pair and the beam pair for the second band may be referred to as the second beam pair.

After the inter-band CA beam training discussed above is completed, inter-band CA transmit beam refinement may be performed according to aspects of the present disclosure to refine the transmit beam for the first band and refine the transmit beam for the second band. Any one of the following approaches discussed below may be adopted for inter-band CA transmit beam refinement.

Figure 13:
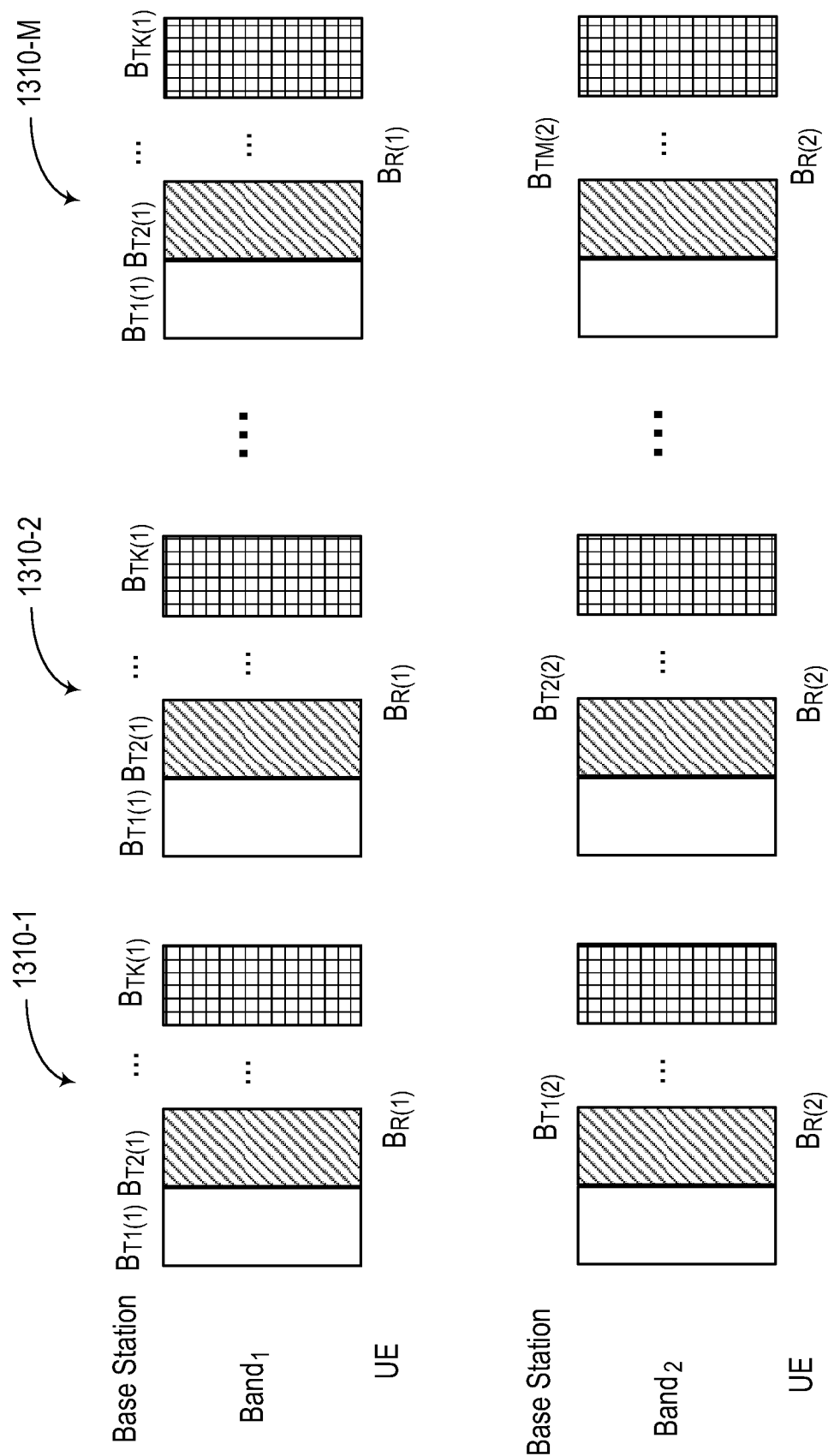
FIG. 13 illustrates a first exemplary approach for inter-band transmit beam refinement according to certain aspects of the present disclosure.

FIG. 13 illustrates a first approach for inter-band CA transmit beam refinement according to certain aspects. In this example, the base station (e.g., base station 205) sweeps through a set of K transmit beams for the first band M times and sweeps through a set of M transmit beams for the second band. Note that the set of K transmit beams is different from the first set of transmit beams used in the beam training discussed above. For example, the transmit beams in the set of K transmit beams may have narrower beamwidths and may cover a narrower range (i.e., smaller spatial area) than the transmit beams in the first set of transmit beams. The transmit beams in the set of K transmit beams may be spatially close to the transmit beam selected for the first band during the inter-band CA beam training discussed above.

The set of M transmit beams used for transmit beam refinement for the second band is different from the second set of transmit beams used in the beam training discussed above. For example, the transmit beams in the set of M transmit beams used may have narrower beamwidths and may cover a narrower range (i.e., smaller spatial area) than the transmit beams in the second set of transmit beams. The transmit beams in the set of M transmit beams may be spatially close to the transmit beam selected for the second band during the inter-band beam CA training discussed above.

During the inter-band CA transmit beam refinement, the UE uses a first receive beam for the first band and a second receive beam for the second band. The first receive beam may correspond to the receive beam selected for the first band and the second receive beam may correspond to the receive beam selected for the second band during the inter-band beam CA training discussed above.

In FIG. 13, the subscript T denotes a transmit beam and the subscript R denotes a receive beam. Also, the first subscript number is a beam index indicating one of the beams in a set of beams, and the number in parenthesis indicates the band. For example, $B_{T1(1)}$ indicates a first transmit beam in the set of K transmit beams for the first band, $B_{T2(1)}$ indicates a second transmit beam in the set of K transmit beams for the first band, and so on. $B_{R(1)}$ indicates the fixed receive beam for the first band and $B_{R(2)}$ indicates the fixed receive beam for the second band.

Inter-band CA transmit beam refinement according to the first approach will now be described with reference to FIG. 13 according to certain aspects.

During a first cycle 1310-1, the base station (e.g., base station 205) sweeps through the set of K transmit beams for the first band while the receive beam for the first band (i.e., the first receive beam) is fixed. For each of the K transmit beams, the base station may transmit an RS symbol and the UE 215 may receive the RS symbol using the fixed receive beam for the first band (i.e., the first receive beam) and perform a signal measurement RSRP, RSRQ, SINR, SNR, RSSI, etc.) on the received RS symbol. Also, during the first cycle 1310-1, the base station may transmit an RS symbol multiple times using the first one of the M transmit beams for the second band (i.e., $B_{T1(2)}$). For each of the transmissions, the UE 215 may receive the corresponding RS symbol using the fixed receive beam for the second band (i.e., the second receive beam) and perform a signal measurement (e.g., RSRP, RSRQ, SINR, SNR, RSSI, etc.) on the received symbol.

During a second cycle 1310-2, the base station switches to the second transmit beam for the second band (i.e., $B_{T2(2)}$) and repeats the above process using the second transmit beam for the second band in place of the first transmit beam for the second band (i.e., $B_{T1(2)}$) in the first cycle 1310-1.

For each subsequent cycle, the transmit beam for the second band switches to a next one of the transmit beams in the M set of transmit beams for the second band and the above process is repeated. As shown in FIG. 13, there are M cycles 1310-1 to 1310-M since there are M transmit beams in the set of M transmit beams for the second band.

After the Mth cycle 1310-M, the UE 215 may transmit a report to the base station base station 205) indicating the signal measurements (e.g., RSRP, RSRQ, SINR, SNR, RSSI, etc.) for the K set of transmit beams and the signal measurements for the M set of transmit beams. The report may include receive signal measurements for at least one of the transmit beams in the K set of transmit beams and the receive signal measurements for at least one of the transmit beams in the M set of transmit beams. Upon receiving the report, the base station 205 may select the transmit beam for the first band with the highest signal measurement (e.g., highest RSRP, highest RSRQ, highest SINR, highest SNR, highest RSSI, etc.) from among the transmit beams in the K set of transmit beams based on the report. The base station 205 may also select the transmit beam for the second band with the highest signal measurement (e.g., highest RSRP, highest RSRQ, highest SINR, highest SNR, highest RSSI, etc.) from among the transmit beams in the M set of transmit beams based on the report.

The selected transmit beam for the first band and the selected transmit beam for the second band may be used in inter-band CA communication between the base station and the UE 215.

Figure 14:
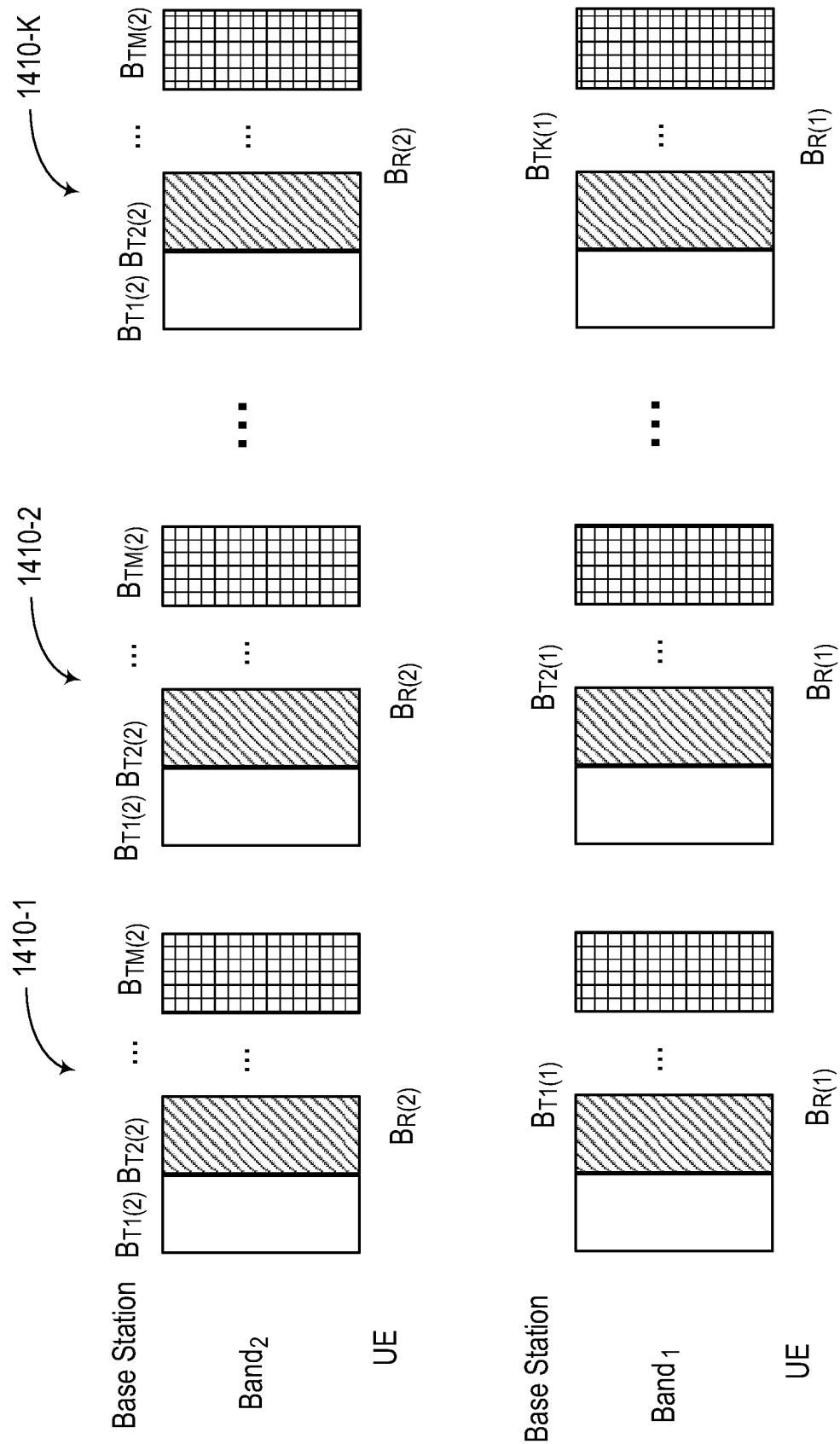
FIG. 14 illustrates a second exemplary approach for inter-band transmit beam refinement according to certain aspects of the present disclosure.

FIG. 14 illustrates a second approach for inter-band CA transmit beam refinement according to certain aspects. The second approach is similar to the first approach in which the roles of the first band and the second band are reversed.

During a first cycle 1410-1, the base station (e.g., base station 205) sweeps through the set of M transmit beams for the second band while the receive beam for the second band (i.e., the second receive beam) is fixed. For each of the M transmit beams, the base station may transmit an RS symbol and the UE 215 may receive the RS symbol using the fixed receive beam for the second band and perform a signal measurement RSRP, RSRQ, SINR, SNR, RSSI, etc.) on the received RS symbol. Also, during the first cycle 1410-1, the base station may transmit an RS symbol multiple times using the first one of the K transmit beams for the first band (i.e., $B_{T1(1)}$). For each of the transmissions, the UE 215 may receive the corresponding RS symbol using the fixed receive beam for the first band and perform a signal measurement (e.g., RSRP, RSRQ, SINR, SNR, RSSI, etc.) on the received symbol.

During a second cycle 1410-2, the base station switches to the second transmit beam for the first band (i.e., $B_{T2(1)}$) and repeats the above process using the second transmit beam for the first beam in placed of the first transmit beam for the first band $B_{T1(1)}$) in the first cycle 1410-1.

For each subsequent cycle, the transmit beam for the first band switches to a next one of the transmit beams in the K set of transmit beams for the first band and the above process is repeated. As shown in FIG. 14, there are K cycles 1410-1 to 1410-K since there are K transmit beams in the set of K transmit beams for the first band.

After the Kth cycle 1410-K, the UE 215 may transmit a report to the base station (e.g., base station 205) indicating the signal measurements RSRP, RSRQ, SINR, SNR, RSSI, etc.) for the K set of transmit beams and the signal measurements for the M set of transmit beams. The report may include receive signal measurements for at least one of the transmit beams in the K set of transmit beams and the receive signal measurements for at least one of the transmit beams in the M set of transmit beams. Upon receiving the report, the base station 205 may select the transmit beam for the first band with the highest signal measurement (e.g., highest RSRP, highest RSRQ, highest SINR, SNR, RSSI, etc.) from among the transmit beams in the K set of transmit beams based on the report. The base station 205 may also select the transmit beam for the second band with the highest signal measurement (e.g., highest RSRP, highest RSRQ, highest SINR, highest SNR, highest RSSI, etc.) from among the transmit beams in the M set of transmit beams based on the report.

The selected transmit beam for the first band and the selected transmit beam for the second band may be used in inter-band CA communication between the base station and the UE 215.

Figure 15:
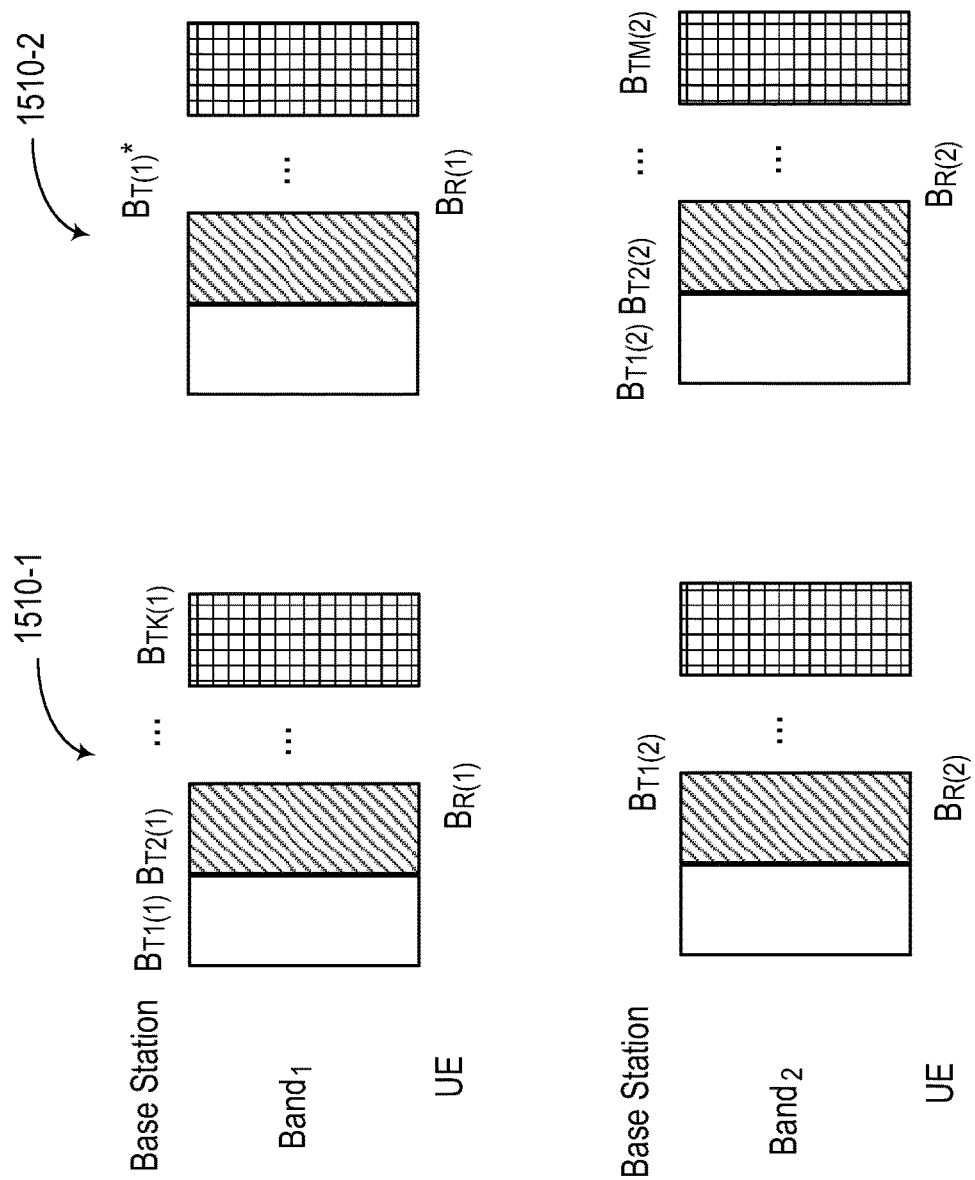
FIG. 15 illustrates a third exemplary approach for inter-band transmit beam refinement according to certain aspects of the present disclosure.

FIG. 15 illustrates a third approach for inter-band CA transmit beam refinement according to certain aspects. The third approach may determine the transmit beam for the first band, and then use the determined transmit beam for the first band to determine the transmit beam for the second band, as discussed further below.

During a first cycle 1510-1, the base station (e.g., base station 205) sweeps through the set of K transmit beams for the first band while the receive beam for the first band (i.e., the first receive beam) is fixed. For each of the K transmit beams, the base station may transmit an RS symbol and the UE 215 may receive the RS symbol using the fixed receive beam for the first band and perform a signal measurement (e.g., RSRP, RSRQ, SINR, SNR, RSSI, etc.) on the received RS symbol. Also, during the first cycle 1510-1, the base station may transmit an RS symbol multiple times using one of the M transmit beams for the second band (e.g., $B_{T1(2)}$). For each of the transmissions, the UE 215 may receive the corresponding RS symbol using the fixed receive beam for the second band (i.e., the second receive beam) and perform a signal measurement (e.g., RSRP, RSRQ, SINR, SNR, RSSI, etc.) on the received symbol.

After the first cycle 1510-1, the UE 215 may transmit a report to the base station (e.g., base station 205) indicating the signal measurements (e.g., RSRP, RSRQ, SINR, SNT, RSSI, etc.) for at least one of the transmit beams in the K set of transmit beams. Upon receiving the report, the base station may select the transmit beam for the first band with the highest signal measurement (e.g., highest RSRP, highest RSRQ, highest SINR, highest SNR, highest RSSI, etc.) from among the transmit beams in the K set of transmit beams based on the report. The selected transmit beam for the first band is labeled "$B_{T(1)}*$" in FIG. 15.

During a second cycle 1510-2, the base station (e.g., base station 205) sweeps through the set of M transmit beams for the second band while the receive beam for the second band (i.e., the second receive beam) is fixed. For each of the M transmit beams, the base station may transmit an RS symbol and the UE 215 may receive the RS symbol using the fixed receive beam for the second band and perform a signal measurement RSRP, RSRQ, SINR, SNR, RSSI, etc.) on the received RS symbol. Also, during the second cycle 1510-2, the base station may transmit an RS symbol multiple times using the transmit beam determined for the first band in the first cycle 1510-1 (i.e., $B_{T(1)}*$).

After the second cycle 1510-2, the UE 215 may transmit a report to the base station (e.g., base station 205) indicating the signal measurements (e.g., RSRP, RSRQ, SINR, SNR, RSSI, etc.) for at least one of the transmit beams in the M set of transmit beams. Upon receiving the report, the base station may select the transmit beam for the second band with the highest measurement (e.g., highest RSRP, highest RSRQ, highest SINR, NSR, RSSI, etc.) from among the transmit beams in the M set of transmit beams based on the report.

The selected transmit beam for the first band and the selected transmit beam for the second band may be used in inter-band CA communication between the base station and the UE 215.

Figure 16:
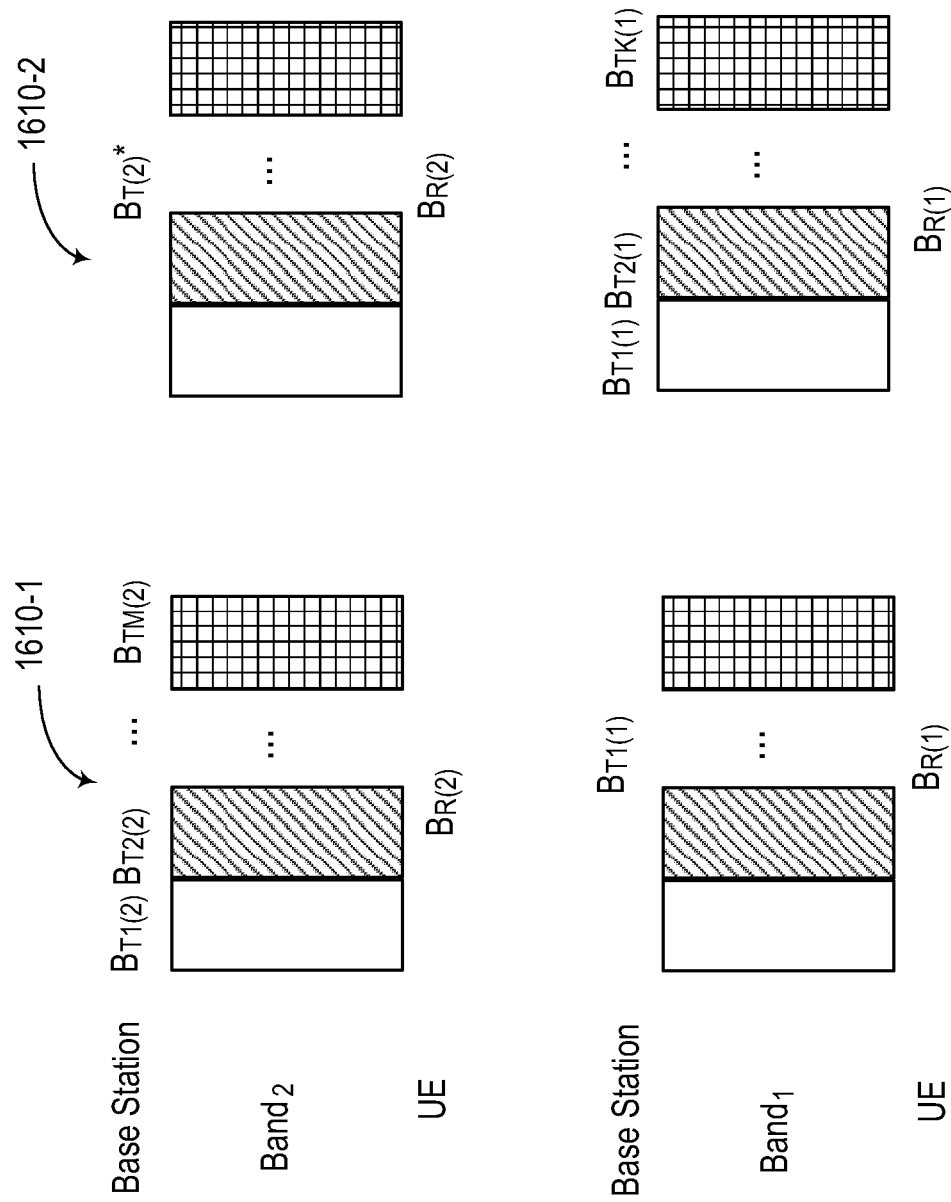
FIG. 16 illustrates a fourth exemplary approach for inter-band transmit beam refinement according to certain aspects of the present disclosure.

FIG. 16 illustrates a fourth approach for inter-band CA transmit beam refinement according to certain aspects. The fourth approach is similar to the third approach with the roles of the first band and the second band reversed.

During a first cycle 1610-1, the base station (e.g., base station 205) sweeps through the set of M transmit beams for the second band while the receive beam for the second band (i.e., the second receive beam) is fixed. For each of the M transmit beams, the base station may transmit an RS symbol and the UE 215 may receive the RS symbol using the fixed receive beam for the second band and perform a signal measurement (e.g., RSRP, RSRQ, SINR, SNR, RSSI, etc.) on the received RS symbol. Also, during the first cycle 1610-1, the base station may transmit an RS symbol multiple times using one of the K transmit beams for the first band (e.g., $B_{T1(1)}$). For each of the transmissions, the UE 215 may receive the corresponding RS symbol using the fixed receive beam for the first band (i.e., the first receive beam) and perform a signal measurement (e.g., RSRP, RSRQ, SINR, SNR, RSSI, etc.) on the received symbol.

After the first cycle 1610-1, the UE 215 may transmit a report to the base station (e.g., base station 205) indicating the signal measurements RSRP, RSRQ, SINR, SNR, RSSI, etc.) for at least one of the transmit beams in the M set of transmit beams. Upon receiving the report, the base station may select the transmit beam for the second band with the highest signal measurement (e.g., highest RSRP, highest RSRQ, highest SINR, etc.) from among the transmit beams in the M set of transmit beams based on the report. The selected transmit beam for the second band is labeled "$B_{T(2)}$*" in FIG. 16.

During a second cycle 1610-2, the base station (e.g., base station 205) sweeps through the set of K transmit beams for the first band while the receive beam for the first band (i.e., the second receive beam) is fixed. For each of the K transmit beams, the base station may transmit an RS symbol and the UE 215 may receive the RS symbol using the fixed receive beam for the first band and perform a signal measurement (e.g., RSRP, RSRQ, SINR, SNR, RSSI, etc.) on the received RS symbol. Also, during the second cycle 1610-2, the base station may transmit an RS symbol multiple times using the transmit beam determined for the second band in the first cycle 1610-1 (i.e., $B_{T(2)}$*).

After the second cycle 1610-2, the UE 215 may transmit a report to the base station e.g., base station 205) indicating the signal measurements RSRP, RSRQ, SINR, SNR, RSSI, etc.) for at least one of the K set of transmit beams. Upon receiving the report, the base station may select the transmit beam for the first band with the highest signal measurement (e.g., highest RSRP, highest RSRQ, highest SINR, highest SNR, highest RSSI, etc.) from among the transmit beams in the K set of transmit beams based on the report.

The selected transmit beam for the first band and the selected transmit beam for the second band may be used in inter-band CA communication between the base station and the UE 215.

Figure 17:
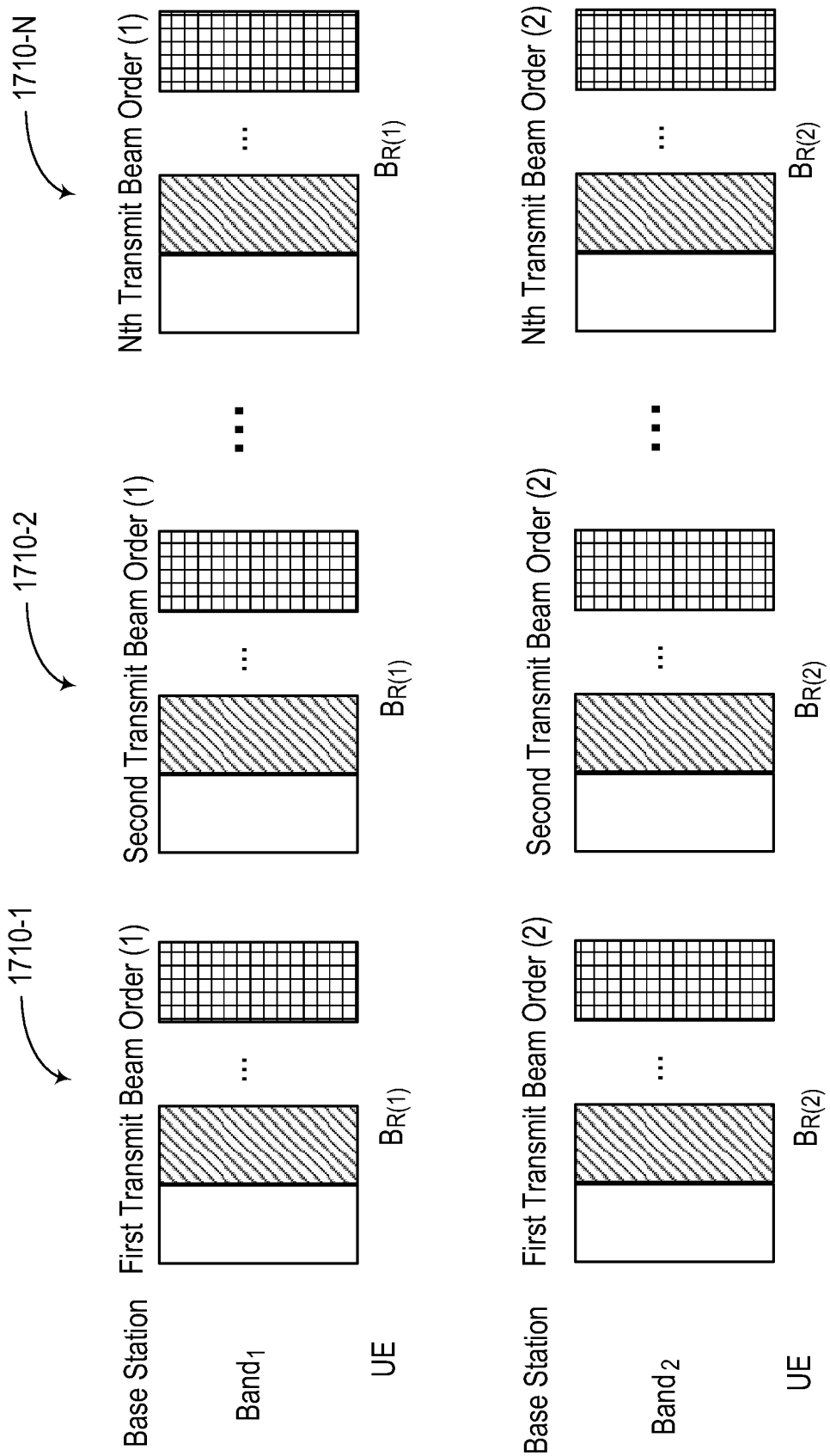
FIG. 17 illustrates a fifth exemplary approach for inter-band transmit beam refinement according to certain aspects of the present disclosure.

FIG. 17 illustrates a fifth approach for inter-band CA transmit beam refinement according to certain aspects.

During a first cycle 1710-1, the base station (e.g., base station 205) sweeps through the transmit beams for the first band in a first beam order for the first band while the receive beam for the first band is fixed. For each of the transmit beams, the base station may, transmit an RS symbol and the UE 215 may receive the RS symbol using the fixed receive beam for the first band and perform a signal measurement (e.g., RSRP, RSRQ, SINR, SNR, RSSI, etc.) on the received RS symbol. The first beam order for the first band may be predetermined, random, etc.

Also, during the first cycle 1710-1, the base station (e.g., base station 205) sweeps through the transmit beams for the second band in a first beam order for the second band while the receive beam for the second band is fixed. For each of the transmit beams, the base station may transmit an RS symbol and the UE 215 may receive the RS symbol using the fixed receive beam for the second band and perform a signal measurement (e.g., RSRP, RSRQ, SNR, RSSI, etc.) on the received RS symbol. The first beam order for the second band may be predetermined, random, etc. Note that the first beam order for the second band is not necessarily the same as the first beam order for the first band.

During a second cycle 1710-2, the base station repeats the above process using a second beam order for the first band and a second beam order for the second band. The second beam order for the first band may be the same as or different from the first beam order for the first band. The second beam order for the second band may be the same as or different from the first beam order for the second band.

The base station may repeat the above process for each of cycles 1710-3 to 1710-N, in which the beam order for the first band and the beam order for the second band may be the same in each cycle or may change from cycle to cycle.

After the Nth cycle 1710-N, the UE 215 may transmit a report to the base station (e.g., base station 205) indicating the signal measurements (e.g., RSRP, RSRQ, SINR, SNR, RSSI, etc.) for at least one of the transmit beams in the first band and signal measurements for at least one of the transmit beams in the second band. Upon receiving the report, the base station may select the transmit beam for the first band with the highest signal measurement (e.g., highest RSRP, highest RSRQ, highest SINR, highest SNR, highest RSSI, etc.) from among the transmit beams for the first band based on the report. The base station may also select the transmit beam for the second band with the highest signal measurement highest RSRP, highest RSRQ, highest SINR, highest SNR, highest RSSI, etc.) from among the transmit beams for the second band based on the report.

The selected transmit beam for the first band and the selected transmit beam for the second band may be used in inter-band CA communication between the base station and the UE 215.

In the above examples, a report may indicate the receive signal measurement for a transmit beam by indicating a time index (e.g., symbol) for the receive signal measurement. Since the base station knows when a particular transmit beam was used, the base station may identify the transmit beam corresponding to the receive signal measurement in the report from the time index.

After the inter-band transmit beam refinement is completed, inter-band CA receive beam refinement may be performed according to aspects of the present disclosure to refine the receive beam for the first band and refine the receive beam for the second band. Any one of the following approaches discussed below may be adopted for inter-band CA receive beam refinement.

Figure 18:
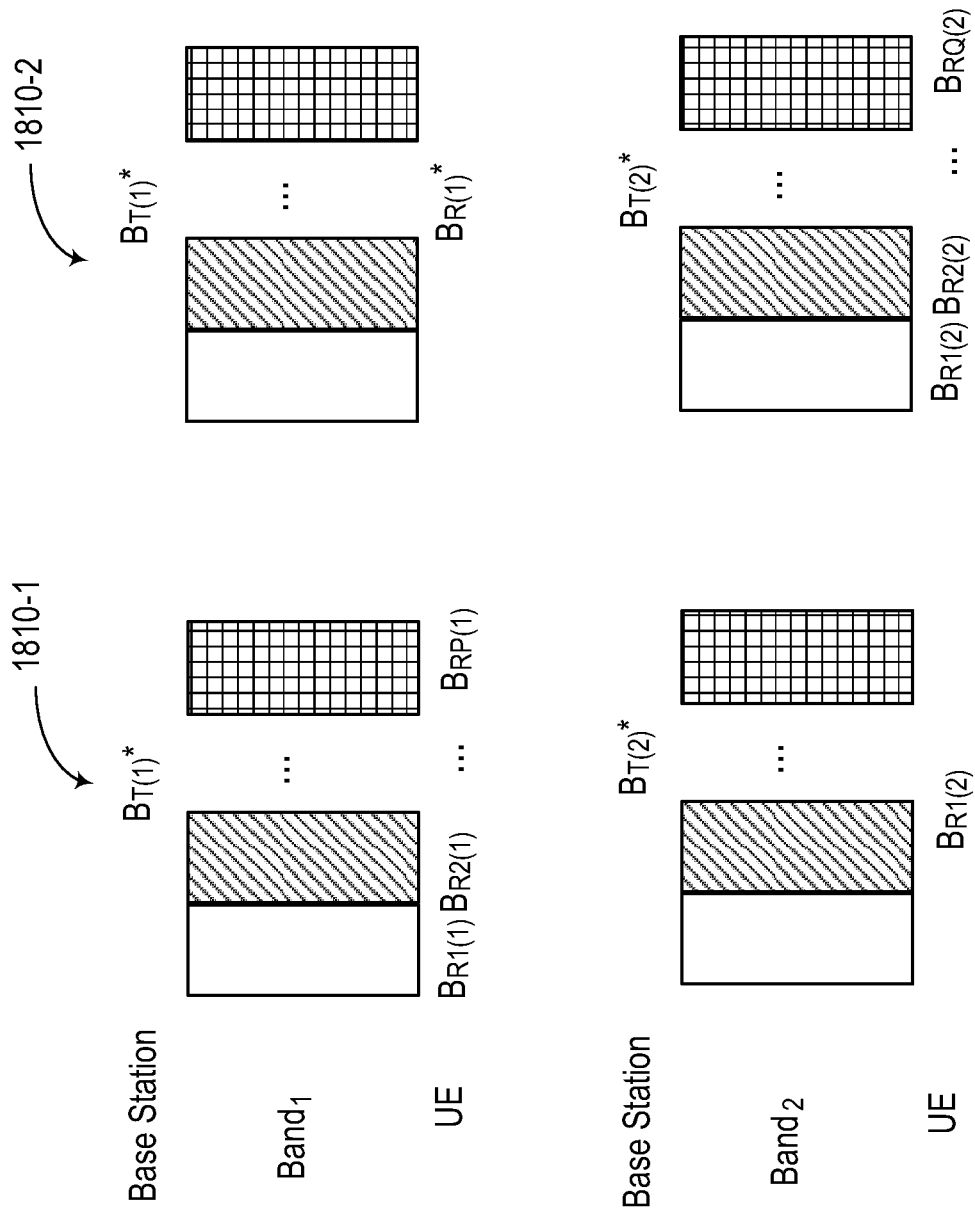
FIG. 18 illustrates a first exemplary approach for inter-band receive beam refinement according to certain aspects of the present disclosure.

FIG. 18 illustrates a first approach for inter-band CA receive beam refinement according to certain aspects. The first approach may determine the receive beam for the first band, and then determine the receive beam for the second band, as discussed further below.

During a first cycle 1810-1, the UE 215 sweeps through a set of P receive beams for the first band while the transmit beam for the first band is fixed. The receive beams in the set of P receive beams may have narrower beamwidths than the first set of receive beams used in the beam training discussed above. The transmit beam for the first beam may be the transmit beam selected for the first band during the transmit beam refinement discussed above (i.e., $B_{T(1)}$*). In this example, the base station may transmit an RS symbol multiple times using the fixed transmit beam for the first band. For each transmission, the UE 215 may receive the corresponding RS symbol using a different one of the beams in the set of P receive beams and perform a signal measurement (e.g., RSRP, RSRQ, SINR, SNR, RSSI, etc.) on the received RS symbol. Also, during the first cycle 1810-1, the base station may transmit an RS symbol multiple times using a fixed transmit beam for the second band. The transmit beam for the second band may be the transmit beam selected for the second band during the transmit beam refinement discussed above (i.e., $B_{T(2)}*$).

After the first cycle 1810-1, the UE 215 may select the receive beam for the first band with the highest signal measurement (e.g., highest RSRP, highest RSRQ, highest SINR, highest SNR, highest RSSI, etc.) from among the receive beams in the P set of receive beams. The selected receive beam for the first band is labeled "$B_{R(1)}*$" in FIG. 18. The UE 215 may also transmit a report to the base station indicating the signal measurements for at least one of the receive beams.

During a second cycle 1810-2, the UE 215 sweeps through a set of Q receive beams for the second band while the transmit beam (e.g., $B_{T(2)}*$) for the second band is fixed. The receive beams in the set of Q receive beams may have narrower beamwidths than the second set of receive beams used in the beam training discussed above. In this example, the base station may transmit an RS symbol multiple times using the fixed transmit beam for the second band. For each transmission, the UE 215 may receive the corresponding RS symbol using a different one of the beams in the set of Q receive beams and perform a signal measurement RSRP, RSRQ, SINR, SNR, RSSI, etc.) on the received RS symbol. Also, during the second cycle 1820-1, the base station may transmit an RS symbol multiple times using a fixed transmit beam for the first band and receive the RS symbols using the selected receive beam for the first band (i.e., $BR_{(1)}*$).

After the second cycle 1810-2, the UE 215 may select the receive beam for the second band with the highest signal measurement (e.g., highest RSRP, highest RSRQ, highest SINR, SNR, RSSI, etc.) from among the receive beams in the Q set of receive beams. The UE 215 may also transmit a report to the base station indicating the signal measurements for at least one of the receive beams.

The UE 215 may use the selected receive beam for the first band and the selected receive beam for the second band in inter-band CA communication between the base station and the UE 215, as discussed further below.

Figure 19:
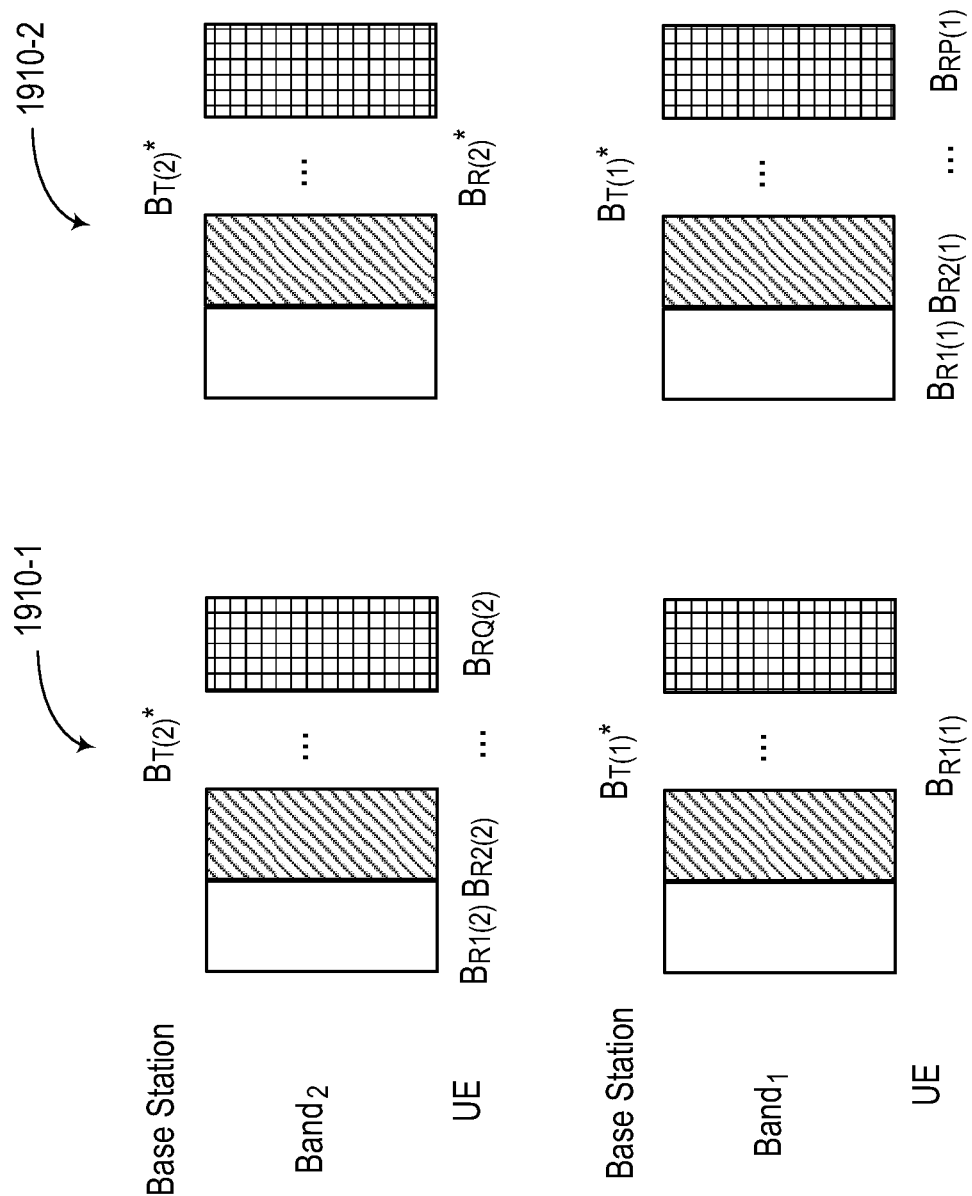
FIG. 19 illustrates a second exemplary approach for inter-band receive beam refinement according to certain aspects of the present disclosure.

FIG. 19 illustrates a second approach for inter-band CA receive beam refinement according to certain aspects. The second approach is similar to the first approach with the roles of the first band and the second band reversed, as discussed further below.

During a first cycle 1910-1, the UE 215 sweeps through the set of Q receive beams for the second band while the transmit beam for the second band is fixed. As discussed above, the transmit beam for the second band may be the transmit beam selected for the second band during the transmit beam refinement discussed above (i.e., $B_{T(2)}*$). In this example, the base station may transmit an RS symbol multiple times using the fixed transmit beam for the second band. For each transmission, the UE 215 may receive the corresponding RS symbol using a different one of the beams in the set of Q receive beams and perform a signal measurement RSRP, RSRQ, SINR, SNR, RSSI, etc.) on the received RS symbol. Also, during the first cycle 1910-1, the base station may transmit an RS symbol multiple times using a fixed transmit beam for the first band (e.g., $B_{T(1)}*$).

After the first cycle 1910-1, the UE 215 may select the receive beam for the second band with the highest signal measurement (e.g., highest RSRP, highest RSRQ, highest SINR, highest SNR, highest RSSI, etc.) from among the receive beams in the Q set of receive beams. The selected receive beam for the second band is labeled "$B_{R(2)}*$" in FIG. 19. The UE 215 may also transmit a report to the base station indicating the signal measurements for at least one the receive beams.

During a second cycle 1910-2, the UE 215 sweeps through the set of P receive beams for the first band while the transmit beam (e.g., $B_{T(1)}*$) for the first band is fixed. In this example, the base station may transmit an RS symbol multiple times using the fixed transmit beam for the first band. For each transmission, the UE 215 may receive the corresponding RS symbol using a different one of the beams in the set of P receive beams and perform a signal measurement (e.g., RSRP, RSRQ, SINR, SNR, RSSI, etc.) on the received RS symbol. Also, during the second cycle 1920-1, the base station may transmit an RS symbol multiple times using the fixed transmit beam for the second band and receive the RS symbols using the selected receive beam for the second band (i.e., $B_{R(2)}*$).

After the second cycle 1910-2, the UE 215 may select the receive beam for the first band with the highest signal measurement (e.g., highest RSRP, highest RSRQ, highest SINR, etc.) from among the receive beams in the P set of receive beams. The UE 215 may also transmit a report to the base station indicating the signal measurement for at least one of the receive beams.

The UE 215 may use the selected receive beam for the first band and the selected receive beam for the second band in inter-band CA communication between the base station and the UE 215.

Figure 20:
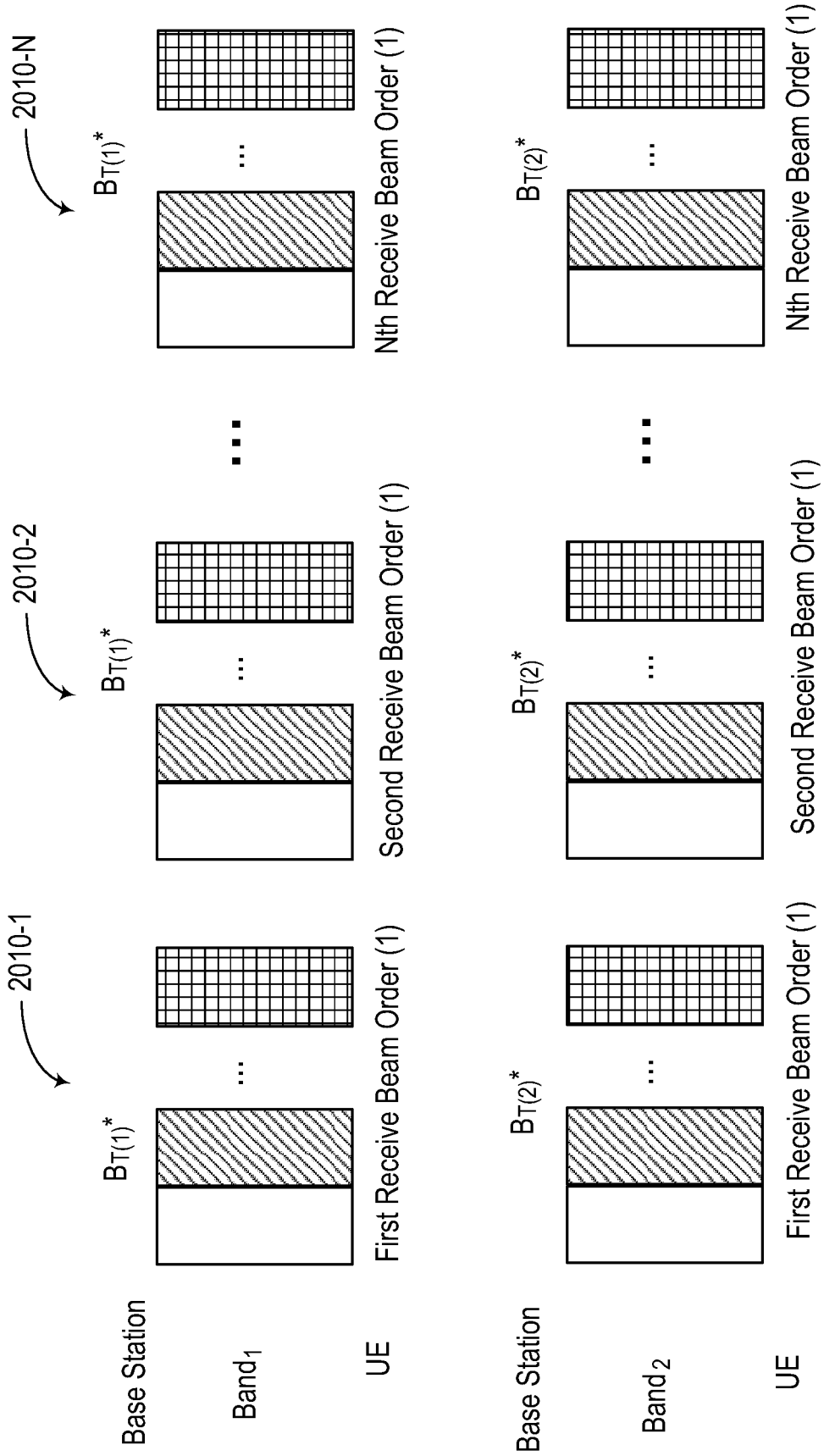
FIG. 20 illustrates a third exemplary approach for inter-band receive beam refinement according to certain aspects of the present disclosure.

FIG. 20 illustrates a third approach for inter-band CA receive beam refinement according to certain aspects.

During a first cycle 2010-1, the base station transmits an RS symbol multiple times using the transmit beam for the first band selected during transmit beam refinement (i.e., $B_{T(1)}*$) while the UE 215 sweeps through the receive beams for the first band in a first beam order for the first band. For each of the transmissions of the RS symbol, the UE 215 may receive the RS symbol using one of the receive beams for the first band and perform a signal measurement (e.g., RSRP, RSRQ, SINR, SNR, RSSI, etc.) on the received RS symbol. The first beam order for the first band may be predetermined, random, etc.

Also, during the first cycle 2010-1, the base station transmits an RS symbol multiple times using the transmit beam for the second band selected during transmit beam refinement (i.e., $B_{T(2)}$) while the UE 215 sweeps through the receive beams for the second band in a first beam order for the second band. For each of the transmissions of the RS symbol, the UE 215 may receive the RS symbol using one of the receive beams for the second band and perform a signal measurement (e.g., RSRP, RSRQ, SINR, SNR, RSSI, etc.) on the received RS symbol. The first beam order for the second band may be predetermined, random, etc. Note that the first beam order for the second band is not necessarily the same as the first beam order for the first band.

During a second cycle 2010-2, UE 215 repeats the above process using a second beam order for the first band and a second beam order for the second band. The second beam order for the first band may be the same as or different from the first beam order for the first band. The second beam order for the second band may be the same as or different from the first beam order for the second band.

The base station may repeat the above process for each one of cycles 2010-3 to 2010-N, in which the beam order for the first band and the beam order for the second band may be the same in each cycle or may change from cycle to cycle.

After the Nth cycle 2010-N, the UE 215 may select the receive beam for the first band with the highest measurement highest RSRP, highest RSRQ, highest SINR, highest SNR, highest RSSI, etc.) from among the receive beams for the first band, and select the receive beam for the second band with the highest signal measurement highest RSRP, highest RSRQ, highest SINR, highest SNR, highest RSSI, etc.) from among the receive beams for the second band.

The UE 215 may use the receive beam for the first band and the selected receive beam for the second band in inter-band CA communication between the base station and the UE 215.

After transmit beam refinement and receive beam refinement, the base station and the UE 215 may communicate using the selected transmit beams for the first band and second band and the selected receive beams for the first band and the second band. For example, the base station may transmit a data signal to the UE 215 using inter-band carrier aggregation in the first band and the second band, in which transmitting the data signal using the inter-band carrier aggregation includes transmitting a first portion of the data signal over one or more carriers (e.g., subcarriers) in the first frequency band using the selected transmit beam for the first band, and transmitting a second portion of the data signal over one or more carriers (e.g. subcarriers) in the second band using the selected transmit beam for the second band. The one or more carriers in the first band may be contiguous or non-contiguous, and the one or more carriers in the second band may be contiguous or non-contiguous.

The UE 215 may receive the data signal from the base station using inter-band carrier aggregation in the first band and the second band, in which receiving the data signal using the inter-band carrier aggregation includes receiving the first portion of the data signal over the one or more carriers in the first frequency band using the selected receive beam for the first band, and receiving the second portion of the data signal over the one or more carriers in the second band using the selected receive beam for the second band.

Exemplary inter-band CA beam training according to aspects of the present disclosure is discussed above for the example of the downlink. The exemplary inter-band beam training may also be used for the uplink with the roles of the base station and the UE 215 reversed, as discussed further below.

After the UE 215 receives the message from the base station indicating the first set of RS symbols and the second set of RS symbols, beam training for the first band may be performed using the RS symbols allocated for the first band. In this example, the UE 215 sweeps through a first set of transmit beams. Each transmit beam of the first set of transmit beams may point in a different direction. For each of the transmit beams, the UE 215 may transmit a respective one of the RS symbols of the first set of RS symbols allocated for the first band. In other words, the UE 215 transmits a first RS symbol one of the RS symbols of the first set of RS symbols using a first one of the transmit beams in the first set of transmit beams, transmits a second one of the RS symbols of the first set of RS symbols using a second one of the transmit beams in the first set of transmit beams, and so on.

The base station sweeps through a first set of receive beams. Each receive beam of the first set of receive beams may point in a different direction. For each of the receive beams, the base station may receive a respective one of the RS symbols of the first set of RS symbols and perform a receive signal measurement (e.g., RSRP, RSRQ, SINR, SNR, RSSI, etc.) on the received symbol. In other words, the base station receives a first one of the RS symbols of the first set of RS symbols using a first one of the receive beams in the first set of receive beams, receives a second one of the RS symbols of the first set of RS symbols using a second one of the receive beams in the first set of receive beams, and so on.

The beam sweeping at the base station and the beam sweeping at the UE 215 are coordinated such that, for each one of multiple beam pairs for the first band, the UE 215 transmits one of the RS symbols allocated for the first band and the base station receives the RS symbol.

For each one of the multiple beam pairs, the base station may perform a signal measurement on the received RS symbol for the beam pair. The signal measurement may measure RSRP, RSRQ, SINR, SNR, RSSI, or another parameter indicative of signal strength or quality. In one example, the base station may transmit a report to the UE 215 indicating the receive signal measurement for at least one of the symbols in the first set of RS symbols. Since the UE 215 knows which transmit beams the UE 215 transmitted for each RS symbol, the UE 215 may identify the transmit beams corresponding to the receive signal measurements in the report. In one example, the UE 215 may select the transmit beam of the first set of transmit beams corresponding to the RS symbol with the highest signal measurements (e.g., RSRP, RSRQ, SINR, SNR, RSSI, etc.) based on the report. Also, the base station may select the receive beam corresponding to the RS symbol in the first set of RS symbols with the highest receive signal measurement. In this example, the selected transmit beam and selected receive beam constitute a selected beam pair for the first band. Thus, the beam training in the first band determines a beam pair for the first band.

The beam training for the second band may be performed using the RS symbols allocated for the second band. Since the RS symbols for the second band overlap with the RS symbols for the first band in time, the beam training for the second band is performed simultaneously with the beam training for the first band discussed above. In this example, the UE 215 sweeps through a second set of transmit beams. Each transmit beam of the second set of transmit beams may point in a different direction. For each of the transmit beams, the UE 215 may transmit a respective one of the RS symbols of the second set of RS symbols. In other words, the UE 215 transmits a first one of the RS symbols of the second set of RS symbols using a first one of the transmit beams in the second set of transmit beams, transmits a second one of the RS symbols of the second set of RS symbols using a second one of the transmit beams in the second set of transmit beams, and so on.

The base station sweeps through a second set of receive beams. Each of the receive beams may point in a different direction. For each of the receive beams, the base station may receive a respective one of the RS symbols of the second set of RS symbols and perform a signal measurement on the received RS symbol. In other words, the base station receives a first one of the RS symbols of the second set of RS symbols using a first one of the receive beams in the second set of receives beams, receives a second one of the RS symbols of the second set of RS symbols using a second one of the receive beams in the second set of receive beams, and so on.

The second set of transmit beams may differ from the first set of transmit beams and the second set of receive beams may differ from the first set of receive beams due to differences in the antennas arrays used for the first band and the second band). For example, the transmit beams in the second set of transmit beams may have narrower beamwidths than the transmit beams in the first set of transmit beams. Also, the receive beams in the second set of receive beams may have narrower beamwidths than the receive beams in the first set of receive beams.

The beam sweeping at the base station and the beam sweeping at the UE 215 are coordinated such that, for each one of multiple beam pairs for the second band, the UE 215 transmits one of the RS symbols allocated for the second band and the base station receives the RS symbol.

For each one of the multiple beam pairs, the base station may perform a signal measurement on the received RS symbol for the beam pair. The signal measurement may measure RSRP, RSRQ, SINR, SNR, RSSI, or another parameter indicative of signal strength or quality. In one example, the base station may transmit a report to the LTE 215 indicating the receive signal measurement for at least one of the symbols in the second set of RS symbols. Since the UE 215 knows which transmit beam the UE 215 transmitted for each RS symbol, the UE 215 may identify the transmit beams corresponding to the receive signal measurements in the report. In one example, the 215 may select the transmit beam of the second set of transmit beams corresponding to the RS symbol with the highest signal measurement (e.g., RSRP, RSRQ, SINR, SNR, RSSI, etc.) based on the report. Also, the base station may select the receive beam corresponding to the RS symbol in the second set of RS symbols with the highest receive signal measurement. In this example, the selected transmit beam and selected receive beam constitute a selected beam pair for the second band. Thus, the beam training in the second band determines a beam pair for the second band.

After the inter-band beam training discussed above is completed, inter-band transmit beam refinement may be performed to refine the transmit beam at the UE 215 for the first band and refine the transmit beam at the UE 215 for the second band. The inter-band CA transmit beam refinement may be performed using any of the approaches illustrated in FIGS. 13-17 with the roles of the base station and the UE 215 reversed.

After inter-band CA transmit beam refinement, inter-band CA receive beam refinement may be performed to refine the receive beam at the base station for the first band and refine the receive beam at the base station for the second band. The inter-band receive beam refinement may be performed using any of the approaches illustrated in FIGS. 18-20 with the roles of the base station and the UE 215 reversed.

After transmit beam refinement and receive beam refinement, the base station and the UE 215 may communicate on an uplink using the selected transmit beams for the first band and second band and the selected receive beams for the first band and the second band. For example, the UE 215 may transmit a data signal to the base station using inter-band carrier aggregation in the first band and the second band, in which transmitting the data signal using the inter-band carrier aggregation includes transmitting a first portion of the data signal over one or more carriers in the first frequency band using the selected transmit beam for the first band, and transmitting a second portion of the data signal over one or more carriers in the second band using the selected transmit beam for the second band. The one or more carriers in the first band may be contiguous or non-contiguous, and the one or more carriers in the second band may be contiguous or non-contiguous.

The base station may receive the data signal from the UE 215 using inter-band carrier aggregation in the first band and the second band, in which receiving the data signal using the inter-band carrier aggregation includes receiving the first portion of the data signal over the one or more carriers in the first frequency band using the selected receive beam for the first band, and receiving the second portion of the data signal over the one or more carriers in the second band using the selected receive beam for the second band.

As discussed above with reference to FIG. 11, the UE 215 may receive data from or transmit data to multiple base stations using inter-band CA. In this example, inter-band CA beam training may be coordinated across multiple base stations. For example, the beam training for the first band may be performed by a first base station (e.g., base station 1105) and the beam training for the second band may be performed by a second base station (e.g., base station 1108). In this example, the first base station and the second base station may communicate with one another (e.g., over an X2 interface between the two base stations) in order to align the timing of the beam training for the first band and the timing of the beam training for the second band so that the beam training for the first band and the beam training for the second band are performed by the respective base stations simultaneously.

Figure 21:
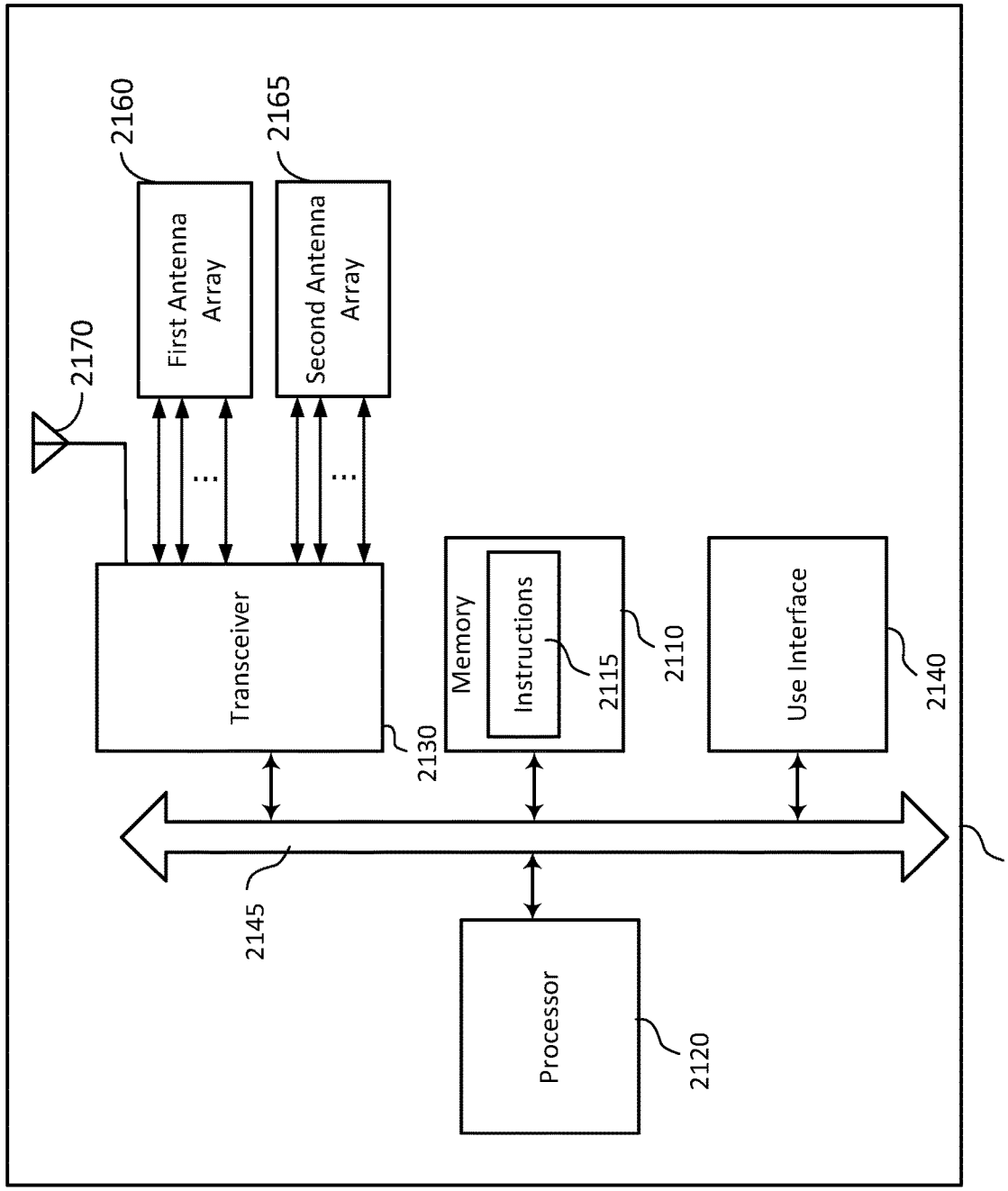
FIG. 21 shows an example device in which aspects of the present disclosure may be implemented.

FIG. 21 illustrates an example device 2100 according to certain aspects of the present disclosure. The device 2100 may be configured to operate in a base station (e.g., base station 205) or a UE (e.g., UE 215) and may be configured to perform one or more of the operations described herein. The device 2100 may include a processor 2120, a memory 2110, a transceiver 2130, a first antenna array 2160, a second antenna array 2165, one or more antennas 2170, and a user interface 2140. These components may be in electronic communication via one or more buses 2145.

The memory 2110 may store instructions 2115 that are executable by the processor 2120 to cause the device 2100 to perform one or more of the operations described herein. The processor 2120 may include a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or any combination thereof. The memory 2110 may include, by way of example, random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives, or any other suitable storage medium, or any combination thereof.

The transceiver 2130 is coupled to the first antenna array 2160 and the second antenna array 2165. The first antenna array 2160 may be configured to transmit and/or receive signals in the first band, and the second antenna array 2165 may be configured to transmit and/or receive signals in the second band. In the case of a UE (e.g., UE 215), the first antenna array 2160 may correspond to the first antenna array 910 and the second antenna array 2165 may correspond to the second antenna array 920. Each of the antenna arrays 2160 and 2165 comprises an array of antenna elements (not shown in FIG. 21). The first antenna array 2160 and the second antenna array 2165 may have different sizes, different geometries, different numbers of antenna elements, different spacing between antenna elements, etc.

The first antenna array 2160 allows the device 2100 to transmit signals in the first band with high directivity using any one of multiple transmit beams (e.g., the first set of transmit beams). In this regard, the transceiver 2130 may be configured to perform beam forming in which the transceiver 2130 electronically switches the first antenna array 2160 between the different transmit beams, e.g., by adjusting the phases between transmit signals output to individual antenna elements of the first antenna array 2160. The first antenna array 2160 may also allow the device 2100 to receive signals in the first band with high directivity using any one of multiple receive beams (e.g., the first set of receive beams) In this regard, the transceiver 2130 may be configured to perform beam forming in which the transceiver 2130 electronically switches the first antenna array 2160 between the different receive beams, e.g., by adjusting the phases between signals received from individual antenna elements of the first antenna array 2160.

The second antenna array 2165 allows the device 2100 to transmit signals in the second band with high directivity using any one of multiple transmit beams (e.g., the second set of transmit beams) In this regard, the transceiver 2130 may be configured to perform beam forming in which the transceiver 2130 electronically switches the second antenna array 2165 between the different transmit beams, e.g., by adjusting the phases between transmit signals output to individual antenna elements of the second antenna array 2165. The second antenna array 2165 may also allow the device 2100 to receive signals in the second band with high directivity using any one of multiple receive beams (e.g., the second set of receive beams) In this regard, the transceiver 2130 may be configured to perform beam forming in which the transceiver 2130 electronically switches the second antenna array 2165 between the different receive beams, e.g., by adjusting the phases between signals received from individual antenna elements of the second antenna array 2165.

The processor 2120 may control the beamforming for the first antenna array 2160 and the beamforming for the second antenna array 2160 by the transceiver 2130 via the bus 2145. For example, the processor 2120 may instruct the transceiver 2130 to sweep the first antenna array 2160 through a first set of transmit beams or receive beams and sweep the second antenna array 2165 through a second set of transmit beams or receive beams. The processor 2120 may also control the timing of the beam sweeps for the first antenna array 2160 and the second antenna array 2165 (e.g., to perform beam training for the first band and the second band simultaneously).

It is to be appreciated that the device 2100 may include additional antenna arrays (e.g., for other frequency bands).

The transceiver 2130 may also be coupled to the one or more antennas 2170 and may be configured to transmit and/or receive signals via the one or more antennas 2170 (e.g., in the first band, the second band, or another band). In certain aspects, the transceiver 2130 may transmit and/or receive signals via the one or more antennas 2170 in a sub 6 GHz band (e.g., for LTE communication) and transmit and/or receive signals via the antenna arrays 2160 and 2165 in mmWave bands (e.g., for NR communication). In certain aspects, the transceiver 2130 may transmit a message or a report via the one or more antennas 2170, the first antenna array 2160 or the second antenna array 2165. Similarly, the transceiver 2130 may receive a message or a report via the one or more antennas 2170, the first antenna array 2160 or the second antenna array 2165. Also, the transceiver 2130 may be configured to perform signal measurements on signals received via the first antenna array 2160, the second antenna array 2165, or the one or more antennas 2170, and communicate the signal measurements to the processor 2120 via the bus 2145.

In the case of a UE (e.g., UE 215), the device 2100 may include a user interface 2140 coupled to the processor 2120. The user interface 2140 may be configured to receive data from a user (e.g., via keypad, mouse, etc.) and provide the data to the processor 2120. The user interface 2140 may also be configured to output data from the processor 2120 to the user (e.g., via a display, a speaker, etc.). In this case, the data may undergo additional processing before being output to the user. In the case of a base station (e.g., base station 205), the user interface 2140 may be omitted.

Figure 22:
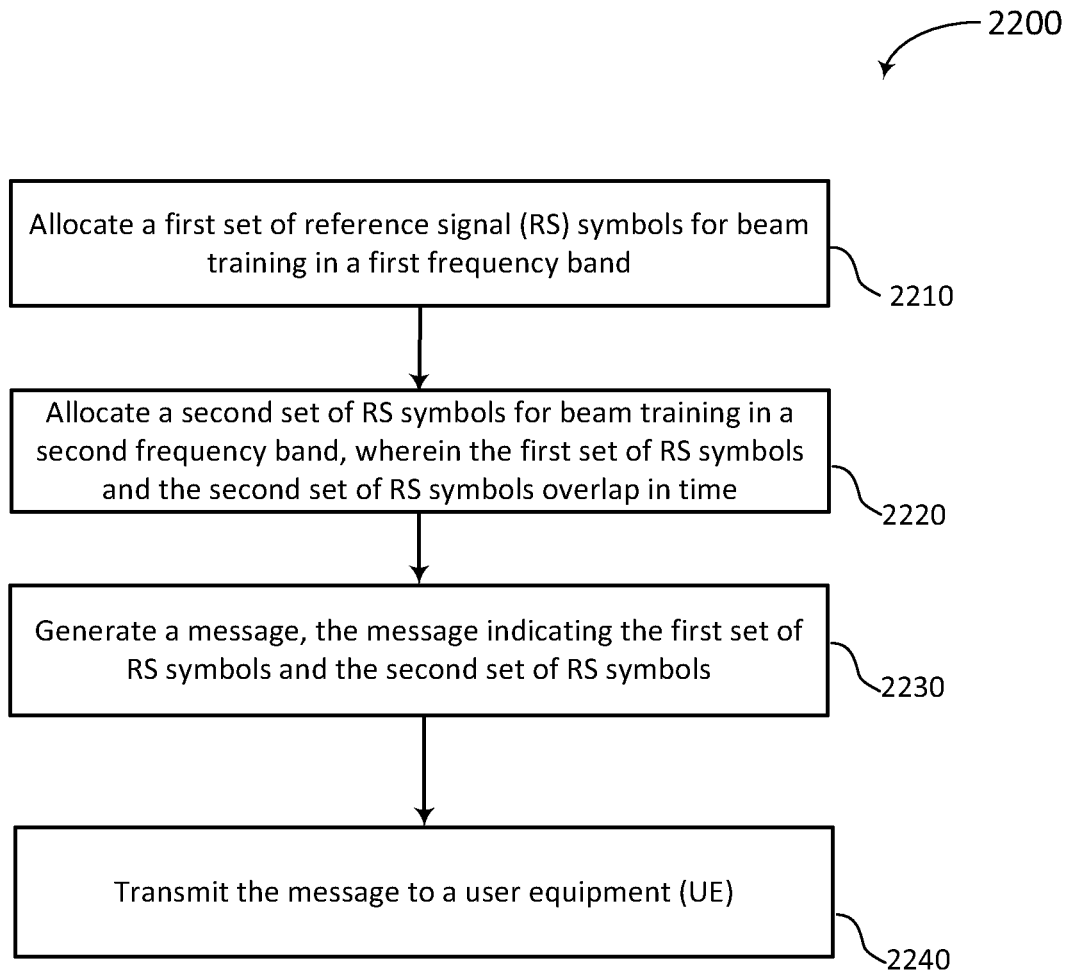
FIG. 22 is a flowchart illustrating an exemplary method for wireless communications by a base station according to certain aspects of the present disclosure.

FIG. 22 illustrates a method 2200 for wireless communications by a base station according to certain aspects. The method 2200 may be performed by the exemplary device 2100 configured to operate in the base station (e.g., base station 205).

At block 2210, a first set of reference signal (RS) symbols is allocated for beam training in a first frequency band. The first set of RS symbols may be allocated by the processor 2120 (e.g., based on a request message indicating a number of RS symbols for the first band).

At block 2220, a second set of RS symbols is allocated for beam training in a second frequency band, wherein the first set of RS symbols and the second set of RS symbols overlap in time. The second set of RS symbols may be allocated by the processor 2120 (e.g., based on a request message indicating a number of RS symbols for the second band).

At block 2230, a message is generated, the message indicating the first set of RS symbols and the second set of RS symbols. The message may be generated by the processor 2120.

At block 2240, the message is transmitted to a user equipment (UE). The UE may correspond to the UE 215. The message may be transmitted by the transceiver 2130 via the first antenna array 2160, the second antenna array 2165, or the one or more antennas 2170.

Figure 23:
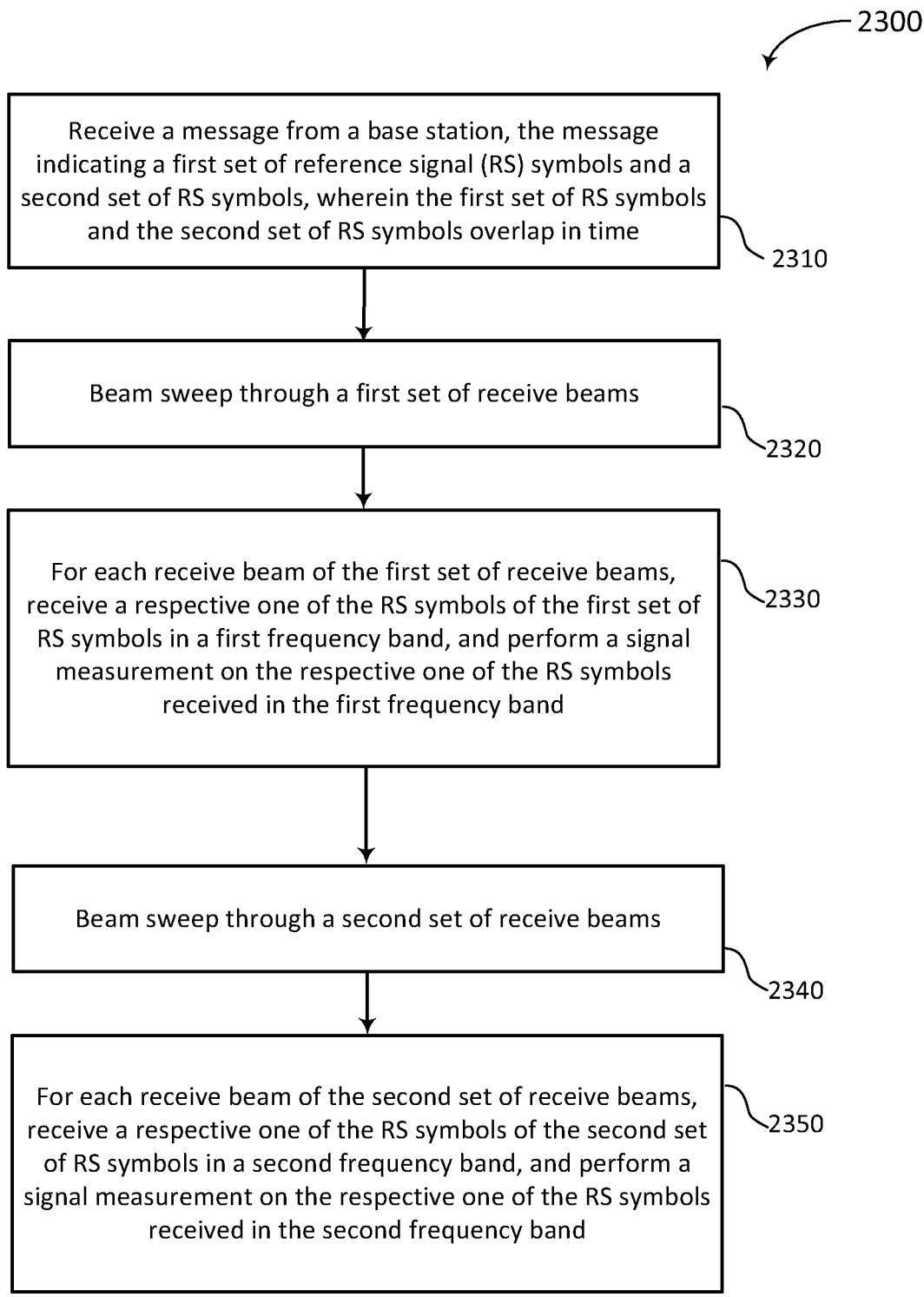
FIG. 23 is a flowchart illustrating an exemplary method for wireless communications by a user equipment (UE) according to certain aspects of the present disclosure.

FIG. 23 illustrates a method 2300 for wireless communications by a user equipment according to certain aspects. The method 2300 may be performed by the exemplary device 2100 configured to operate in the UE (e.g., UE 215).

At block 2310, a message is received from a base station, the message indicating a first set of reference signal (RS) symbols and a second set of RS symbols, wherein the first set of RS symbols and the second set of RS symbols overlap in time. For example, the message may be received by the transceiver 2130 via the first antenna array 2160, the second antenna array 2165, or the one or more antennas 2170.

At block 2320, a first set of receive beams is beam swept through. For example, the receive beams may be swept through by the transceiver 2130 and the first antenna array 2160 with the transceiver 2130 performing beamforming.

At block 2330, for each receive beam of the first set of receive beams, a respective one of the RS symbols of the first set of RS symbols is received in a first frequency band, and a signal measurement is performed on the respective one of the RS symbols received in the first frequency band. The RS symbol for each receive beam may be received by the transceiver 2130 via the first antenna array 2160 and the signal measurement may be performed by the transceiver 2130.

At block 2340, a second set of receive beams is beam swept through. For example, the receive beams may be swept through by the transceiver 2130 and the second antenna array 2165 with the transceiver 2130 performing beamforming.

At block 2350, for each receive beam of the second set of receive beams, a respective one of the RS symbols of the second set of RS symbols is received in a second frequency band, and a signal measurement is performed on the respective one of the RS symbols received in the second frequency band. The RS symbol for each receive beam may be received by the transceiver 2130 via the second antenna array 2165 and the signal measurement may be performed by the transceiver 2130.

Figure 24:
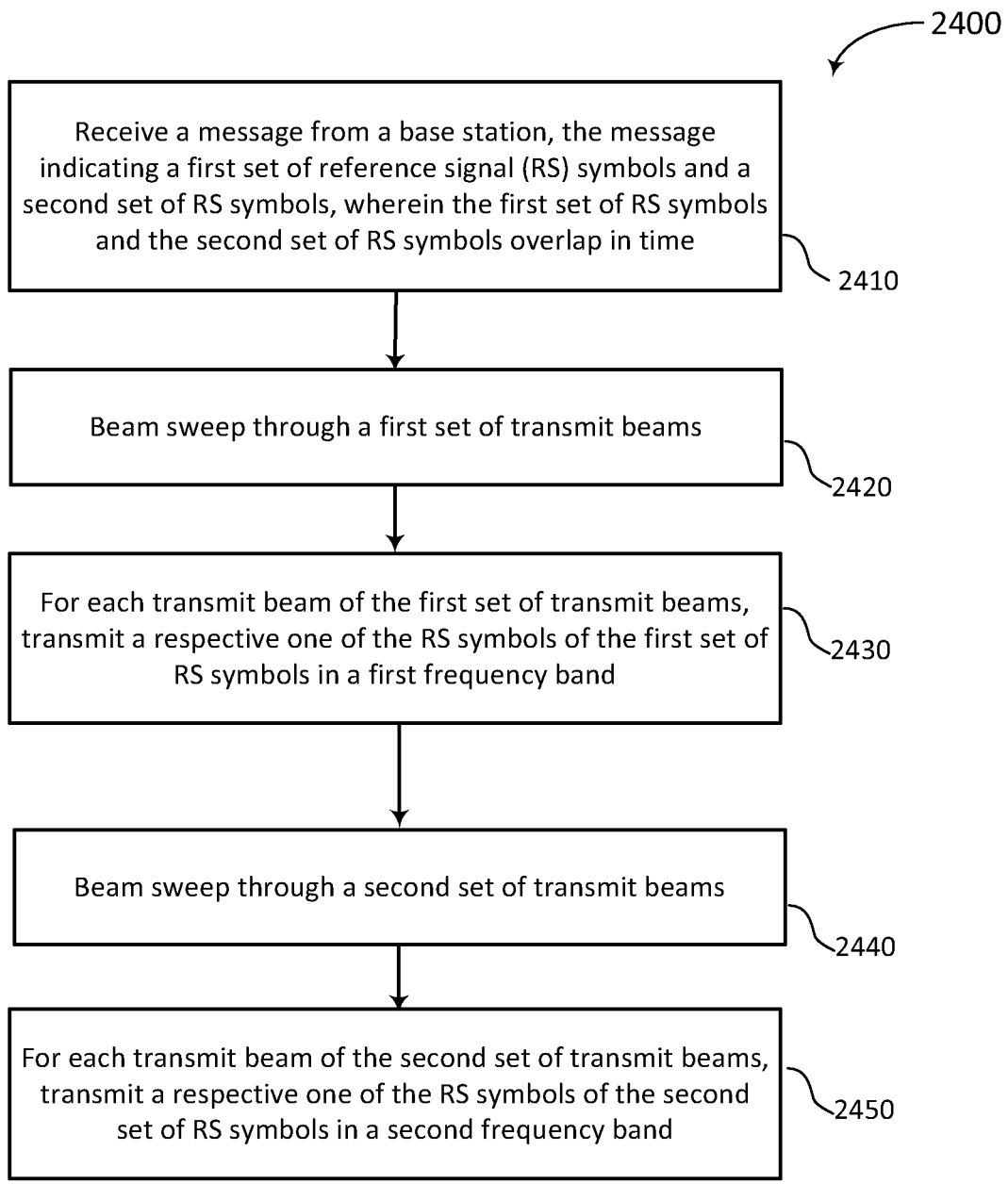
FIG. 24 is a flowchart illustrating another exemplary method for wireless communications by a UE according to certain aspects of the present disclosure.

FIG. 24 illustrates a method 2400 for wireless communications by a user equipment according to certain aspects. The method 2400 may be performed by the exemplary device 2100 configured to operate in the UE (e.g., UE 215).

At block 2410, a message is received from a base station, the message indicating a first set of reference signal (RS) symbols and a second set of RS symbols, wherein the first set of RS symbols and the second set of RS symbols overlap in time. For example, the message may be received by the transceiver 2130 via the first antenna array 2160, the second antenna array 2165, or the one or more antennas 2170.

At block 2420, a first set of transmit beams is beam swept through. For example, the transmit beams may be swept through by the transceiver 2130 and the first antenna array 2160 with the transceiver 2130 performing beamforming.

At block 2430, for each transmit beam of the first set of transmit beams, a respective one of the RS symbols of the first set of RS symbols is transmitted in a first frequency band. For example, the RS symbol for each transmit beam may be transmitted by the transceiver 2130 via the first antenna array 2160.

At block 2440, a second set of transmit beams is beam swept through. For example, the transmit beams may be swept through by the transceiver 2130 and the second antenna array 2165 with the transceiver 2130 performing beamforming.

At block 2450, for each transmit beam of the second set of transmit beams, a respective one of the RS symbols of the second set of RS symbols is transmitted in a second frequency band. For example, the RS symbol for each transmit beam may be transmitted by the transceiver 2130 via the second antenna array 2165.

Figure 25:
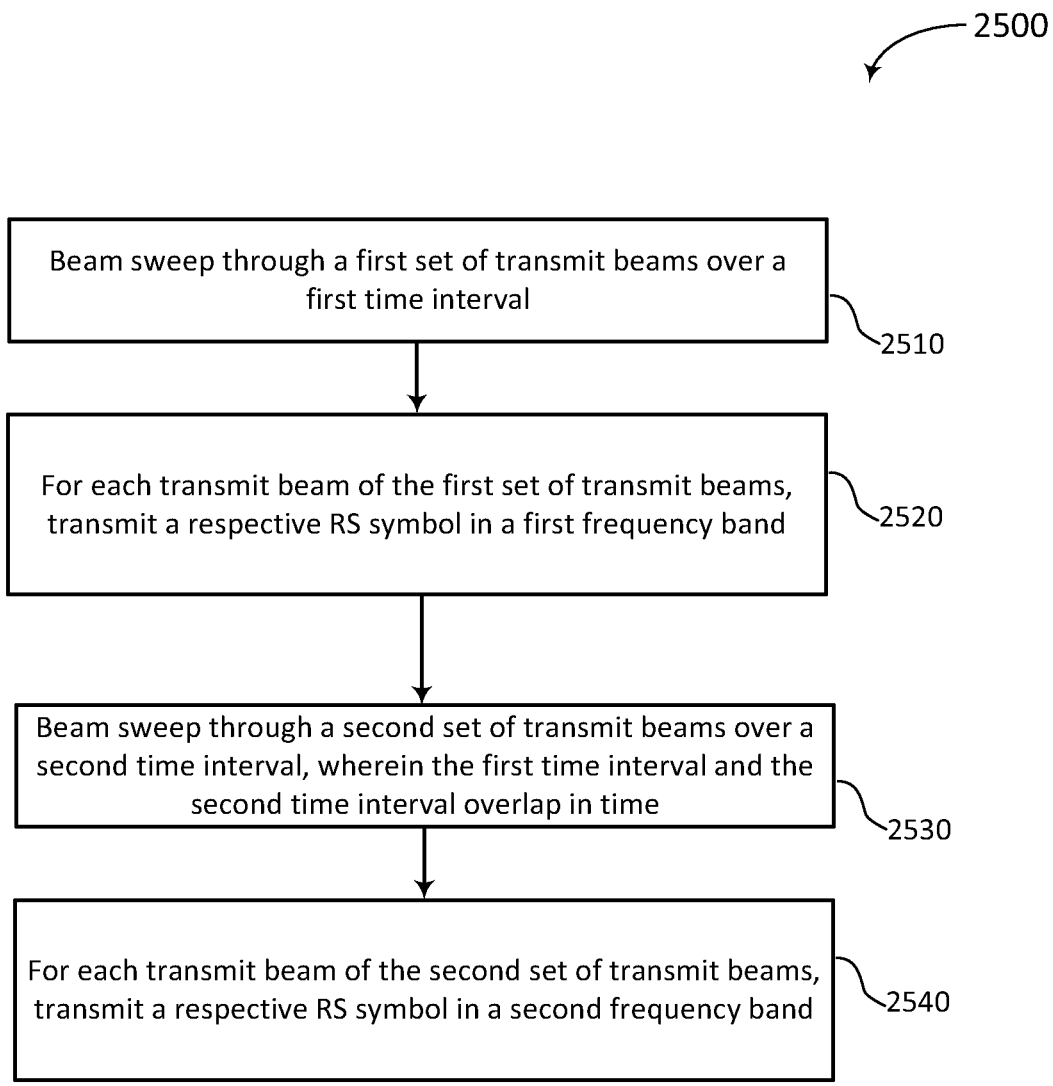
FIG. 25 is a flowchart illustrating another exemplary method for wireless communications by a base station according to certain aspects of the present disclosure.

FIG. 25 illustrates a method 2500 for wireless communications by a base station according to certain aspects. The method 2500 may be performed by the exemplary device 2100 configured to operate in the base station (e.g., base station 205).

At block 2510, a first set of transmit beams is beam swept through over a first time interval. For example, the transmit beams may be swept through by the transceiver 2130 and the first antenna array 2160 with the transceiver 2130 performing beamforming. The first time interval may span, for example, one or more of the cycles shown in FIGS. 13-17. The first set of transmit beams may correspond to the exemplary set of K transmit beams in the first frequency band discussed above.

At block 2520, for each transmit beam of the first set of transmit beams, a respective reference signal (RS) symbol is transmitted in a first frequency band. The RS symbol for each transmit beam may be transmitted by the transceiver 2130 via the first antenna array 2160.

At block 2530, a second set of transmit beams is beam swept through over a second time interval, wherein the first time interval and the second time interval overlap. For example, the transmit beams may be swept through by the transceiver 2130 and the second antenna array 2165 with the transceiver 2130 performing beamforming. The second time interval may span, for example, one or more of the cycles shown in FIGS. 13-17. The second set of transmit beams may correspond to the exemplary set of M transmit beams in the second frequency band discussed above.

At block 2540, for each transmit beam of the second set of transmit beams, a respective reference signal (RS) symbol is transmitted in a second frequency band. The RS symbol for each transmit beam may be transmitted by the transceiver 2130 via the second antenna array 2165.

Figure 26:
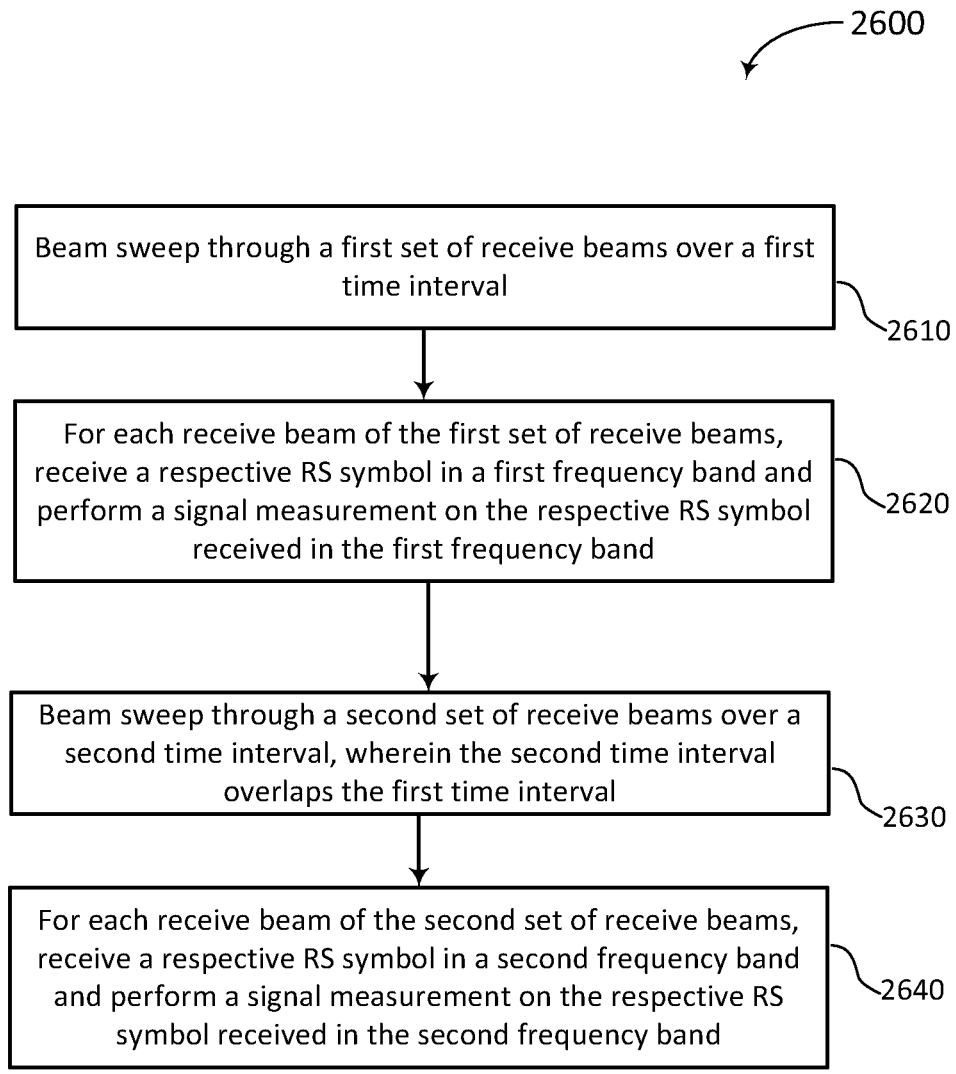
FIG. 26 is a flowchart illustrating yet another exemplary method for wireless communications by a UE according to certain aspects of the present disclosure.

FIG. 26 illustrates a method 2600 for wireless communications by a user equipment according to certain aspects. The method 2600 may be performed by the exemplary device 2100 configured to operate in the UE (e.g., UE 215).

At block 2610, a first set of receive beams is beam swept through over a first time interval. For example, the receive beams may be swept through by the transceiver 2130 and the first antenna array 2160 with the transceiver 2130 performing beamforming. The first time interval may span, for example, one or more of the cycles shown in FIGS. 18-20. The first set of receive beams may correspond to the exemplary set of P receive beams in the first frequency band discussed above.

At block 2620, for each receive beam of the first set of receive beams, a respective reference signal (RS) symbol in a first frequency band is received, and a signal measurement is performed on the respective RS symbol received in the first frequency band. The RS symbol for each receive beam may be received by the transceiver 2130 via the first antenna array 2160, and the signal measurement may be performed by the transceiver 2130.

At block 2630, a second set of receive beams is beam swept through over a second time interval, wherein the second time interval overlaps the first time interval. For example, the receive beams may be swept through by the transceiver 2130 and the second antenna array 2165 with the transceiver 2130 performing beamforming. The second time interval may span, for example, one or more of the cycles shown in FIGS. 18-20. The second set of receive beams may correspond to the exemplary set of Q receive beams in the second frequency band discussed above.

At block 2640, for each receive beam of the second set of receive beams, a respective reference signal (RS) symbol in a second frequency band is received, and a signal measurement is performed on the respective RS symbol received in the second frequency band. The RS symbol for each receive beam may be received by the transceiver 2130 via the second antenna array 2165, and the signal measurement may be performed by the transceiver 2130.

An RS symbol may be a channel state information RS (CSI-RS) symbol (e.g., for downlink), a sounding reference signal (SRS) (e.g., for uplink), or another type of symbol that can be used for beam training.

Implementation examples are described in the following numbered clauses:

1. A method for wireless communications by a base station, comprising:
   allocating a first set of reference signal (RS) symbols for beam training in a first frequency band;
   allocating a second set of RS symbols for beam training in a second frequency band, wherein the first set of RS symbols and the second set of RS symbols overlap in time;
   generating a message, the message indicating the first set of RS symbols and the second set of RS symbols; and
   transmitting the message to a user equipment (UE).

2. The method of clause 1, wherein the first frequency band and the second frequency band are above a frequency of 24.25 GHz.

3. The method of clause 1 or 2, wherein a duration of an RF symbol in the first set of RS symbols is greater than a duration of an RF symbol in the second set of RS symbols.

4. The method of any one of clauses 1 to 3, wherein the first frequency band and the second frequency band are separated in frequency.

5. The method of any one of clauses 1 to 4, wherein:
the first set of RS symbols is indicated by symbol numbers for a first time slot; and
the second set of RS symbols is indicated by symbol numbers for a second time slot.

6. The method of any one of clauses 1 to 5, further comprising:
beam sweeping through a first set of transmit beams;
for each transmit beam of the first set of transmit beams, transmitting a respective one of the RS symbols of the first set of RS symbols in the first frequency band;
beam sweeping through a second set of transmit beams; and
for each transmit beam of the second set of transmit beams, transmitting a respective one of the RS symbols of the second set of RS symbols in the second frequency band.

7. The method of clause 6, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

8. The method of clause 6 or 7, wherein at least one of the transmit beams in the second set of transmit beams has a narrower beamwidth than each transmit beam of the first set of transmit beams.

9. The method of any one of clauses 1 to 5, further comprising:
beam sweeping through a first set of receive beams;
for each receive beam of the first set of receive beams, receiving a respective one of the RS symbols of the first set of RS symbols in the first frequency band; and
performing a signal measurement on the respective one of the RS symbols received in the first frequency band;
beam sweeping through a second set of receive beams; and
for each receive beam of the second set of receive beams, receiving a respective one of the RS symbols of the second set of RS symbols in the second frequency band; and
performing a signal measurement on the respective one of the RS symbols received in the second frequency band.

10. The method of clause 9, wherein:
each receive beam of the first set of receive beams points in a different direction or a beam pattern of each receive beam of the first set of receive beams is different; and
each receive beam of the second set of receive beams points in a different direction or a beam pattern of each receive beam of the second set of receive beams is different.

11. The method of clause 9 or 10, further comprising:
generating a report indicating the signal measurement for at least one of the RS symbols of the first set of RS symbols, and the signal measurement for at least one of the RS symbols of the second set of RS symbols; and
transmitting the report to the UE.

12. The method of any one of clauses 9 to 11, wherein each signal measurement comprises a reference signal received power (RSRP) measurement, a reference signal received quality (RSRQ) measurement, a signal to interference and noise ratio (SINR) measurement, a signal to noise ratio (SNR) measurement, or a received signal strength indicator (RSSI) measurement.

13. The method of any one of clauses 1 to 12, further comprising:
receiving a message from the UE, wherein the message from the UE indicates a first number of RS symbols and a second number of RS symbols;
wherein allocating the first set of RS symbols comprises allocating the first set of RS symbols based on the first number of RS symbols; and
wherein allocating the second set of RS symbols comprises allocating the second set of RS symbols based on the second number of RS symbols.

14. The method of clause 13, wherein:
a number of RS symbols of the first set of RS symbols is equal to the first number of RS symbols; and
a number of RS symbols of the second set of RS symbols is equal to the second number of RS symbols.

15. A method for wireless communications by a user equipment (UE), comprising:
receiving from a base station a message, the message indicating a first set of reference signal (RS) symbols and a second set of RS symbols, wherein the first set of RS symbols and the second set of RS symbols overlap in time;
beam sweeping through a first set of receive beams;
for each receive beam of the first set of receive beams, receiving a respective one of the RS symbols of the first set of RS symbols in a first frequency band; and
performing a signal measurement on the respective one of the RS symbols received in the first frequency band; and
beam sweeping through a second set of receive beams; and
for each receive beam of the second set of receive beams, receiving a respective one of the RS symbols of the second set of RS symbols in a second frequency band; and
performing a signal measurement on the respective one of the RS symbols received in the second frequency band.

16. The method of clause 15, further comprising:
generating a report, the report indicating the signal measurement for at least one of the RS symbols of the first set of RS symbols, and the signal measurement for at least one of the RS symbols of the second set of RS symbols; and
transmitting the report to the base station.

17. The method of clause 15 or 16, wherein the first frequency band and the second frequency band are above a frequency of 24.25 GHz.

18. The method of any one of clauses 15 to 17, wherein a duration of an RF symbol in the first set of RS symbols is greater than a duration of an RF symbol in the second set of RS symbols.

19. The method of any one of clauses 15 to 18, wherein the first frequency band and the second frequency band are separated in frequency.

20. The method of any one of clauses 15 to 19, further comprising:
determining a first number of RS symbols;
determining a second number of RS symbols;
generating a request message indicating the first number of RS symbols and the second number of RS symbols; and
transmitting the request message to the base station.

21. The method of clause 20, wherein determining the first number of RS symbols comprises determining the first number of RS symbols based on at least one of a size or geometry of a first antenna array of the UE, a power level of the UE, a temperature of the UE, mobility of the UE, or subcarrier spacing in the first frequency band.

22. The method of clause 21, wherein determining the second number of RS symbols comprises determining the second number of RS symbols based on at least one of a size or geometry of a second antenna array or the UE, the power level of the UE, the temperature of the UE, the mobility of the UE, or subcarrier spacing in the second frequency band.

23. A method for wireless communications by a user equipment (UE), comprising:
  receiving from a base station a message, the message indicating a first set of reference signal (RS) symbols and a second set of RS symbols, wherein the first set of RS symbols and the second set of RS symbols overlap in time;
  beam sweeping through a first set of transmit beams;
  for each transmit beam of the first set of transmit beams, transmitting a respective one of the RS symbols of the first set of RS symbols in a first frequency band;
  beam sweeping through a second set of transmit beams; and
  for each transmit beam of the second set of transmit beams, transmitting a respective one of the RS symbols of the second set of RS symbols in a second frequency band.

24. The method of clause 23, wherein the first frequency band and the second frequency band are above a frequency of 24.25 GHz.

25. The method of clause 23 or 24, wherein a duration of an RF symbol in the first set of RS symbols is greater than a duration of an RF symbol in the second set of RS symbols.

26. The method of any one of clauses 23 to 25, wherein the first frequency band and the second frequency band are separated in frequency.

27. The method of any one of clauses 23 to 26, further comprising:
  determining a first number of RS symbols;
  determining a second number of RS symbols;
  generating a request message indicating the first number of RS symbols and the second number of RS symbols; and
  transmitting the request message to the base station.

28. The method of clause 27, wherein determining the first number of RS symbols comprises determining the first number of RS symbols based on at least one of a size or geometry of a first antenna array of the UE, a power level of the UE, a temperature of the UE, mobility of the UE, or subcarrier spacing in the first frequency band.

29. The method of clause 28, wherein determining the second number of RS symbols comprises determining the second number of RS symbols based on at least one of a size or geometry of a second antenna array of the UE, the power level of the UE, the temperature of the UE, the mobility of the UE, or subcarrier spacing in the second frequency band.

30. A method for wireless communications by a base station, comprising:
  beam sweeping through a first set of transmit beams over a first time interval;
  for each transmit beam of the first set of transmit beams, transmitting a respective reference signal (RS) symbol in a first frequency band;
  beam sweeping through a second set of transmit beams over a second time interval, wherein the second time interval overlaps the first time interval; and
  for each transmit beam of the second set of transmit beams, transmitting a respective RS symbol in a second frequency band.

31. The method of clause 30, further comprising:
  receiving one or more reports from a user equipment (UE), the one or more reports indicating one or more signal measurements at the UE related to the first set of transmit beams, and one or more signal measurements at the UE related to the second set of transmit beams;
  selecting one of the transmit beams in the first set of transmit beams based on the one or more signal measurements related to the first set of transmit beams; and
  selecting one of the transmit beams in the second set of transmit beams based on the one or more signal measurements related to the second set of transmit beams.

32. The method of clause 31, further comprising:
  transmitting a data signal to the UE using inter-band carrier aggregation in the first frequency band and the second frequency band, wherein transmitting the data signal using the inter-band carrier aggregation comprises:
  transmitting a first portion of the data signal over one or more carriers in the first frequency band using the selected one of the transmit beams in the first set of transmit beams; and
  transmitting a second portion of the data signal over one or more carriers in the second frequency band using the selected one of the transmit beams in the second set of transmit beams.

33. The method of any one of clauses 30 to 32, wherein the first frequency band and the second frequency band are above a frequency of 24.25 GHz.

34. The method of any one of clauses 30 to 33, wherein a duration of each of the RS symbols in the first frequency band is greater than a duration of each of the RS symbols in the second frequency band.

35. The method of any one of clauses 30 to 34, wherein the first frequency band and the second frequency band are separated in frequency.

36. A method for wireless communications by a user equipment (UE), comprising:
  beam sweeping through a first set of receive beams over a first time interval;
  for each receive beam of the first set of receive beams, receiving a respective reference signal (RS) symbol in a first frequency band; and
  performing a signal measurement on the respective RS symbol received in the first frequency band;
  beam sweeping through a second set of receive beams over a second time interval, wherein the second time interval overlaps the first time interval; and
  for each receive beam of the second set of receive beams, receiving a respective RS symbol in a second frequency band; and
  performing a signal measurement on the respective RS symbol received in the second frequency band.

37. The method of clause 36, further comprising:
  selecting one of the receive beams in the first set of receive beams based on the signal measurements for the first set of receive beams; and
  selecting one of the receive beams in the second set of receive beams based on the signal measurements for the second set of receive beams.

38. The method of clause 37, further comprising:
receiving a data signal from a base station using inter-band carrier aggregation in the first frequency band and the second frequency band, wherein receiving the data signal using the inter-band carrier aggregation comprises:
receiving a first portion of the data signal over one or more carriers in the first frequency band using the selected one of the receive beams in the first set of receive beams; and
receiving a second portion of the data signal over one or more carriers in the second frequency band using the selected one of the receive beams in the second set of receive beams.

39. The method of any one of clauses 36 to 38, wherein the first frequency band and the second frequency band are above a frequency of 24.25 GHz.

40. The method of any one of clauses 36 to 39, wherein a duration of each of the RS symbols in the first frequency band is greater than a duration of each of the RS symbols in the second frequency band.

41. The method of any one of clauses 36 to 40, wherein the first frequency band and the second frequency band are separated in frequency.

42. An apparatus for wireless communication, comprising:
a processor;
a memory coupled with the processor; and
instructions stored in the memory and executable by the processor to cause the apparatus to:
allocate a first set of reference signal (RS) symbols for beam training in a first frequency band;
allocate a second set of RS symbols for beam training in a second frequency band, wherein the first set of RS symbols and the second set of RS symbols overlap in time;
generate a message, the message indicating the first set of RS symbols and the second set of RS symbols; and
transmit the message to a user equipment (UE).

43. The apparatus of clause 42, wherein the first frequency band and the second frequency band are above a frequency of 24.25 GHz.

44. The apparatus of clause 42 or 43, wherein a duration of an RF symbol in the first set of RS symbols is greater than a duration of an RF symbol in the second set of RS symbols.

45. The apparatus of any one of clauses 42 to 44, wherein the first frequency band and the second frequency band are separated in frequency.

46. The apparatus of any one of clauses 42 to 45, wherein:
the first set of RS symbols is indicated by symbol numbers for a first time slot; and
the second set of RS symbols is indicated by symbol numbers for a second time slot.

47. The apparatus of any one of clauses 42 to 46, wherein the instructions cause the apparatus to:
beam sweep through a first set of transmit beams;
for each transmit beam of the first set of transmit beams, transmit a respective one of the RS symbols of the first set of RS symbols in the first frequency band;
beam sweep through a second set of transmit beams; and
for each transmit beam of the second set of transmit beams, transmit a respective one of the RS symbols of the second set of RS symbols in the second frequency band.

48. The apparatus of clause 47, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

49. The apparatus of clause 47 or 48, wherein at least one of the transmit beams in the second set of transmit beams has a narrower beamwidth than each transmit beam of the first set of transmit beams.

50. The apparatus of any one of clauses 42 to 46, wherein the instructions cause the apparatus to:
beam sweep through a first set of receive beams;
for each receive beam of the first set of receive beams, receive a respective one of the RS symbols of the first set of RS symbols in the first frequency band; and
perform a signal measurement on the respective one of the RS symbols received in the first frequency band;
beam sweep through a second set of receive beams; and
for each receive beam of the second set of receive beams, receive a respective one of the RS symbols of the second set of RS symbols in the second frequency band; and
perform a signal measurement on the respective one of the RS symbols received in the second frequency band.

51. The apparatus of clause 50, wherein:
each receive beam of the first set of receive beams points in a different direction or a beam pattern of each receive beam of the first set of receive beams is different; and
each receive beam of the second set of receive beams points in a different direction or a beam pattern of each receive beam of the second set of receive beams is different.

52. The apparatus of clause 50 or 51, wherein the instructions cause the apparatus to:
generate a report indicating the signal measurement for at least one of the RS symbols of the first set of RS symbols, and the signal measurement for at least one of the RS symbols of the second set of RS symbols; and
transmit the report to the UE.

53. The apparatus of any one of clauses 50 to 52, wherein each signal measurement comprises a reference signal received power (RSRP) measurement, a reference signal received quality (RSRQ) measurement, a signal to interference and noise ratio (SINR) measurement, a signal to noise ratio (SNR) measurement, or a received signal strength indicator (RSSI) measurement.

54. The apparatus of any one of clauses 42 to 53, wherein the instructions cause the apparatus to:
receive a message from the UE, wherein the message from the UE indicates a first number of RS symbols and a second number of RS symbols;
wherein the first set of RS symbols are allocated based on the first number of RS symbols; and
wherein the second set of RS symbols are allocated based on the second number of RS symbols.

55. The apparatus of clause 54, wherein:
a number of RS symbols of the first set of RS symbols is equal to the first number of RS symbols; and
a number of RS symbols of the second set of RS symbols is equal to the second number of RS symbols.

56. An apparatus for wireless communication, comprising:
a processor;
a memory coupled with the processor; and
instructions stored in the memory and executable by the processor to cause the apparatus to:
receive from a base station a message, the message indicating a first set of reference signal (RS) symbols and a second set of RS symbols, wherein the first set of RS symbols and the second set of RS symbols overlap in time;
beam sweep through a first set of receive beams;
for each receive beam of the first set of receive beams,
receive a respective one of the RS symbols of the first set of RS symbols in a first frequency band; and
perform a signal measurement on the respective one of the RS symbols received in the first frequency band; and
beam sweep through a second set of receive beams; and
for each receive beam of the second set of receive beams,
receive a respective one of the RS symbols of the second set of RS symbols in a second frequency band; and
perform a signal measurement on the respective one of the RS symbols received in the second frequency band.

57. The apparatus of clause 56, wherein the instructions cause the apparatus to:
generate a report, the report indicating the signal measurement for at least one of the RS symbols of the first set of RS symbols and the signal measurement for at least one of the RS symbols of the second set of RS symbols; and
transmit the report to the base station.

58. The apparatus of clause 56 or 57, wherein the first frequency band and the second frequency band are above a frequency of 24.25 GHz.

59. The apparatus of any clauses 56 to 58, wherein a duration of an RF symbol in the first set of RS symbols is greater than a duration of an RF symbol in the second set of RS symbols.

60. The apparatus of any one of clauses 56 to 59, wherein the first frequency band and the second frequency band are separated in frequency.

61. The apparatus of any one of clauses 56 to 60, wherein the instructions cause the apparatus to:
determine a first number of RS symbols;
determine a second number of RS symbols;
generate a request message indicating the first number of RS symbols and the second number of RS symbols; and
transmit the request message to the base station.

62. The apparatus of clause 61, wherein the instructions cause the apparatus to:
determine the first number of RS symbols based on at least one of a size or geometry of a first antenna array of the UE, a power level of the UE, a temperature of the UE, mobility of the UE, or subcarrier spacing in the first frequency band.

63. The apparatus of clause 62, wherein the instructions cause the apparatus to:
determine the second number of RS symbols based on at least one of a size or geometry of a second antenna array or the UE, the power level of the UE, the temperature of the UE, the mobility of the UE, or subcarrier spacing in the second frequency band.

64. An apparatus for wireless communication, comprising:
a processor;
a memory coupled with the processor; and
instructions stored in the memory and executable by the processor to cause the apparatus to:
receive from a base station a message, the message indicating a first set of reference signal (RS) symbols and a second set of RS symbols, wherein the first set of RS symbols and the second set of RS symbols overlap in time;
beam sweep through a first set of transmit beams;
for each transmit beam of the first set of transmit beams, transmit a respective one of the RS symbols of the first set of RS symbols in a first frequency band; and
beam sweep through a second set of transmit beams; and
for each transmit beam of the second set of transmit beams, transmit a respective one of the RS symbols of the second set of RS symbols in a second frequency band.

65. The apparatus of clause 64, wherein the first frequency band and the second frequency band are above a frequency of 24.25 GHz.

66. The apparatus of clauses 64 or 65, wherein a duration of an RF symbol in the first set of RS symbols is greater than a duration of an RF symbol in the second set of RS symbols.

67. The apparatus of any one of clauses 64 to 66, wherein the first frequency band and the second frequency band are separated in frequency.

68. The apparatus of any one of clauses 64 to 67, wherein the instructions cause the apparatus to:
determine a first number of RS symbols;
determine a second number of RS symbols;
generate a request message indicating the first number of RS symbols and the second number of RS symbols; and
transmit the request message to the base station.

69. The apparatus of clause 68, wherein the instructions cause the apparatus to:
determine the first number of RS symbols based on at least one of a size or geometry of a first antenna array of the UE, a power level of the UE, a temperature of the UE, mobility of the UE, or subcarrier spacing in the first frequency band.

70. The apparatus of clause 69, wherein the instructions cause the apparatus to:
determine the second number of RS symbols based on at least one of a size or geometry of a second antenna array of the UE, the power level of the UE, the temperature of the UE, the mobility of the UE, or subcarrier spacing in the second frequency band.

71. An apparatus for wireless communication, comprising:
a processor;
a memory coupled with the processor; and
instructions stored in the memory and executable by the processor to cause the apparatus to:
beam sweep through a first set of transmit beams over a first time interval;
for each transmit beam of the first set of transmit beams, transmit a respective reference signal (RS) symbol in a first frequency band;
beam sweep through a second set of transmit beams over a second time interval, wherein the second time interval overlaps the first time interval; and for each transmit beam of the second set of transmit beams, transmit a respective RS symbol in a second frequency band.

72. The apparatus of clause 71, wherein the instructions cause the apparatus to:
receive one or more reports from a user equipment (UE), the one or more reports indicating one or more signal measurements at the UE related to the first set of transmit beams, and one or more signal measurements at the UE related to the second set of transmit beams;
select one of the transmit beams in the first set of transmit beams based on the one or more signal measurements related to the first set of transmit beams; and
select one of the transmit beams in the second set of transmit beams based on the one or more signal measurements related to the second set of transmit beams.

73. The apparatus of clause 72, wherein the instructions cause the apparatus to:
transmit a data signal to the UE using inter-band carrier aggregation in the first frequency band and the second frequency band, wherein transmitting the data signal using the inter-band carrier aggregation comprises:
transmitting a first portion of the data signal over one or more carriers in the first frequency band using the selected one of the transmit beams in the first set of transmit beams; and
transmitting a second portion of the data signal over one or more carriers in the second frequency band using the selected one of the transmit beams in the second set of transmit beams.

74. The apparatus of any one of clauses 71 to 73, wherein the first frequency band and the second frequency band are above a frequency of 24.25 GHz.

75. The apparatus of any one of clauses 71 to 74, wherein a duration of each of the RS symbols in the first frequency band is greater than a duration of each of the RS symbols in the second frequency band.

76. The apparatus of any one of clauses 71 to 75, wherein the first frequency band and the second frequency band are separated in frequency.

77. An apparatus for wireless communication, comprising:
a processor;
a memory coupled with the processor; and
instructions stored in the memory and executable by the processor to cause the apparatus to:
beam sweep through a first set of receive beams over a first time interval;
for each receive beam of the first set of receive beams, receive a respective reference signal (RS) symbol in a first frequency band; and
perform a signal measurement on the respective RS symbol received in the first frequency band;
beam sweep through a second set of receive beams over a second time interval, wherein the second time interval overlaps the first time interval; and
for each receive beam of the second set of receive beams,
receive a respective RS symbol in a second frequency band; and
perform a signal measurement on the respective RS symbol received in the second frequency band.

78. The apparatus of clause 77, wherein the instructions cause the apparatus to:
select one of the receive beams in the first set of receive beams based on the signal measurements for the first set of receive beams; and
select one of the receive beams in the second set of receive beams based on the signal measurements for the second set of receive beams.

79. The apparatus of clause 78, wherein the instructions cause the apparatus to:
receive a data signal from a base station using inter-band carrier aggregation in the first frequency band and the second frequency band, wherein receiving the data signal using the inter-band carrier aggregation comprises:
receiving a first portion of the data signal over one or more carriers in the first frequency band using the selected one of the receive beams in the first set of receive beams; and
receiving a second portion of the data signal over one or more carriers in the second frequency band using the selected one of the receive beams in the second set of receive beams.

80. The apparatus of any one of clauses 77 to 79, wherein the first frequency band and the second frequency band are above a frequency of 24.25 GHz.

81. The apparatus of any one of clauses 77 to 80, wherein a duration of each of the RS symbols in the first frequency band is greater than a duration of each of the RS symbols in the second frequency band.

82. The apparatus of any one of clauses 77 to 81, wherein the first frequency band and the second frequency band are separated in frequency.

83. An apparatus for wireless communication, comprising:
means for allocating a first set of reference signal (RS) symbols for beam training in a first frequency band;
means for allocating a second set of RS symbols for beam training in a second frequency band, wherein the first set of RS symbols and the second set of RS symbols overlap in time;
means for generating a message, the message indicating the first set of RS symbols and the second set of RS symbols; and
means for transmitting the message to a user equipment (UE).

84. The apparatus of clause 83, wherein the first frequency band and the second frequency band are above a frequency of 24.25 GHz.

85. The apparatus of clause 83 or 84, wherein a duration of an RF symbol in the first set of RS symbols is greater than a duration of an RF symbol in the second set of RS symbols.

86. The apparatus of any one of clauses 83 to 85, wherein the first frequency band and the second frequency band are separated in frequency.

87. The apparatus of any one of clauses 83 to 86, wherein:
the first set of RS symbols is indicated by symbol numbers for a first time slot; and
the second set of RS symbols is indicated by symbol numbers for a second time slot.

88. The apparatus of any one of clauses 83 to 87, further comprising:
means for beam sweeping through a first set of transmit beams;
means for, for each transmit beam of the first set of transmit beams, transmitting a respective one of the RS symbols of the first set of RS symbols in the first frequency band;
means for beam sweeping through a second set of transmit beams; and means for, for each transmit beam of the second set of transmit beams, transmitting a respective one of the RS symbols of the second set of RS symbols in the second frequency band.

89. The apparatus of clause 88, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

90. The apparatus of clause 88 or 89, wherein at least one of the transmit beams in the second set of transmit beams has a narrower beamwidth than each transmit beam of the first set of transmit beams.

91. The apparatus of any one of clauses 83 to 87, further comprising:
means for beam sweeping through a first set of receive beams;
means for, for each receive beam of the first set of receive beams,
receiving a respective one of the RS symbols of the first set of RS symbols in the first frequency band; and
performing a signal measurement on the respective one of the RS symbols received in the first frequency band;
means for beam sweeping through a second set of receive beams; and
means for, for each receive beam of the second set of receive beams,
receiving a respective one of the RS symbols of the second set of RS symbols in the second frequency band; and
performing a signal measurement on the respective one of the RS symbols received in the second frequency band.

92. The apparatus of clause 91, wherein:
each receive beam of the first set of receive beams points in a different direction or a beam pattern of each receive beam of the first set of receive beams is different; and
each receive beam of the second set of receive beams points in a different direction or a beam pattern of each receive beam of the second set of receive beams is different.

93. The apparatus of clause 91 or 92, further comprising:
means for generating a report indicating the signal measurement for at least one of the RS symbols of the first set of RS symbols, and the signal measurement for at least one of the RS symbols of the second set of RS symbols; and
means for transmitting the report to the UE.

94. The apparatus of any one of clauses 91 to 93, wherein each signal measurement comprises a reference signal received power (RSRP) measurement, a reference signal received quality (RSRQ) measurement, a signal to interference and noise ratio (SINR) measurement, a signal to noise ratio (SNR) measurement, or a received signal strength indicator (RSSI) measurement.

95. The apparatus of any one of clauses 83 to 94, further comprising:
means for receiving a message from the UE, wherein the message from the UE indicates a first number of RS symbols and a second number of RS symbols;
wherein the means for allocating the first set of RS symbols comprises means for allocating the first set of RS symbols based on the first number of RS symbols; and
wherein the means for allocating the second set of RS symbols comprises means for allocating the second set of RS symbols based on the second number of RS symbols.

96. The apparatus of clause 95, wherein:
a number of RS symbols of the first set of RS symbols is equal to the first number of RS symbols; and
a number of RS symbols of the second set of RS symbols is equal to the second number of RS symbols.

97. An apparatus for wireless communication, comprising:
means for receiving from a base station a message, the message indicating a first set of reference signal (RS) symbols and a second set of RS symbols, wherein the first set of RS symbols and the second set of RS symbols overlap in time;
means for beam sweeping through a first set of receive beams;
means for, for each receive beam of the first set of receive beams,
receiving a respective one of the RS symbols of the first set of RS symbols in a first frequency band; and
performing a signal measurement on the respective one of the RS symbols received in the first frequency band; and
means for beam sweeping through a second set of receive beams; and
means for, for each receive beam of the second set of receive beams,
receiving a respective one of the RS symbols of the second set of RS symbols in a second frequency band; and
performing a signal measurement on the respective one of the RS symbols received in the second frequency band.

98. The apparatus of clause 97, further comprising:
means for generating a report, the report indicating the signal measurement for at least one of the RS symbols of the first set of RS symbols and the signal measurement for at least one of the RS symbols of the second set of RS symbols; and
means for transmitting the report to the base station.

99. The apparatus of clause 97 or 98, wherein the first frequency band and the second frequency band are above a frequency of 24.25 GHz.

100. The apparatus of any one of clauses 97 to 99, wherein a duration of an RF symbol in the first set of RS symbols is greater than a duration of an RF symbol in the second set of RS symbols.

101. The apparatus of any one of clauses 97 to 100, wherein the first frequency band and the second frequency band are separated in frequency.

102. The apparatus of any one of clauses 97 to 101, further comprising:
means for determining a first number of RS symbols;
means for determining a second number of RS symbols;
means for generating a request message indicating the first number of RS symbols and the second number of RS symbols; and
means for transmitting the request message to the base station.

103. The apparatus of clause 102, wherein the means for determining the first number of RS symbols comprises means for determining the first number of RS symbols based on at least one of a size or geometry of a first antenna array of the UE, a power level of the UE, a temperature of the UE, mobility of the UE, or subcarrier spacing in the first frequency band.

104. The apparatus of clause 103, wherein the means for determining the second number of RS symbols comprises means for determining the second number of RS symbols based on at least one of a size or geometry of a second antenna array or the UE, the power level of the UE, the temperature of the UE, the mobility of the UE, or subcarrier spacing in the second frequency band.

105. An apparatus for wireless communication, comprising:
- means for receiving from a base station a message, the message indicating a first set of reference signal (RS) symbols and a second set of RS symbols, wherein the first set of RS symbols and the second set of RS symbols overlap in time;
- means for beam sweeping through a first set of transmit beams;
- means for, for each transmit beam of the first set of transmit beams, transmitting a respective one of the RS symbols of the first set of RS symbols in a first frequency band;
- means for beam sweeping through a second set of transmit beams; and
- means for, for each transmit beam of the second set of transmit beams, transmitting a respective one of the RS symbols of the second set of RS symbols in a second frequency band.

106. The apparatus of clause 105, wherein the first frequency band and the second frequency band are above a frequency of 24.25 GHz.

107. The apparatus of clause 105 or 106, wherein a duration of an RF symbol in the first set of RS symbols is greater than a duration of an RF symbol in the second set of RS symbols.

108. The apparatus of any one of clauses 105 to 107, wherein the first frequency band and the second frequency band are separated in frequency.

109. The apparatus of any one of clauses 105 to 108, further comprising:
- means for determining a first number of RS symbols;
- means for determining a second number of RS symbols;
- means for generating a request message indicating the first number of RS symbols and the second number of RS symbols; and
- means for transmitting the request message to the base station.

110. The apparatus of clause 109, wherein the means for determining the first number of RS symbols comprises means for determining the first number of RS symbols based on at least one of a size or geometry of a first antenna array of the UE, a power level of the UE, a temperature of the UE, mobility of the UE, or subcarrier spacing in the first frequency band.

111. The apparatus of clause 110, wherein the means for determining the second number of RS symbols comprises means for determining the second number of RS symbols based on at least one of a size or geometry of a second antenna array of the UE, the power level of the UE, the temperature of the UE, the mobility of the UE, or subcarrier spacing in the second frequency band.

112. An apparatus for wireless communication, comprising:
- means for beam sweeping through a first set of transmit beams over a first time interval;
- means for, for each transmit beam of the first set of transmit beams, transmitting a respective reference signal (RS) symbol in a first frequency band;
- means for beam sweeping through a second set of transmit beams over a second time interval, wherein the second time interval overlaps the first time interval; and
- means for, for each transmit beam of the second set of transmit beams, transmitting a respective RS symbol in a second frequency band.

113. The apparatus of clause 112, further comprising:
- means for receiving one or more reports from a user equipment (UE), the one or more reports indicating one or more signal measurements at the UE related to the first set of transmit beams, and one or more signal measurements at the UE related to the second set of transmit beams;
- means for selecting one of the transmit beams in the first set of transmit beams based on the one or more signal measurements related to the first set of transmit beams; and
- means for selecting one of the transmit beams in the second set of transmit beams based on the one or more signal measurements related to the second set of transmit beams.

114. The apparatus of clause 113, further comprising:
- means for transmitting a data signal to the UE using inter-band carrier aggregation in the first frequency band and the second frequency band, wherein the means for transmitting the data signal using the inter-band carrier aggregation comprises:
- means for transmitting a first portion of the data signal over one or more carriers in the first frequency band using the selected one of the transmit beams in the first set of transmit beams; and
- means for transmitting a second portion of the data signal over one or more carriers in the second frequency band using the selected one of the transmit beams in the second set of transmit beams.

115. The apparatus of any one of clauses 112 to 114, wherein the first frequency band and the second frequency band are above a frequency of 24.25 GHz.

116. The apparatus of any one of clauses 112 to 115, wherein a duration of each of the RS symbols in the first frequency band is greater than a duration of each of the RS symbols in the second frequency band.

117. The apparatus of any one of clauses 112 to 116, wherein the first frequency band and the second frequency band are separated in frequency.

118. An apparatus for wireless communication, comprising:
- means for beam sweeping through a first set of receive beams over a first time interval;
- means for, for each receive beam of the first set of receive beams,
  receiving a respective reference signal (RS) symbol in a first frequency band; and
  performing a signal measurement on the respective RS symbol received in the first frequency band;
- means for beam sweeping through a second set of receive beams over a second time interval, wherein the second time interval overlaps the first time interval; and
- means for, for each receive beam of the second set of receive beams,
  receiving a respective RS symbol in a second frequency band; and
  performing a signal measurement on the respective RS symbol received in the second frequency band.

119. The apparatus of clause 118, further comprising:
- means for selecting one of the receive beams in the first set of receive beams based on the signal measurements for the first set of receive beams; and means for selecting one of the receive beams in the second set of receive beams based on the signal measurements for the second set of receive beams.

120. The apparatus of clause 119, further comprising:
means for receiving a data signal from a base station using inter-band carrier aggregation in the first frequency band and the second frequency band, wherein the means for receiving the data signal using the inter-band carrier aggregation comprises:
means for receiving a first portion of the data signal over one or more carriers in the first frequency band using the selected one of the receive beams in the first set of receive beams; and
means for receiving a second portion of the data signal over one or more carriers in the second frequency band using the selected one of the receive beams in the second set of receive beams.

121. The apparatus of any one of clauses 118 to 120, wherein the first frequency band and the second frequency band are above a frequency of 24.25 GHz.

122. The apparatus of any one of clauses 118 to 121, wherein a duration of each of the RS symbols in the first frequency band is greater than a duration of each of the RS symbols in the second frequency band.

123. The apparatus of any one of clauses 118 to 122, wherein the first frequency band and the second frequency band are separated in frequency.

124. The method of any one of clauses 15 to 22, wherein:
each receive beam of the first set of receive beams points in a different direction or a beam pattern of each receive beam of the first set of receive beams is different; and
each receive beam of the second set of receive beams points in a different direction or a beam pattern of each receive beam of the second set of receive beams is different.

125. The method of any one of clauses 23 to 29, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

126. The method of any one of clauses 30 to 35, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

127. The method of any one of clauses 36 to 41, wherein:
each receive beam of the first set of receive beams points in a different direction or a beam pattern of each receive beam of the first set of receive beams is different; and
each receive beam of the second set of receive beams points in a different direction or a beam pattern of each receive beam of the second set of receive beams is different.

128. The apparatus of any one of clauses 56 to 63, wherein:
each receive beam of the first set of receive beams points in a different direction or a beam pattern of each receive beam of the first set of receive beams is different; and
each receive beam of the second set of receive beams points in a different direction or a beam pattern of each receive beam of the second set of receive beams is different.

129. The apparatus of any one of clauses 64 to 70, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

130. The apparatus of any one of clauses 71 to 76, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

131. The apparatus of any one of clauses 77 to 82, wherein:
each receive beam of the first set of receive beams points in a different direction or a beam pattern of each receive beam of the first set of receive beams is different; and
each receive beam of the second set of receive beams points in a different direction or a beam pattern of each receive beam of the second set of receive beams is different.

132. The apparatus of any one of clauses 97 to 104, wherein:
each receive beam of the first set of receive beams points in a different direction or a beam pattern of each receive beam of the first set of receive beams is different; and
each receive beam of the second set of receive beams points in a different direction or a beam pattern of each receive beam of the second set of receive beams is different.

133. The apparatus of any one of clauses 105 to 111, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

134. The apparatus of any one of clauses 112 to 117, wherein:
each transmit beam of the first set of transmit beams points in a different direction or a beam pattern of each transmit beam of the first set of transmit beams is different; and
each transmit beam of the second set of transmit beams points in a different direction or a beam pattern of each transmit beam of the second set of transmit beams is different.

135. The apparatus of any one of clauses 118 to 123, wherein:
each receive beam of the first set of receive beams points in a different direction or a beam pattern of each receive beam of the first set of receive beams is different; and each receive beam of the second set of receive beams points in a different direction or a beam pattern of each receive beam of the second set of receive beams is different.

It is to be appreciated that the present disclosure is not limited to the exemplary terminology used above to describe aspects of the present disclosure. For example, beam sweeping may also be referred to as beam scanning, or another term. The device 2100 may also be referred to as an apparatus, or another term.

It is to be appreciated that, unless stated otherwise, sweeping through a set of beams does not require that the beams in the set of beams be swept in a particular order or direction.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures. As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for wireless communications by a user equipment (UE), comprising:
   determining a first number of reference signal (RS) symbols based on at least one of a size or a geometry of a first antenna array of the UE;
   determining a second number of RS symbols based on at least one of a size or a geometry of a second antenna array of the UE;
   transmitting a message indicating the first number of RS symbols and the second number of RS symbols to a base station;
   beam sweeping through a first set of receive beams using the first antenna array of the UE;
   for each receive beam in the first set of receive beams,
      receiving a respective RS symbol in a first frequency band; and
      performing a signal measurement on the respective RS symbol received in the first frequency band;
   selecting one of the receive beams in the first set of receive beams based on the signal measurements for the first set of receive beams;
   beam sweeping through a second set of receive beams using the second antenna array of the UE while the first antenna array is fixed at the selected one of the receive beams in the first set of receive beams; and
   for each receive beam in the second set of receive beams,
      receiving a respective RS symbol in a second frequency band; and
      performing a signal measurement on the respective RS symbol received in the second frequency band.

2. The method of claim 1, further comprising:
   generating a report, the report indicating the signal measurement for at least one of the RS symbols received in the first frequency band, and the signal measurement for at least one of the RS symbols received in the second frequency band; and
   transmitting the report to the base station.

3. The method of claim 1, wherein the first frequency band and the second frequency band are above a frequency of 24.25 GHz.

4. The method of claim 1, wherein a duration of each of the RS symbols in the first frequency band is greater than a duration of each of the RS symbols in the second frequency band.

5. The method of claim 1, wherein the first frequency band and the second frequency band are separated in frequency.

6. A method for wireless communications by a user equipment (UE), comprising:
   determining a first number of reference signal (RS) symbols based on a subcarrier spacing for a first frequency band;
   determining a second number of RS symbols based on a subcarrier spacing for a second frequency band;
   transmitting a message indicating the first number of RS symbols and the second number of RS symbols to a base station;
   beam sweeping through a first set of receive beams using a first antenna array of the UE;
   for each receive beam in the first set of receive beams,
      receiving a respective RS symbol in the first frequency band; and
      performing a signal measurement on the respective RS symbol received in the first frequency band;
   selecting one of the receive beams in the first set of receive beams based on the signal measurements for the receive beams in the first set of receive beams;
   beam sweeping through a second set of receive beams using a second antenna array of the UE while the first antenna array is fixed at the selected one of the receive beams in the first set of receive beams;
   for each receive beam in the second set of receive beams,
      receiving a respective RS symbol in the second frequency band; and
      performing a signal measurement on the respective RS symbol received in the second frequency band.

7. The method of claim 6, wherein the first frequency band and the second frequency band are above a frequency of 24.25 GHz.

8. The method of claim 6, wherein a duration of each of the RS symbols in the first frequency band is greater than a duration of each of the RS symbols in the second frequency band.

9. The method of claim 6, wherein the first frequency band and the second frequency band are separated in frequency.

10. The method of claim 1, further comprising:
selecting one of the receive beams in the second set of receive beams based on the signal measurements for the second set of receive beams.

11. The method of claim 10, further comprising:
receiving a data signal from the base station using inter-band carrier aggregation in the first frequency band and the second frequency band, wherein receiving the data signal using the inter-band carrier aggregation comprises:
  receiving a first portion of the data signal over one or more carriers in the first frequency band using the selected one of the receive beams in the first set of receive beams; and
  receiving a second portion of the data signal over one or more carriers in the second frequency band using the selected one of the receive beams in the second set of receive beams.

12. The method of claim 1, wherein selecting the one of the receive beams in the first set of receive beams comprises selecting the one of the receive beams in the first set of receive beams corresponding to a highest one of the signal measurements for the receive beams in the first set of receive beams.

13. The method of claim 6, wherein selecting the one of the receive beams in the first set of receive comprises selecting the one of the receive beams in the first set of receive beams corresponding to a highest one of the signal measurements for the receive beams in the first set of receive beams.

14. The method of claim 6, wherein the subcarrier spacing for the second frequency band is larger than the subcarrier spacing for the first frequency band.

* * * * *